(12) United States Patent
McCarthy et al.

(10) Patent No.: US 9,092,994 B1
(45) Date of Patent: Jul. 28, 2015

(54) INTERACTIVE PIANO TRAINING SYSTEM

(71) Applicant: McCarthy Music Corp., Seattle, WA (US)

(72) Inventors: Kevin Michael McCarthy, Seattle, WA (US); Jason Michael McVey, Kenmore, WA (US); Jason Mark Ericson, Redmond, WA (US); Zachary Edwin Eveland, Seattle, WA (US); Mark Taylor, Seattle, WA (US); Thomas Hall Ruscher, Seattle, WA (US)

(73) Assignee: McCarthy Music Corp., Seattle, WA (US)

( * ) Notice: Subject to any disclaimer, the term of this patent is extended or adjusted under 35 U.S.C. 154(b) by 0 days.

(21) Appl. No.: 14/563,996

(22) Filed: Dec. 8, 2014

Related U.S. Application Data

(63) Continuation of application No. 14/337,086, filed on Jul. 21, 2014.

(51) Int. Cl.
*G09B 15/08* (2006.01)
*G09B 15/00* (2006.01)

(52) U.S. Cl.
CPC .............. *G09B 15/08* (2013.01); *G09B 15/003* (2013.01)

(58) Field of Classification Search
CPC ................................ G09B 15/08; G09B 15/003
See application file for complete search history.

(56) References Cited

U.S. PATENT DOCUMENTS

| | | | |
|---|---|---|---|
| 1,324,275 A | 12/1919 | Schantz | |
| 2,480,178 A | 8/1949 | Zinberg | |
| 2,909,956 A * | 10/1959 | Radcliffe | 84/478 |
| 3,415,152 A | 12/1968 | Gullickson | |
| 3,420,135 A | 1/1969 | Wolf | |
| 3,709,085 A | 1/1973 | Del Castillo | |
| 3,731,582 A | 5/1973 | Gullickson | |
| 3,744,366 A | 7/1973 | Del Castillo | |
| 3,943,815 A | 3/1976 | Gilbert | |
| 3,958,487 A * | 5/1976 | Goldman | 84/478 |
| 4,037,511 A | 7/1977 | Del Castillo | |
| 4,040,324 A | 8/1977 | Green | |
| 4,061,072 A * | 12/1977 | del Castillo | 84/478 |
| 4,314,499 A | 2/1982 | Olsen | |
| 4,480,521 A | 11/1984 | Schmoyer | |
| 4,929,866 A | 5/1990 | Murata | |
| 5,097,396 A | 3/1992 | Myers | |
| 5,107,743 A * | 4/1992 | Decker | 84/478 |
| RE34,254 E | 5/1993 | Dragoon | |
| 5,373,768 A | 12/1994 | Sciortino | |
| 5,392,682 A | 2/1995 | McCartney-Hoy | |
| 5,544,562 A | 8/1996 | Jeon | |

(Continued)

OTHER PUBLICATIONS

"Casio LK-170, LK-175, LK-260 User's Guide," <http://support.casio.com/en/manual/manualfile.php?cid=008016042> [retrieved Jul. 21, 2014], 48 pages.

(Continued)

*Primary Examiner* — Robert W Horn
(74) *Attorney, Agent, or Firm* — Davis Wright Tremaine LLP

(57) ABSTRACT

A piano training device is described herein. The piano training device comprising a plurality of keys which may be illuminated by a light source associated with each key. The light source associated with each key is oriented such that the light source transmits light toward the front surface of the key. The key is further manufactured so that the light transmitted toward the front surface of the key is redirected to the top surface of the key.

20 Claims, 63 Drawing Sheets

(56) References Cited

U.S. PATENT DOCUMENTS

| | | | |
|---|---|---|---|
| 5,557,055 A * | 9/1996 | Breitweiser, Jr. | 84/478 |
| 5,656,789 A | 8/1997 | Nakada | |
| 5,796,025 A | 8/1998 | Haake | |
| 5,841,051 A | 11/1998 | Segan | |
| 5,907,115 A * | 5/1999 | Matsunaga et al. | 84/477 R |
| 6,029,304 A | 2/2000 | Hulke | |
| 6,037,534 A * | 3/2000 | Yasutoshi et al. | 84/477 R |
| 6,133,518 A | 10/2000 | Kamimura | |
| 6,204,441 B1 | 3/2001 | Asahi | |
| 6,217,183 B1 | 4/2001 | Shipman | |
| 6,337,433 B1 * | 1/2002 | Nishimoto | 84/464 A |
| 6,348,649 B1 | 2/2002 | Chen | |
| 6,407,324 B1 * | 6/2002 | Hulcher | 84/478 |
| 6,410,836 B2 | 6/2002 | Takahashi | |
| 6,481,130 B1 | 11/2002 | Wu | |
| 6,515,210 B2 * | 2/2003 | Shibukawa | 84/477 R |
| 6,948,840 B2 | 9/2005 | Grenda | |
| 7,064,259 B1 | 6/2006 | Kelly | |
| 7,182,497 B2 | 2/2007 | Lee | |
| 7,361,829 B2 | 4/2008 | Uehara | |
| 7,390,958 B2 | 6/2008 | Knudsen | |
| 7,427,707 B2 * | 9/2008 | Shaffer | 84/464 A |
| 7,498,534 B2 | 3/2009 | Hoyle | |
| 7,582,825 B2 | 9/2009 | Chien | |
| 7,714,218 B2 | 5/2010 | Papenfus | |
| 8,008,563 B1 | 8/2011 | Hastings | |
| 8,217,285 B2 | 7/2012 | Chang | |
| 8,525,011 B2 | 9/2013 | Ihara | |
| 8,890,720 B2 | 11/2014 | Shipman | |
| 8,901,405 B1 * | 12/2014 | McCarthy | 84/478 |
| 2002/0017187 A1 | 2/2002 | Takahashi | |
| 2008/0018606 A1 | 1/2008 | Chen | |
| 2010/0282581 A1 | 11/2010 | Lin | |
| 2011/0283867 A1 | 11/2011 | Ihara | |
| 2013/0068086 A1 | 3/2013 | Mittelstadt | |
| 2014/0260900 A1 * | 9/2014 | Yoshikawa | 84/465 |
| 2015/0000506 A1 | 1/2015 | Ye | |

OTHER PUBLICATIONS

Marks, P., "Real Rock Band: Play Piano Like a Pro With Light Keys," New Scientist, Oct. 2, 2013, <http://www.newscientist.com/article/dn24296#.VH3_rp3TIYW> [retrieved Nov. 26, 2014], 2 pages.

Weing, M., et al., "P.I.A.N.O.: Enhancing Instrument Learning via Interactive Projected Augmentation," UbiComp'13 Adjunct, Sep. 8-12, 2013, Zurich, Switzerland, <https://www.uni-ulm.de/fileadmin website_uni_ulm/iui.inst.100/institut/Papers/Prof_Weber/2013-UbiComp-adjunct-PIANO.pdf> [retrieved Nov. 26, 2014], 4 pages.

"Yamaha Digital Keyboard EZ-220 Owner's Manual," <http://download.yamaha.com/api/asset/file/?language=en&site=usa.yamaha.com&asset_id=55346> [retrieved Jul. 21, 2014], 60 pages.

International Search Report and Written Opinion mailed Mar. 10, 2015, in International Patent Application No. PCT/US2014/052181, filed Aug. 21, 2014, 10 pages.

* cited by examiner

INTERACTIVE PIANO TRAINING SYSTEM

CROSS REFERENCE TO RELATED APPLICATION

This application is a continuation of U.S. patent application Ser. No. 14/337,086, filed Jul. 21, 2014, the disclosure of which is hereby incorporated herein in its entirety.

BACKGROUND

Learning to play the piano can be a difficult process. A student, attempting to learn to play the piano, may typically spend many hours taking piano lessons and practicing those lessons, often with the assistance of a teacher. The skills of learning to read music, learning to associate the notes of a piece of music with the piano keys, playing the piano keys in the correct order and with the correct tempo, and building on previous lessons to gain increased ability to play the piano can be time consuming and difficult to learn, and also time consuming and difficult to teach. Several devices have been developed that attempt to address this difficulty by providing electronic assistance to piano students in the form of indicators of the mechanical operation for which keys to press, but such devices often fail to provide such indicators in relation to the other skills required to play the piano, thus reducing the efficacy of the learning process. Moreover, many devices that have been developed generally fail to achieve high quality indications, such as by illuminating keys in inconvenient locations or in an unaesthetic manner.

DETAILED DESCRIPTION

Figure 1:
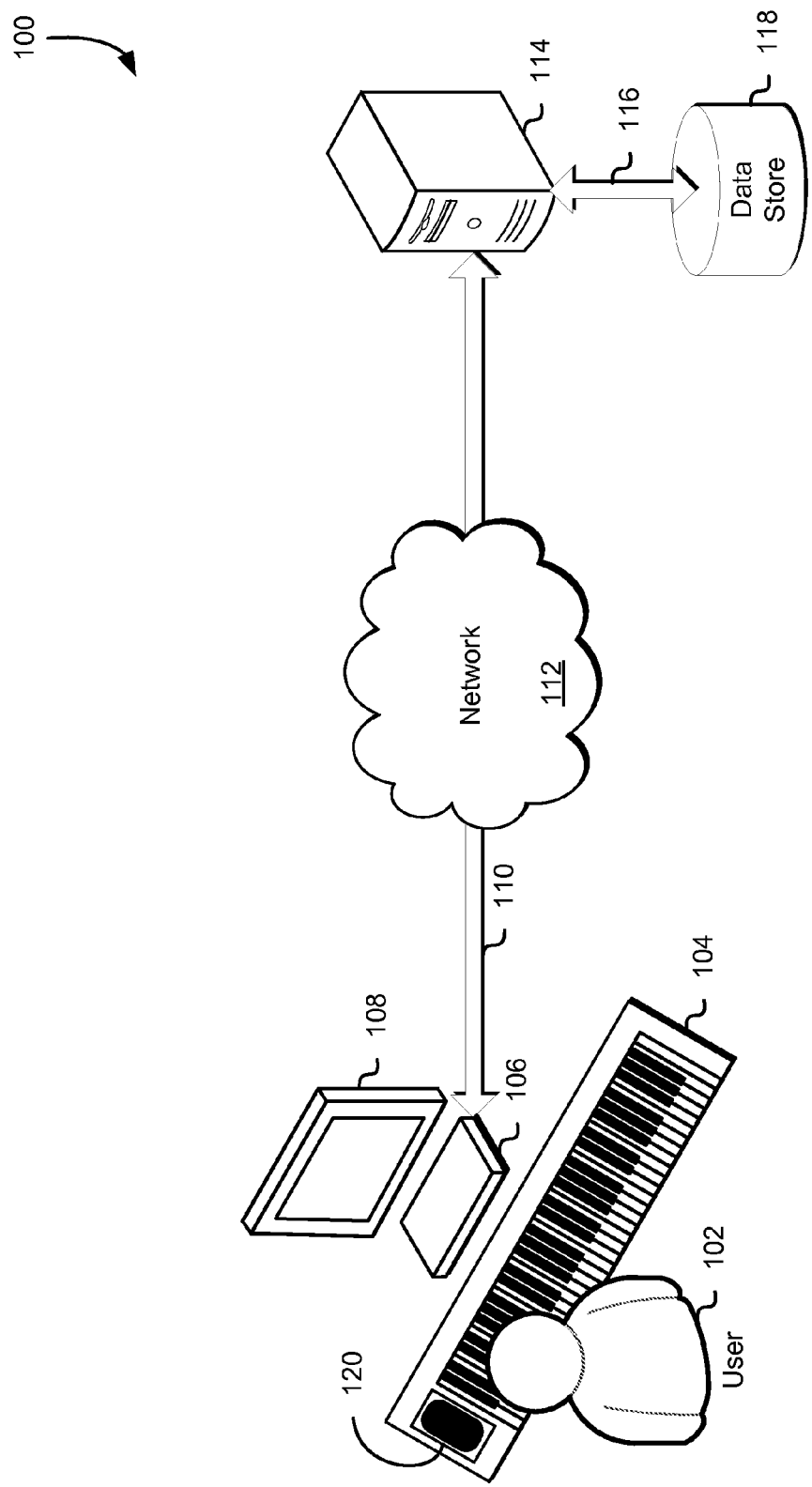
FIG. 1 illustrates an example environment where a user may utilize an interactive piano training device connected to an external system to learn to play a piano in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and devices for interactively learning to play the piano, using an electronic piano training device that incorporates dynamically controllable lighting into the keys of a keyboard. Such an electronic piano training device may be combined with a learning environment to provide piano lesson content for users (also referred to herein as "students"). An electronic piano training device (also referred to herein simply as a "keyboard") with keys (e.g., piano keys) that incorporate dynamically controlled lighting may be connected to a programmable computer device configured to control the lighting. The keyboard may also be connected to a programmable computer device configured to receive event notifications of events generated by pressing keys on the keyboard and to process those events. For example, a key press may generate a key press event notification which, when received by the programmable computer device, may update lesson progress, generate one or more response events, render the appropriate sounds and/or other such processing actions.

Other devices described herein and associated with the interactive piano training device (e.g., a controller, a control board, an associated tablet computing device, etc.) may also be connected to a programmable computer device which may be configured to receive event notifications of events generated by those other devices and to process those events. For example, pressing a button on a control board to proceed to the next lesson may generate an event notification which, when received by the programmable computer device, may close the current lesson, retrieve one or more resources related to the next lesson, prepare the next lesson, configure a user interface, generate one or more key lighting events and/or other such processing actions.

In some embodiments, the programmable computer device configured to control the lighting of the keys and the programmable computer device configured to receive the event notification of the events (e.g., event notifications generated by pressing keys on the keyboard and/or by interacting with other associated controls) and to process those events, may be a single programmable computer device or may be a combination of a plurality of programmable computer devices. In some embodiments, the keyboard, the other associated controls, the programmable computer device configured to control the lighting of the keys, and the programmable computer device configured to receive the event notification of the events and to process those events may be a single device.

The programmable computer device configured to control the lighting of the keys may do so in response to parameters of an exercise which may be associated with a lesson, the lesson configured with one or more learning objectives. In some embodiments, the lesson may be obtained from an external computer system such as, for example, a computer system connected to the programmable computer device via a network such as the Internet. A lesson may be a collection of musical scores, lesson objectives, exercises, quizzes, learning metrics, playback examples, media files and/or other such information. Musical scores may be included in a lesson using a graphical representation or a metadata representation such as, for example, using an extensible markup language ("XML") such as MusicXML. The lesson may also be specified using an XML representation to specify the lesson contents. In some embodiments, the lesson may be obtained from computer system memory or from such resource accessible by the programmable computer device. The programmable computer device configured to receive event notifications of events and to process those events, in addition to processing those events to produce sounds, may also process those events in response to the lesson. Data associated with the events may indicate the timing of the key press events, the particular key pressed, the speed at which it was pressed and/or other such data associated with the events. The programmable computer device may evaluate such events to determine whether the key was properly pressed.

An electronic piano training device, such as the device described herein, combined with a learning environment configured with one or more lessons may be used to enable a student to learn to play the piano. For example, a lesson may be configured to teach a student to play a simple musical scale of whole notes in the C-major key with even tempo and may include one or more exercises associated with that lesson. One exercise may specify that the student should press keys corresponding to the notes in the C-major scale in a specified order and at specified times. To assist the student, the programmable computer device configured to control the lighting of the keys may illuminate the keys corresponding to the notes in the C-major scale one by one, in order, with an even tempo (e.g., one key lit every second). The programmable computer device configured to receive event notifications for events generated by pressing keys on the keyboard and then configured to process those events may, in response to receiving events corresponding to pressed keys, render the appropriate sounds. The programmable computer device configured to receive event notification of events generated by pressing keys on the keyboard and to process those events may also record the timing of those key press events and use the timing to provide feedback to the student. For example, a student who presses the proper key, in the proper order, within a threshold value of the proper attack time and releases that key within the proper duration may receive an evaluation score of 100% on the exercise, while a student who presses incorrect keys or who presses the keys outside of the threshold values may receive a lower evaluation score on the exercise. As may be contemplated, while the techniques described and suggested herein refer to a piano keyboard, piano keys, piano lessons and other such references, the techniques described and suggested herein may be applicable to other keyboard instruments (e.g., organs, harpsichords, electronic keyboards, accordions, clavichords, etc.) and/or to other musical instruments having keys illuminable in accordance with various techniques described herein.

FIG. 1 illustrates an example environment 100 where a user may utilize an interactive piano training device connected to an external system to learn to play a piano in accordance with at least one embodiment. A user 102 may use an interactive piano training device 104, which may be combined with a controller 106 and which may also be combined with a display 108. The user 102 may be a student, or may be a teacher, or may be a musician, or may be some other such user of the interactive piano training device. The interactive piano training device 104, described herein, may include a plurality of illuminable keys (as described herein), one or more computer processors such as those described herein, computer system memory, computer system signal processors and/or other such computer system resources. The interactive piano training device 104 may also include one or more interfaces, including switches, connectors, plugs, buttons, touch screens, network interfaces and/or other such interfaces. For example, an interactive piano training device, in an embodiment, may include a control panel 120 to control the operation of the interactive piano training device that may, for example, control the power of the device, the volume, the type of output, the method of output, connections to and from the interactive piano training device and/or other operation parameters. As may be contemplated, the types of interfaces included in the interactive piano training device 104 described herein are merely illustrative examples and other types of interfaces may be considered as within the scope of the present disclosure.

The controller 106 may be a computational device and may include additional functionality for utilizing an interactive piano training device 104, including, but not limited to, functionality to connect to the display 108 and to display information associated with the interactive piano training device 104. For example, the controller 106 may include functionality to cause the display 108 to render a musical score that may be played using the interactive piano training device 104. When causing the display of a musical score, the controller 106 may execute instructions to alter the display of the musical score based on a lesson plan, based on input from the user, based on input from an instructor, or based on a combination of these and/or other types of input. In another example, the controller 106 may include functionality to cause the display 108 to render one or more piano training exercises, which may include musical scores, progress metrics, video, audio, graphics, user interface elements and/or other such instructional elements. Each exercise may be one of a plurality of exercises associated with completing a particular lesson step. Each step may be one of a plurality of steps associated with a particular lesson. Each lesson may be one of a plurality of lessons associated with a particular course.

In some embodiments, the interactive piano training device 104 may be separate from the controller 106. In such embodiments, the interactive piano training device 104 may communicate with the controller 106 using a wired connection, using short-range communication (e.g., Bluetooth), using a wireless connection (e.g., WiFi™), using a wired connection (e.g., universal serial bus or "USB"), or using some other connection type. In some embodiments, the interactive piano training device 104 may be integrated with the controller 106 as a single unit. Similarly, in some embodiments, the controller 106 may be separate from the display 108. In such embodiments, the controller 106 may communicate with the display 108 using a wired connection, using a wireless connection, or using some other connection type. In some embodiments, the controller 106 may be integrated with the display 108 as a single unit. In some embodiments, the controller and/or the display may be general purpose computer devices which may be used as a controller and/or display by installing software within the controller and/or the display. For example, the controller and/or the display may be a tablet computer system that includes the controller (e.g., the tablet computer system processors) and the display (e.g., the tablet computer system display) in a single unit. In this example, software configured to perform the functions of the controller described herein may be installed within the tablet computer system.

In some embodiments, the controller 106 may include functionality to use a connection 110 to connect via a network 112 to a computer system 114. The computer system 114 may be located in a remote location from the user 102 and the interactive piano training device 104. The connection 110 may be a connection as described herein. The network 112 may be a network as described herein. The computer system 114 may be one or more of one or more computer systems such as the computer system described herein. The computer system 114 may include functionality to connect 116 to a data store 118 and to provide data, metadata and/or other such information from the data store 118 to the controller 106 and/or to the interactive piano training device 104. The data store 118 may include, for example, lessons and/or exercises which may be retrieved by the computer system 114 and sent to the controller 106 and/or to the interactive piano training device 104 via the network 112. In an embodiment, the data may be sent to the controller 106 and/or to the interactive piano training device 104 via the network 112 using one or more computing-as-a-service ("CAAS") services. Such CAAS services (also referred to herein as "cloud-based services") may allow the user to access synchronized lesson and/or exercise progress across multiple devices including, but not limited to the controller 106, the interactive piano training device 104, a tablet, a smart phone, a desktop computer, a laptop computer, a smart watch, a wearable computer and/or other such computing devices which may be configured to access such data using such cloud-based services over a network.

The data store 118 may be configured to provide static data stored in flat files, databases and/or other such data storage mechanisms. The data store 118 may also be configured to provide dynamic data (e.g., data generated dynamically in response to one or more external inputs) which may be dynamically generated by server-side structured languages as described herein. In some embodiments, the data store 118 may be configured to use a combination of these and/or other data provisioning techniques. For example, a user 102 may submit a request for an exercise to learn a particular aspect of playing a piano, which may be part of a collection of exercises associated with a lesson, as described herein. The data store 118 might access user information to verify the identity of the user and/or to determine the learning progress of that user. The data store 118 may then select the proper lesson content from a statically stored lesson plan. The data store 118 may also combine the lesson data stored in the data store with dynamically generated data based on the user to provide lesson content tailored to that particular user. The information may then be returned to the user such that the user is able to access the lesson via the interactive piano training device 104, the controller 106 and/or the display 108.

Figure 2:
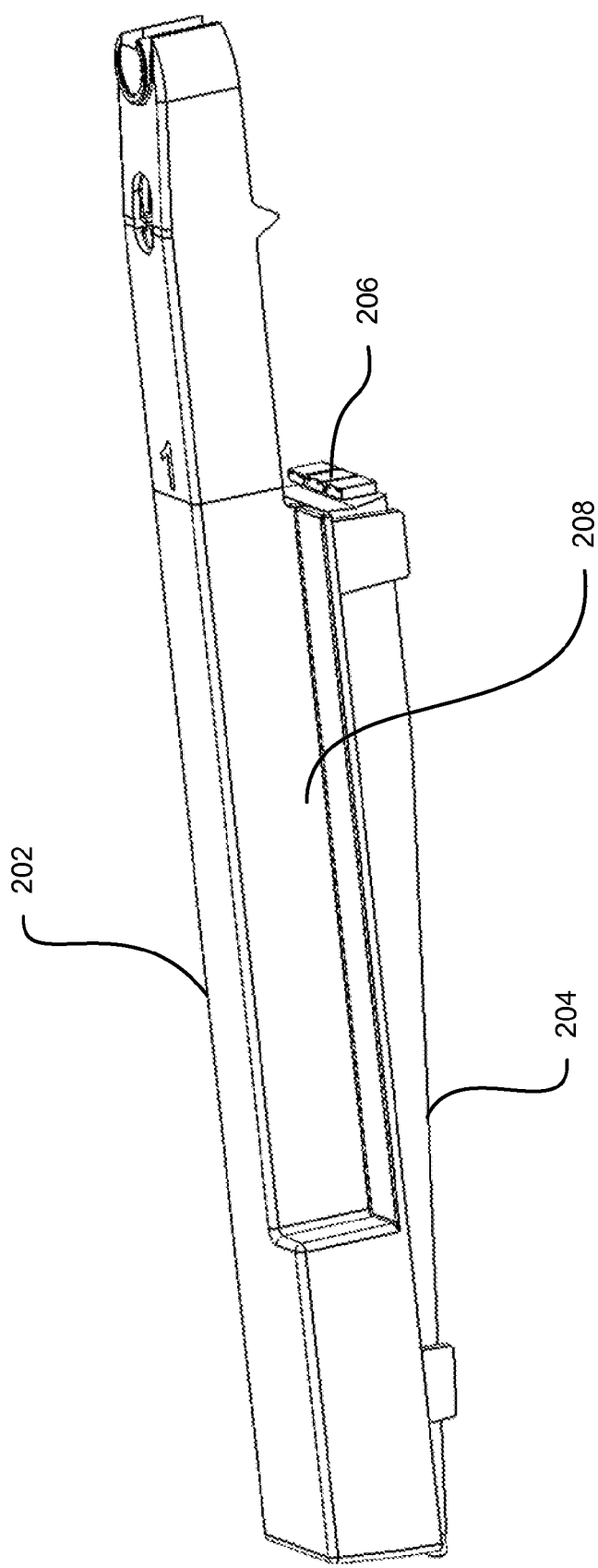
FIGS. 2 to 22 illustrate aspects of a first piano key type of an interactive piano training device in accordance with an embodiment.

FIG. 2 illustrates an example illuminable key and a light source associated with that key for an interactive piano training device such as the interactive piano training device described in connection with FIG. 1 and in accordance with at least one embodiment. The view of the example illuminable key illustrated in FIG. 2 is an isometric projection from above, to the right and slightly to the back of the key. The illuminable key illustrated in FIG. 2 is a first example of a first key type. For convenience, the first key type may also be referred to herein as a "white" key. In this context, the use of the word "white" should be understood to refer to the type of key rather than to the color (or any other optical properties) of the key type. For example, a "white" key may be white, may be black, may be some other color, or may be a combination of colors. As used herein, the terms "above," "right," and "back" when used relating to locations on and proximal to the key and/or to associated elements, as well as other such terms ("below," "left," "front" and so on) are understood to refer to the key as it would be in a standard location within a piano keyboard as described herein, from the perspective of and relative to a user of the interactive piano training device.

The key body 202 is illustrated with an associated light guide 204 and an associated light source 206. The key body 202 may be solid, may be hollow, or may contain both solid and hollow sections. The key body 202 may be constructed to have one or more optical properties that enhance the key's function in piano training. For example, the key body 202 may be manufactured to be transparent or semi-transparent such that light may shine through the key when illuminated using a light source (also referred to herein as an "electroluminescent light source") as described herein. The key body 202 may also be manufactured of a material that partially diffuses the light emitted from the top surface of the key, thus producing a more even light distribution from the top surface of the key body. In an embodiment, the key body 202 can be manufactured from a polycarbonate with one or more light diffusion (also referred to herein as "diffusion of light") properties, with one or more manufacturing properties and/or with one or more durability properties. The properties may include, but may not be limited to, material strength properties, molding properties, impact resistance properties and/or other such properties.

In an embodiment, a key body material such as Sabic™ Lexan™ FXD171R may be used to manufacture the key body 202. In such an embodiment, the key body material has a yielding tensile stress of 630 kgf/cm$^2$, a breaking tensile stress of 650 kgf/cm$^2$, and a tensile modulus of 23,700 kgf/cm$^2$ (each for a 50 mm piece, minimum). In such an embodiment, the key body material has an instrumented impact total energy of 714 cm-kgf at 23° C. and a specific gravity of 1.19. In an embodiment where the key body 202 is injection molded, the key body material has one or more properties associated with the injection molding process including a drying temperature of 120° C., a cumulative drying time of 48 hours, a melt temperature between 270° C. and 295° C. (inclusive), and a mold temperature of between 70° C. and 95° C. (inclusive). The key body 202 may also be manufactured of other materials such as, acrylics, polyesters, halogenated plastics and other such plastics with acceptable light diffusion properties and with one or more other acceptable manufacturing and/or durability properties such as the properties mentioned herein.

The key body 202 may also be manufactured such that light may primarily shine through the key body only along certain axes. For example, the key body 202 may be manufactured such that light from below the key may shine through the top of the key, but most or all light is prevented from shining through the sides of the key. Light may be transmitted along some axes and prevented along other axes using, for example, certain materials of manufacture, certain coatings, certain geometries and/or other such manufacturing techniques. For example, certain plastics may allow better or more even light transmission, opaque coatings (applied by, for example, painting or pad printing) applied to the sides of the key (i.e., between keys) may prevent light transmission to neighboring keys, opaque parts placed in proximity to the key (e.g., between keys) may prevent light transmission to neighboring keys.

As a result, some faces of the key body 202 may be translucent (e.g., allow transmission of light), some faces of the key body 202 may be opaque (e.g., prevent transmission of light), and some faces may by partially translucent and partially opaque (e.g., allow some transmission of some light and prevent some transmission of some light). Unless otherwise stated or made clear from context, as used herein, the terms "translucent" and "opaque" may be understood to be relative terms. That is, the term "translucent" may be used to refer to a portion of the key body 202 which allows the transmission of more light than a comparable portion of the key body that is "opaque." In some embodiments (e.g., using a very bright light), both the translucent and opaque portions of the key body may transmit some light but the opaque portion will be the portion with higher opacity, that transmits less light. The various components of the key are constructed with corresponding opacities to achieve the effects described herein (e.g., even illumination of the top surface of the key) and the various opacities used may vary in accordance with the intensity of the light source being used to illuminate the keys. For example, stronger light sources may allow for materials that allow less light through than materials that would be used with weaker light sources. The key body 202 illustrated in FIG. 2 is translucent on the top face (allows light from below to shine through) and opaque on the left side face and the right side face. In some embodiments, the key body 202 may be translucent on the front face. In some other embodiments, the key body 202 may be opaque on the front face. The top surface of the key body 202 may be smooth and/or shiny as is common with piano keys.

As with the key body 202, the light guide 204 may be solid, may be hollow, or may contain both solid and hollow sections. The light guide 204 may have one or more optical properties that enhance piano training. For example, the light guide 204 may be manufactured such that light may shine through the key when illuminated using a light source as described herein. In an embodiment, the light guide 204 can be manufactured from a plastic such as an optical-grade acrylic with acceptable light transmission properties (e.g., index of reflection, index of refraction, etc.) and also with one or more manufacturing and/or durability properties including, but not limited to, material strength properties, molding properties, impact resistance properties and/or other such properties. The light guide 204 may also be manufactured of other materials such as glass, polycarbonate, polyester, halogenated plastic and other such plastics with acceptable light transmission properties and with one or more other manufacturing and/or durability properties. The light guide 204 may also be manufactured such that light may shine through the light guide 204 only along certain axes. The light guide 204 may also be manufactured such that light may more readily, more brightly and/or more evenly shine through the light guide 204 along certain axes. For example, the light guide 204 may be manufactured with several properties such that light from behind the light guide may shine evenly and brightly from the top surface of the light guide 204 as described herein.

The light guide 204 may be wedge shaped. The wedge shape of the light guide 204 may use the principles of internal refraction and reflection to facilitate even spreading of light from the back to the front of the light guide. The higher intensity light near the light source, at the back of the light guide may reflect further from the top surface before traveling through the light guide material and the lower intensity light away from the light source may reflect closer to the top surface before traveling through the light guide material. This may result in the higher intensity light being more diffused before emitting from the top surface while the lower intensity light is less diffused before emitting from the top surface, thereby creating more even illumination. The light guide 204 may also be shaped so that, as the light guide pivots with the movement of the key, the light emitted from the top of the key does not vary greatly in intensity during the pivot (as measured by one or more metrics such as those described herein). This relative lack of variation in intensity may be accomplished by, for example, truncating the wedge so that a portion of the profile of the light guide is wedge shaped and a portion of the profile of the light guide is flat (as illustrated in FIG. 2), thereby increasing the angle of the wedge portion while maintaining an effective depth (from top to bottom) at the back side. This relative lack of variation in intensity may also be accomplished by configuring the depth of the back side of the light guide 204 to fully encompass the center of the beam projected from the rear portion of the light through the full range of motion of the key and/or the light guide.

Other aspects of the manufacture of the light guide may alter the transmission of light through the interactive piano training device. For example, coatings on the sides and/or the bottom of the light guide may prevent light from transmitting through these surfaces, adding internal reflection and increasing the overall luminance of the light. Luminance, as used herein, is luminous intensity per unit area and is measured in $cd/m^2$. Luminous intensity is measured in candelas (cd). Coatings and/or alterations to the top surface of the light guide may also diffuse the light emitting from this surface, thereby reducing "hot spots" and aiding in the even emission of light from the top surface. For example, the top surface of the light guide can have diffusion material attached, or may have diffusion marking (e.g., cross-hatching, dimples, or other such diffusion markings) etched into the top surface. The top surface of the light guide may also be a matte surface (e.g., a surface that is not shiny) to aid in diffusion. In some embodiments, the surfaces of the light guide have radial etchings of various radii to produce a Fresnel lens effect, thus aiding in light diffusion. In some embodiments, the surfaces of the light guide have random etchings (e.g., roughed up) to aid in light diffusion. Various coatings may be constructed in various ways in accordance with various embodiments, such as by painting coatings on, adhering additional layers of material (e.g., of a plastic), by adhering different materials (e.g., a metal coating), by etching, and in other ways. As with the optical properties of the key body 202, the optical properties of the light guide 204 may be obtained by certain materials of manufacture, certain coatings, certain geometries, certain placements and/or other such manufacturing techniques. The light guide 204 illustrated in FIG. 2 is translucent on the top face, opaque on the left side face and the right side face and allows light from a light source at the back of the light guide to be evenly distributed throughout the light guide.

As used herein, light may be said to be evenly distributed and/or emitted from a surface (e.g., of a light guide 204 or from a key body 202) when the difference in emitted intensity of the light at any two points on the surface varies by less than a threshold value. For example, light emitted from the top surface of a key body may be said to be evenly distributed if the difference in intensity between the brightest point and the darkest point is less than a determined threshold value (e.g., ten percent of the intensity of the brightest point). The intensity of emitted light may be measured in terms of luminous intensity (in candelas), a measurement which is based at least in part on the wavelength of the emitted light in a particular direction. The intensity of emitted light may also be measured in luminance, which is luminance intensity per unit area. In an embodiment where even distribution of light is measured in luminance, the two points on the surface may be understood to be two regions with non-zero surface areas and with the same surface area used for each one. For example, if the maximum luminance of the emitted light on a surface has a luminance of one-hundred-thousand candelas per square meter, measured an area of ten square millimeters, for the minimum luminance for emitted light to fall within a ten percent threshold value would be ninety-thousand candelas per square meter, also measured over an area of ten square millimeters. In such an example, if the average luminous intensity of the region with the maximum intensity was one candela (one-tenth of a candela per square millimeter over a ten square millimeter area), the average luminous intensity of the region with the minimum intensity should exceed nine-tenths of a candela in order to exceed the ten percent threshold.

In some embodiments, aesthetic and/or practical concerns may allow some portions of a surface to be exempted from the threshold value requirements (e.g., perimeters, front surfaces, etc.). Additionally, even distribution and/or emission of light may be measured over some acceptable portion of the possible spectrum available from the light source and/or may be a function of the hue, saturation and/or value of each of the possible emitted colors. In some embodiments, even distribution and/or emission of light from a surface may be evaluated based at least in part on an aesthetic evaluation of the resulting light source, light guide and key body combination.

The light source 206 is illustrated in FIG. 2 placed at the back of the light guide 204 and below the key body 202 and is oriented to project a beam of light with a center that is parallel to the top surface of the key body 202. In some embodiments, the light source 206 may be placed in other locations relative to the light guide and/or relative to the illuminable key such as below but not behind, behind but not below, to the left or right side, in front of, or other such relative locations. The light source 206 is illustrated in FIG. 2 oriented to shine into the light guide 204. In some embodiments, the light source may be oriented such that the center of the beam does not initially pass into the light guide (e.g., it is oriented such that the center of the beam points away from the light guide). In such embodiments the light source may be redirected toward the light guide using mirrors and/or lenses as described herein.

The light source 206 may include one or more lights, in one or more locations and in one or more orientations. The light source 206 may be configured to illuminate the one or more lights according to signals received from one or more controllers as described herein. For example, a controller may send a signal to a light source to turn on at a certain time, or to change to a certain color, or to turn off, or other such signals. The example illustrated in FIG. 2 shows three lights, located behind and below the key surface, oriented so that the center of the beam initially passes into the light guide. As described herein, the light source 206 may be dynamically controlled to allow changes in the brightness and/or the color of the light. For example, the light source 206 may include one or more broad-spectrum light emitting diodes (LEDs) that may have both their brightness and their color controlled by a computer system such as the interactive piano training device 104 and/ or a controller 106 illustrated herein at least in connection with FIG. 1 and in accordance with at least one embodiment. Broad-spectrum LEDs are electronic components that are capable of emitting light in multiple colors and/or at multiple levels of brightness. For example, a broad-spectrum LED may be configured to emit red light at a plurality of intensities or brightnesses, to emit blue light at a plurality of intensities or brightnesses, to emit green light at a plurality of intensities or brightnesses, or to emit a combination of one or more intensities of red light, blue light and/or green light. In an embodiment where combinations of one or more intensities of red light, blue light and/or green light may be emitted, a near complete spectrum (also referred to as a "broad spectrum") of visible light colors may be produced by a broad spectrum LED.

In some embodiments, the light source 206 may also include one or more light processing elements including, but not limited to, mirrors, shutters, lenses and the like which may alter the transmission of the light using one or more methods. For example, the light source may be configured to always shine and the intensity of the light may be controlled by opening and closing a shutter in front of the light. Similarly, the light source may be oriented in a direction other than toward the front of the illuminable key and the light may be redirected using one or more reflective surfaces (e.g., a mirror) and/or one or more refractive elements (e.g., a lens). As may be contemplated, the light processing elements and the methods of altering the transmission of the light described herein are illustrative examples and other such light processing elements and light transmission alteration methods may be considered as within the scope of the present disclosure.

The example illuminable key illustrated in FIG. 2 is a first example of a first type of illuminable key (a "white" key) and is manufactured with a cutout area 208 to allow placement and free movement of adjacent keys within the interactive piano training device. The cutout area 208 is described in more detail below. As may be contemplated, the shape of the key body 02, the shape of the cutout area 208, and the shape of the other examples of the other key types described herein are merely illustrative examples and are based at least in part on the configuration of the interactive piano training device described herein. Other configurations based on other keyboard layouts may result in different key body shapes and/or different cutout shapes. For example, keyboards may be manufactured that contain different numbers of keys, different arrangements of keys, different sizes of keys, different triggering mechanisms and/or other differences. As such, other key body shapes and/or other key cutout area shapes may be considered as within the scope of the present disclosure.

Figure 3:
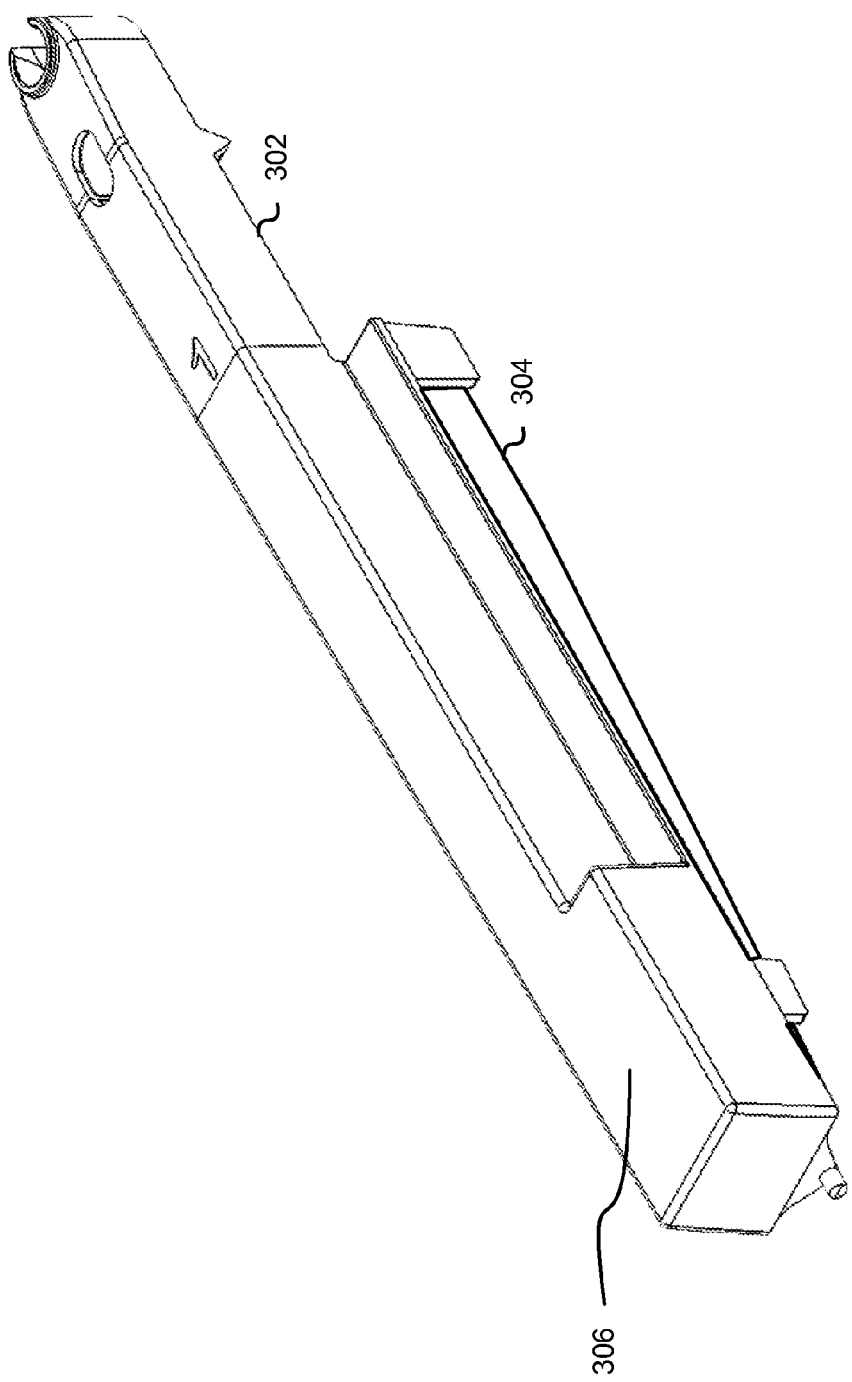

FIGS. 3-48 illustrate different keys of a keyboard, in accordance with an embodiment. The different keys and components thereof (e.g., light guides), as shown in the drawings, may have different geometries depending on their place in the keyboard and within a musical octave. Each of the keys and components thereof illustrated in FIGS. 3-48 may have optical features such as described in connection with FIG. 2 and elsewhere herein. FIG. 3 illustrates an isometric top view of the example illuminable key described in connection with FIG. 2 and in accordance with at least one embodiment. The key body 302 is shown connected to the light guide 304. In an embodiment, the key body 302 may be manufactured as a single unit with the light guide 304. The portion of the top surface of the key that is the playing surface 306 (also referred to herein as the "striking surface") is the portion of the top surface of the key that may be pressed to cause the key to move (e.g., pivot about a pivot point as described herein).

Figure 4:
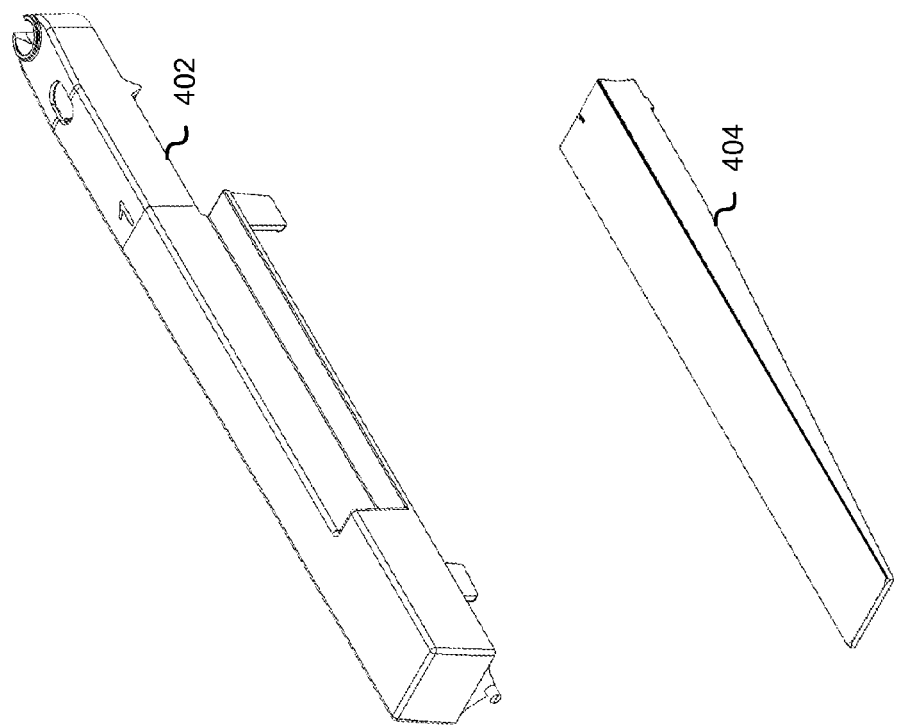

FIG. 4 illustrates the isometric top view of the example illuminable key described in connection with FIG. 2 and in accordance with at least one embodiment. The key body 402 is shown separated from the light guide 404.

Figure 5:
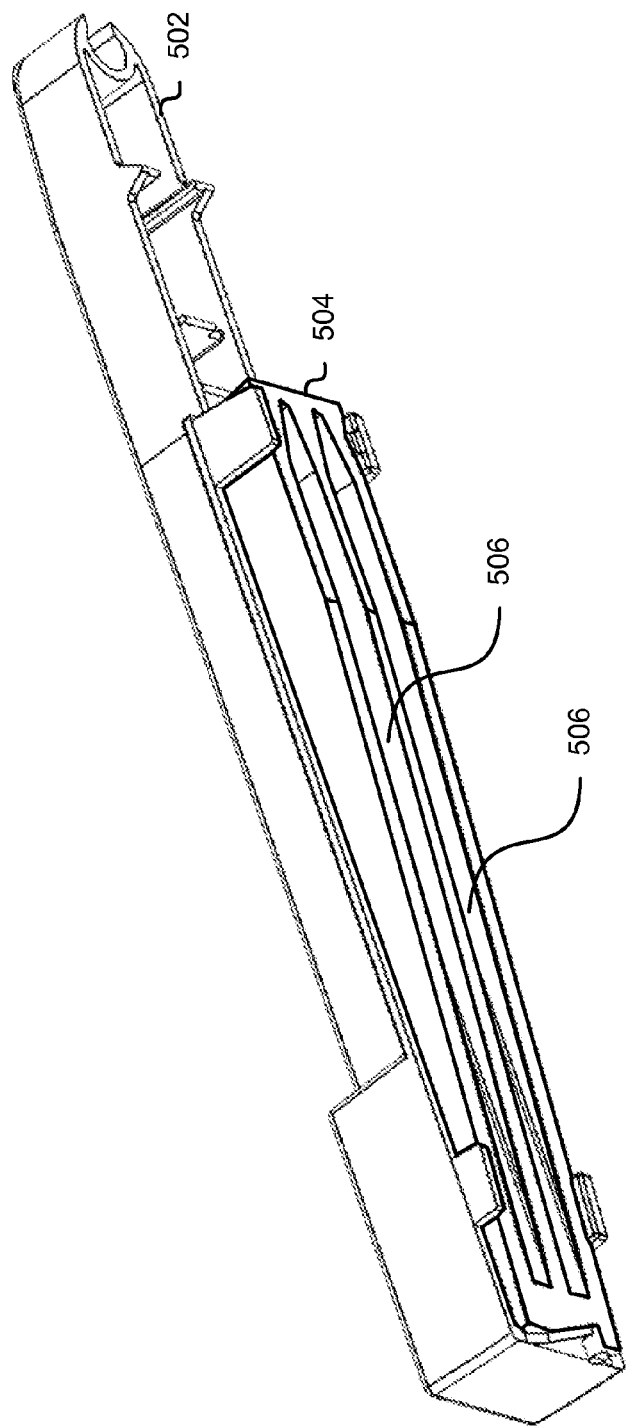

FIG. 5 illustrates an isometric bottom view of the example illuminable key described in connection with FIG. 2 and in accordance with at least one embodiment. The key body 502 is shown connected to the light guide 504. The light guide 504 illustrated in FIG. 5 has two cutouts 506 which may, in some embodiments, improve the light transmission properties of the light guide and which may also, in some embodiments, aid in the manufacturing process of the light guide. For example, the two cutouts 506 may reduce the overall thickness of the light guide along any axis (e.g., top-to-bottom, left-to-right, and front-to-back), thereby making the light guide more easily manufactured using a technique such as injection molding where the volume of material may not be amenable to economical/quality injection molding without such channels.

Figure 6:
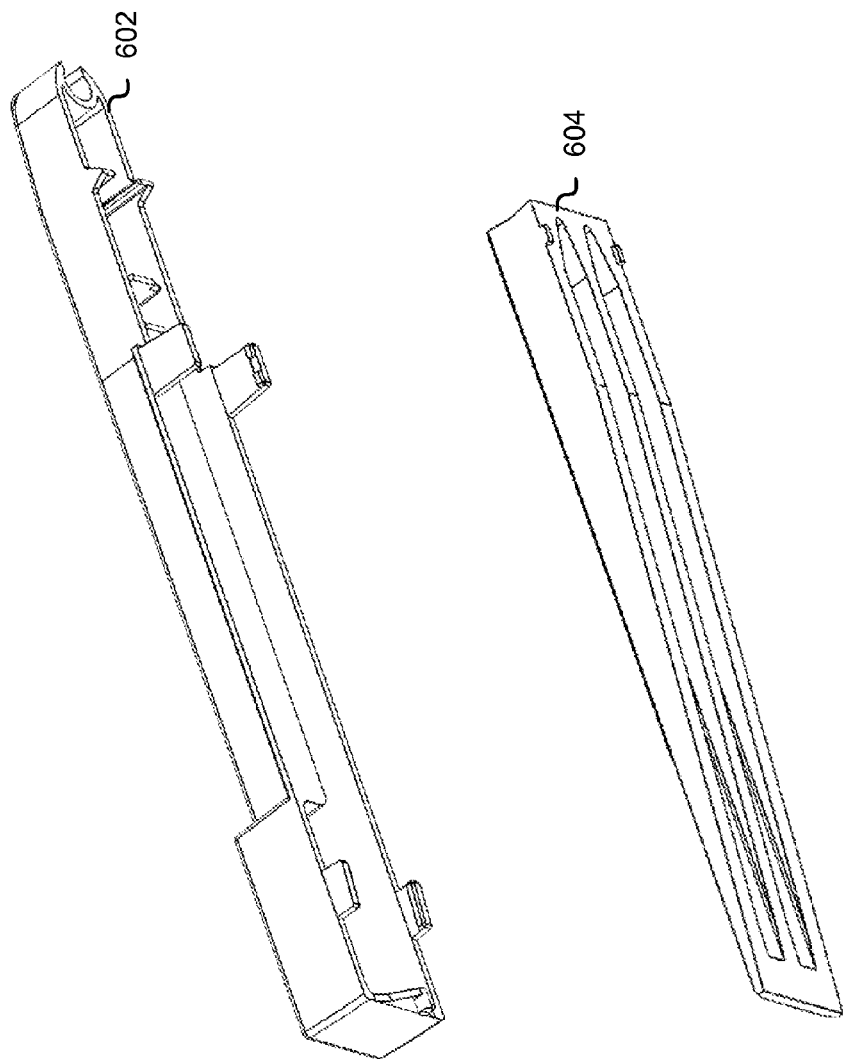

FIG. 6 illustrates the isometric bottom view of the example illuminable key described in connection with FIG. 2 and in accordance with at least one embodiment. The key body 602 is shown separated from the light guide 604.

Figure 7:
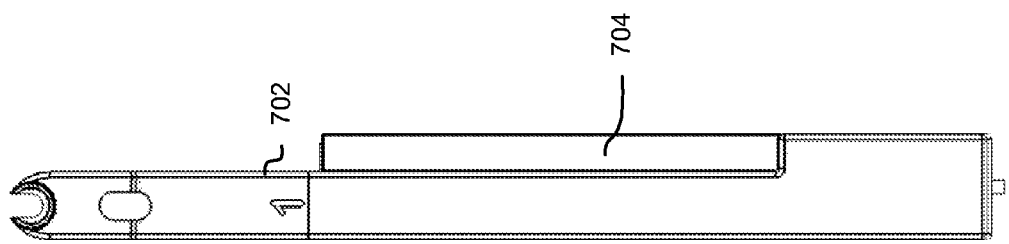

FIG. 7 illustrates a top view of the example illuminable key described in connection with FIG. 2 and in accordance with at least one embodiment. The key body 702 is shown along with a cutout area 704 such as the cutout area 208, described in connection with FIG. 2 and in accordance with at least one embodiment. The cutout area 704 allows for free movement of an adjacently placed black key as described herein.

Figure 8:
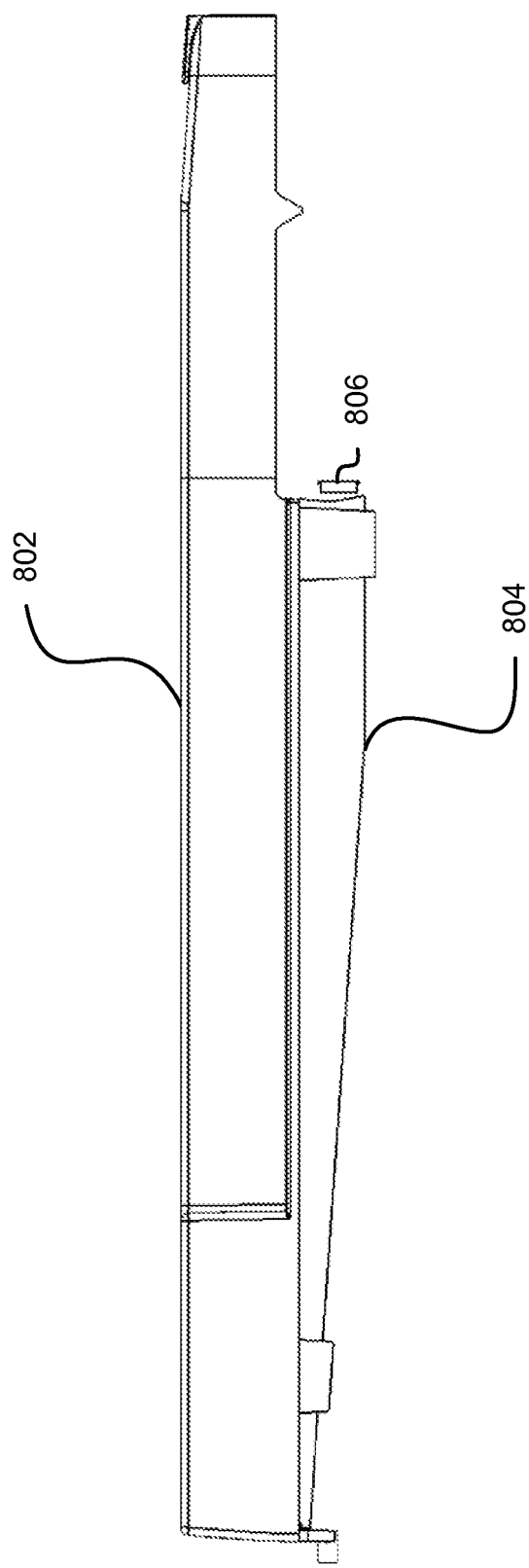

FIG. 8 illustrates a right side view of the example illuminable key as described in connection with FIG. 2 and in accordance with at least one embodiment. The key body 802 is shown connected to the light guide 804. The placement of the light source 806 is shown in relation to the light guide 804.

Figure 9:
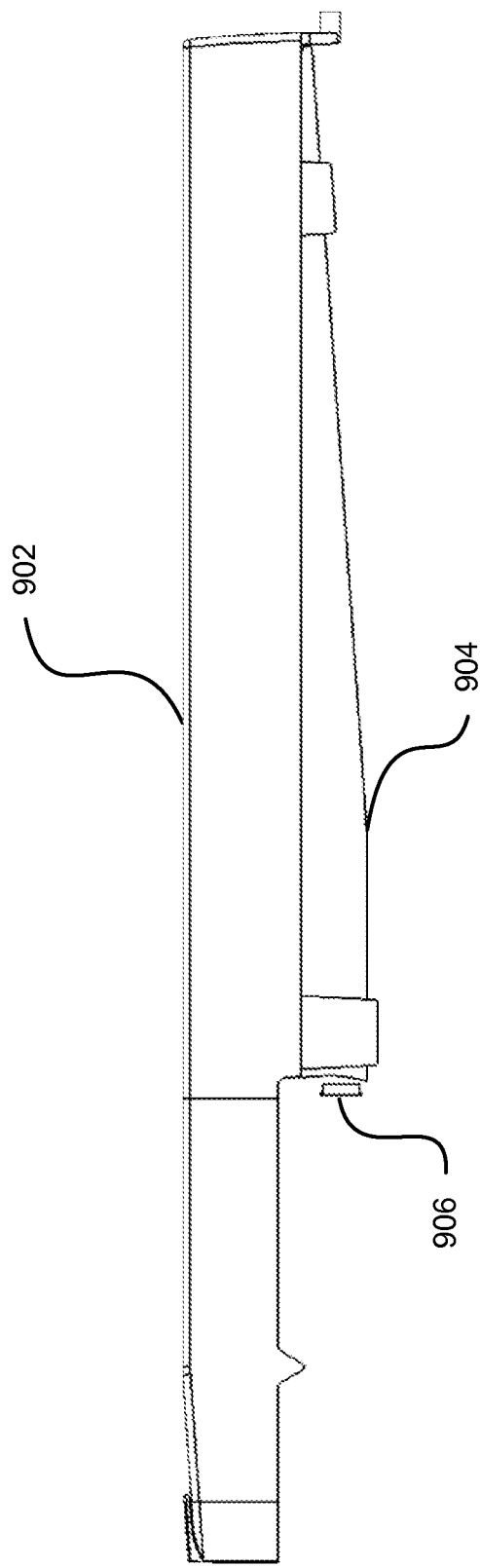

FIG. 9 illustrates a left side view of the example illuminable key as described in connection with FIG. 2 and in accordance with at least one embodiment. The key body 902 is shown connected to the light guide 904. The placement of the light source 906 is shown in relation to the light guide 904.

Figure 10:
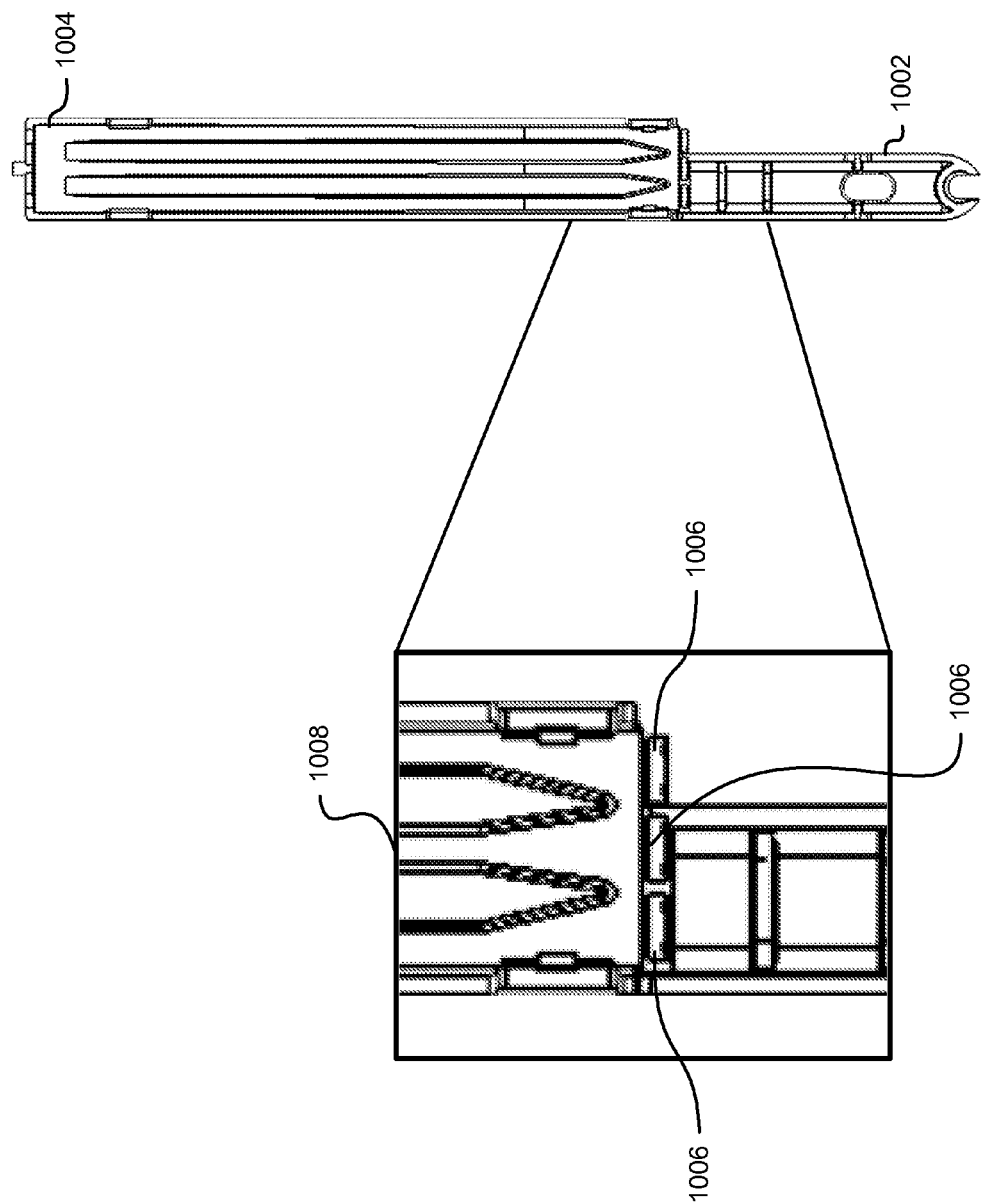

FIG. 10 illustrates a bottom view of the example illuminable key as described in connection with FIG. 2 and in accordance with at least one embodiment. The key body 1002 is shown connected to the light guide 1004. FIG. 10 also illustrates a close-up view 1008 of the example illuminable key indicating the placement of the light source 1006.

Figure 11:
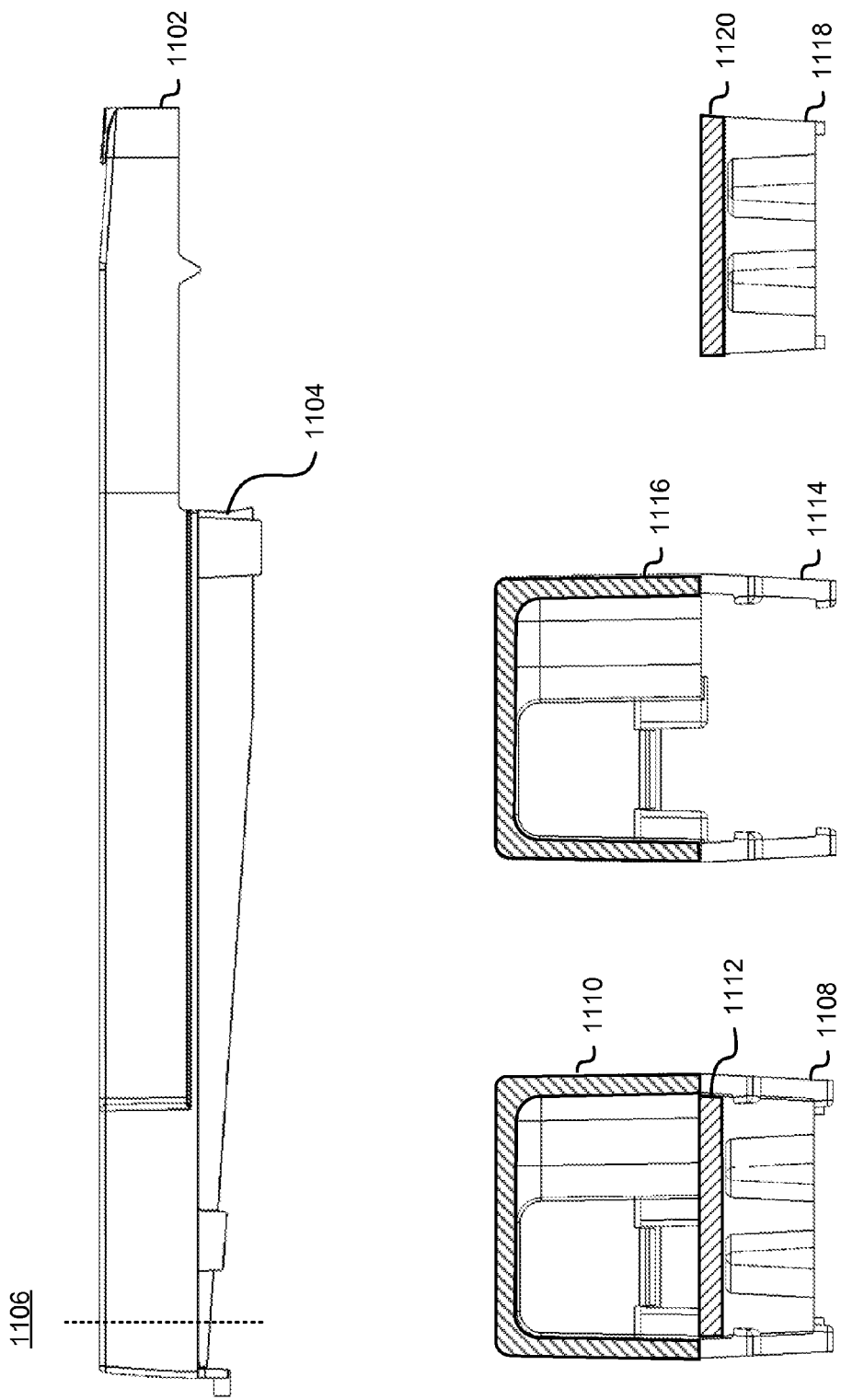

FIG. 11 illustrates three views of a first left-to-right cross-section of the example illuminable key as described in connection with FIG. 2 and in accordance with at least one embodiment. The key body 1102 is shown connected to the light guide 1104. The first view 1108 shows the cross-section at location 1106 and illustrates a cross-section of the key body 1110 and a cross-section of the light guide 1112 with the key body and the light guide connected to one another. The second view 1114 shows the cross-section of only the key body 1116 at location 1106. The third view 1118 shows the cross-section of only the light guide 1120 at location 1106.

Figure 12:
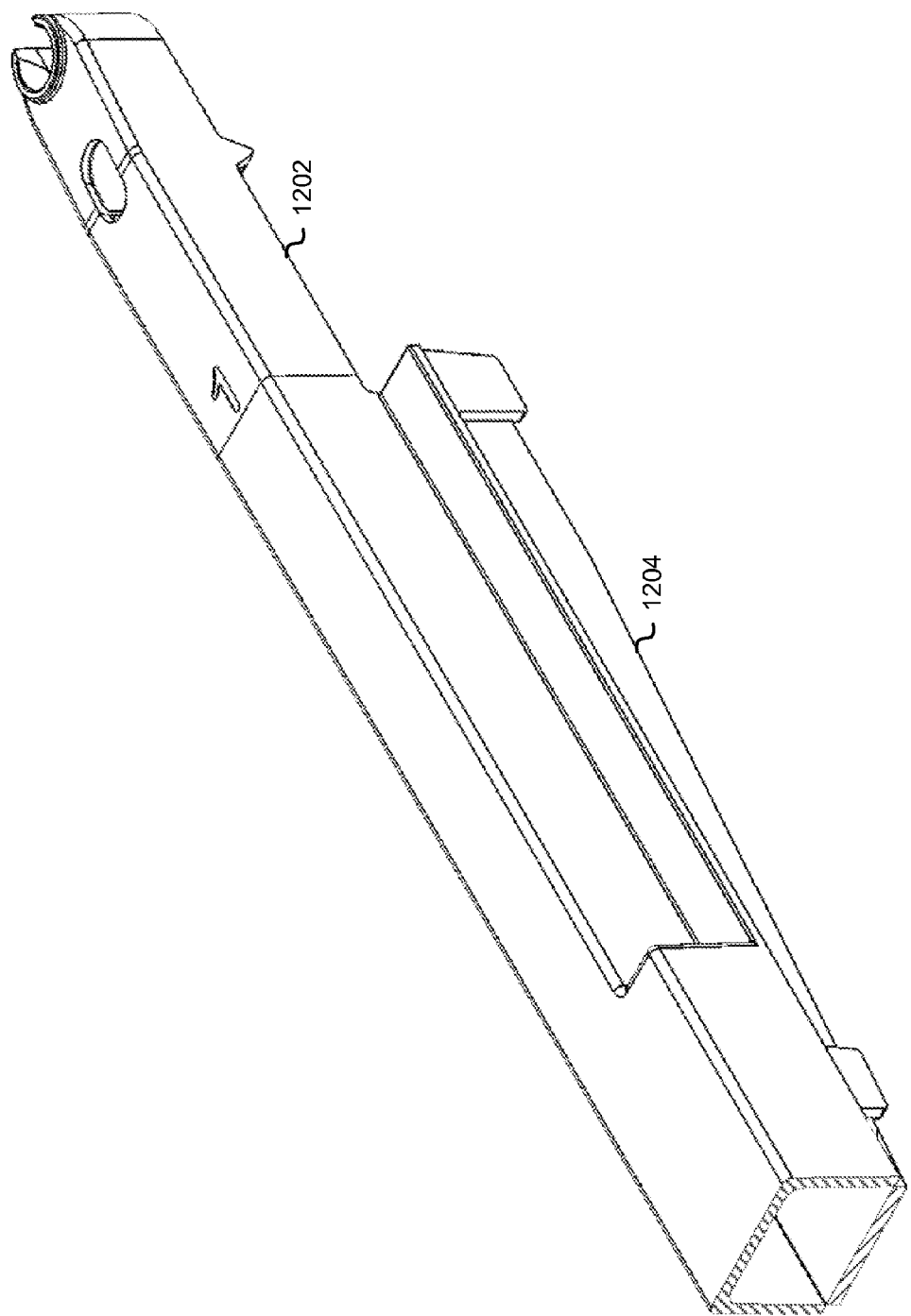

FIG. 12 illustrates an isometric view of the first left-to-right cross section of the example illuminable key as described in connection with FIG. 11 and in accordance with at least one embodiment. The key body 1202 is shown connected to the light guide 1204.

Figure 13:
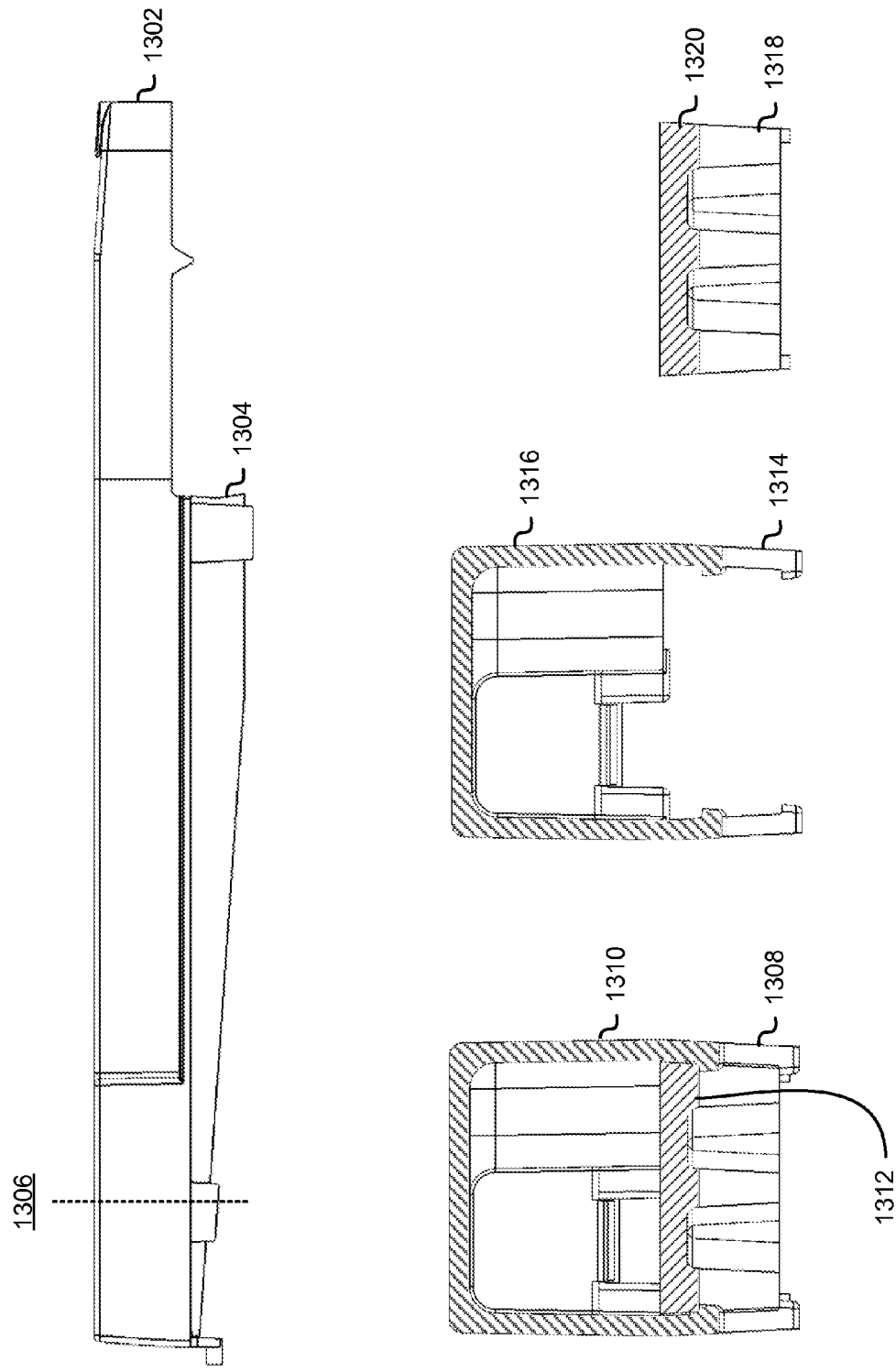

FIG. 13 illustrates three views of a second left-to-right cross-section of the example illuminable key as described in connection with FIG. 2 and in accordance with at least one embodiment. The key body 1302 is shown connected to the light guide 1304. The first view 1308 shows the cross-section at location 1306 and illustrates a cross-section of the key body 1310 and a cross-section of the light guide 1312 with the key body and the light guide connected to one another. The second view 1314 shows the cross-section of only the key body 1316 at location 1306. The third view 1318 shows the cross-section of only the light guide 1320 at location 1306.

Figure 14:
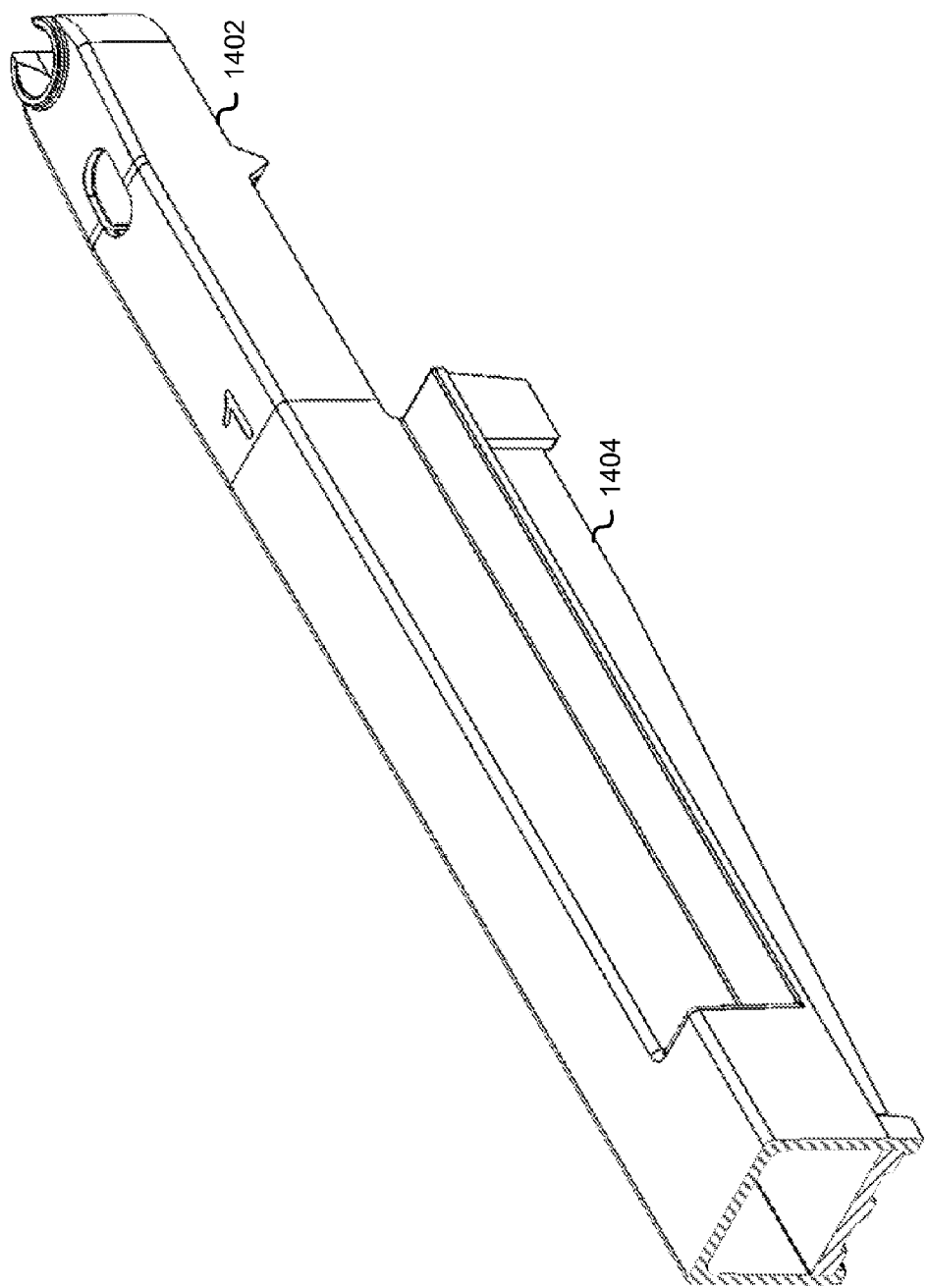

FIG. 14 illustrates an isometric view of the second left-to-right cross section of the example illuminable key as described in connection with FIG. 13 and in accordance with at least one embodiment. The key body 1402 is shown connected to the light guide 1404.

Figure 15:
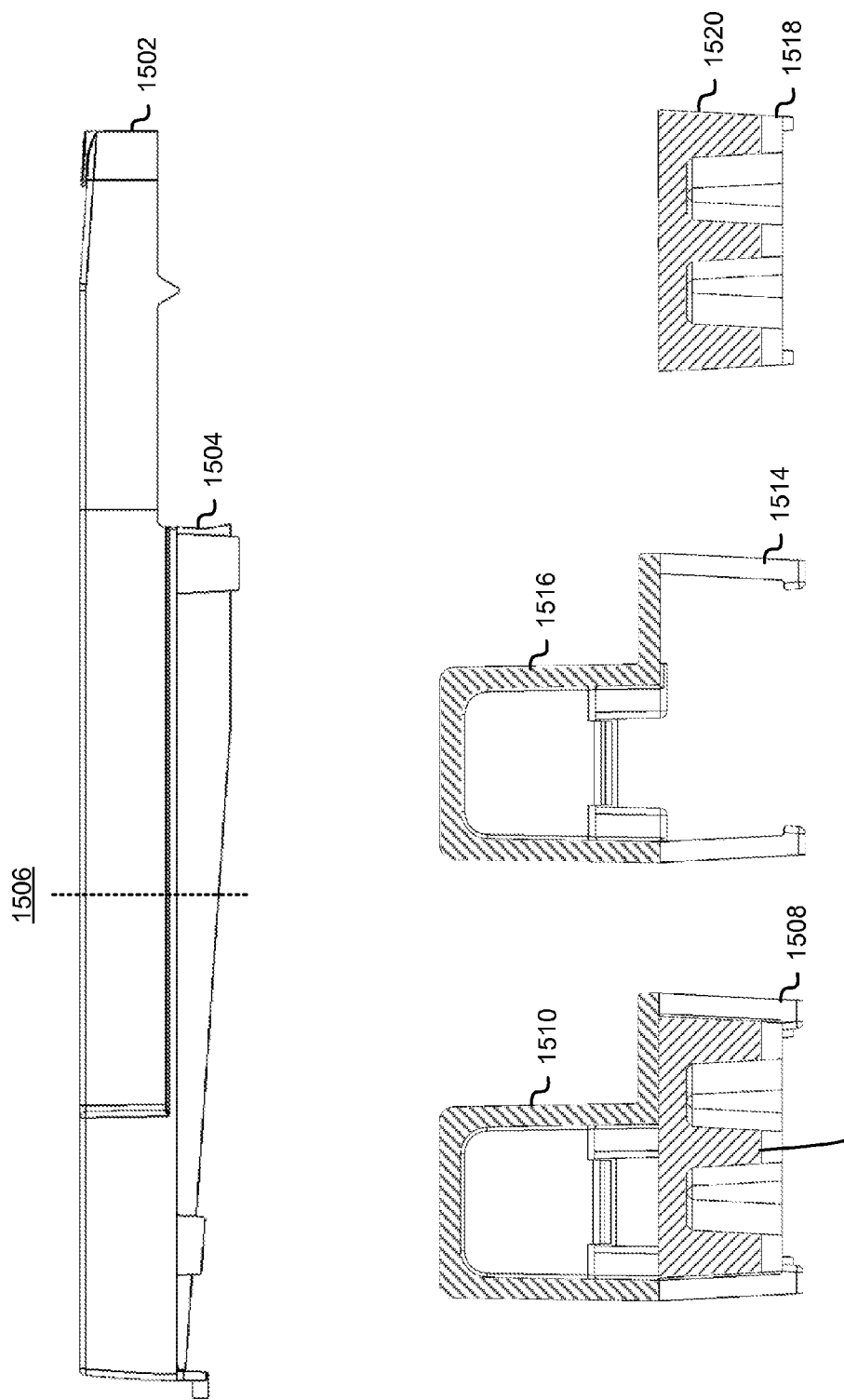

FIG. 15 illustrates three views of a third left-to-right cross-section of the example illuminable key as described in connection with FIG. 2 and in accordance with at least one embodiment. The key body 1502 is shown connected to the light guide 1504. The first view 1508 shows the cross-section at location 1506 and illustrates a cross-section of the key body 1510 and a cross-section of the light guide 1512 with the key body and the light guide connected to one another. The second view 1514 shows the cross-section of only the key body 1516 at location 1506. The third view 1518 shows the cross-section of only the light guide 1520 at location 1506.

Figure 16:
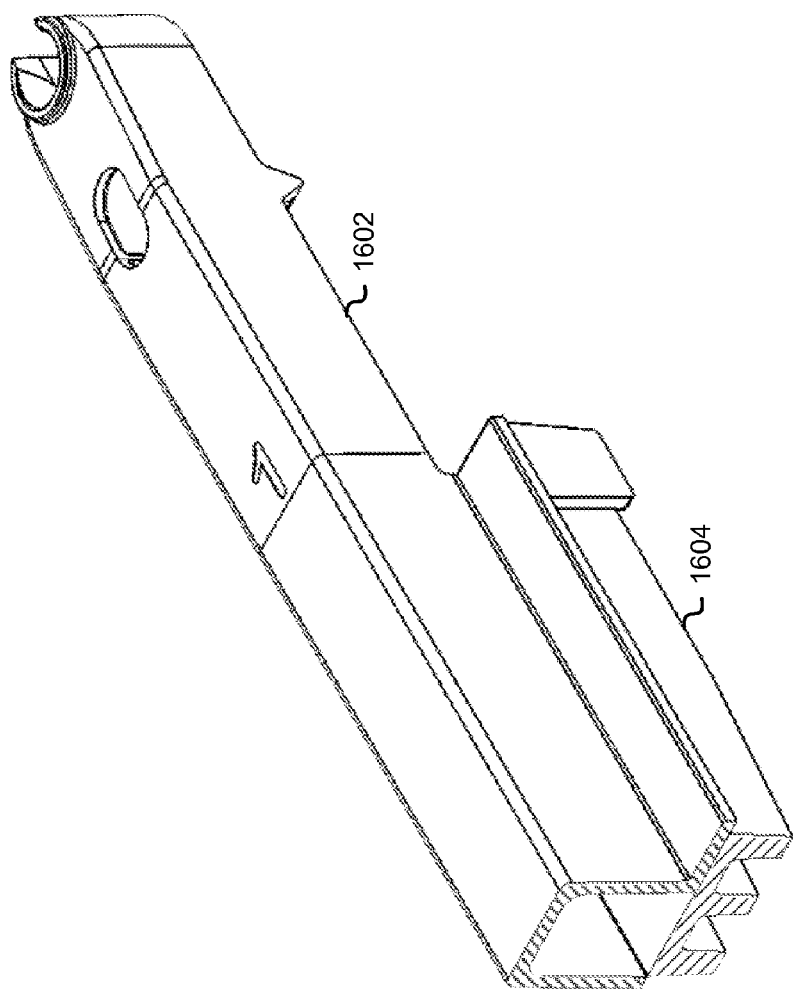

FIG. 16 illustrates an isometric view of the third left-to-right cross section of the example illuminable key as described in connection with FIG. 15 and in accordance with at least one embodiment. The key body 1602 is shown connected to the light guide 1604.

Figure 17:
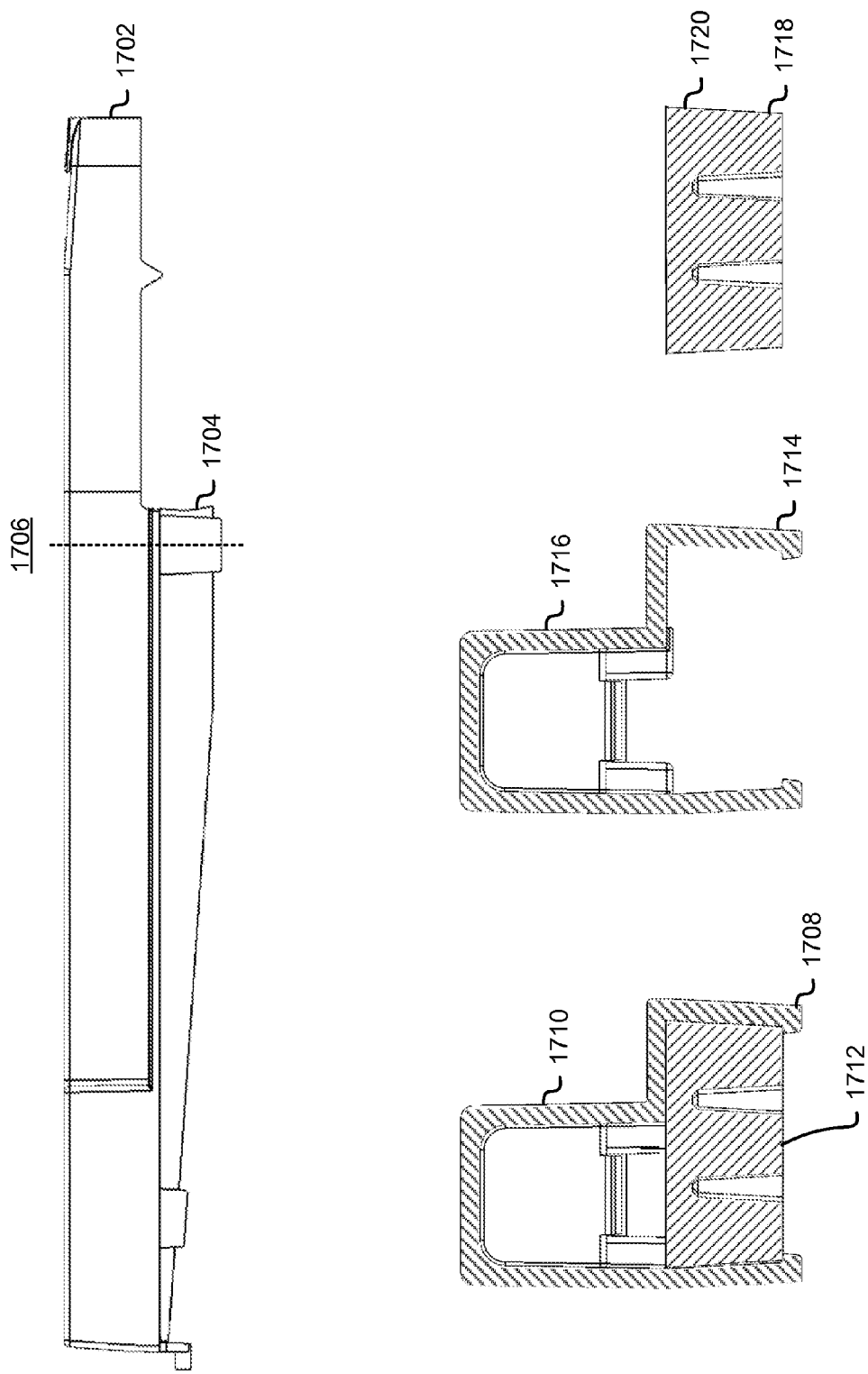

FIG. 17 illustrates three views of a fourth left-to-right cross-section of the example illuminable key as described in connection with FIG. 2 and in accordance with at least one embodiment. The key body 1702 is shown connected to the light guide 1704. The first view 1708 shows the cross-section at location 1706 and illustrates a cross-section of the key body 1710 and a cross-section of the light guide 1712 with the key body and the light guide connected to one another. The second view 1714 shows the cross-section of only the key body 1716 at location 1706. The third view 1718 shows the cross-section of only the light guide 1720 at location 1706.

Figure 18:
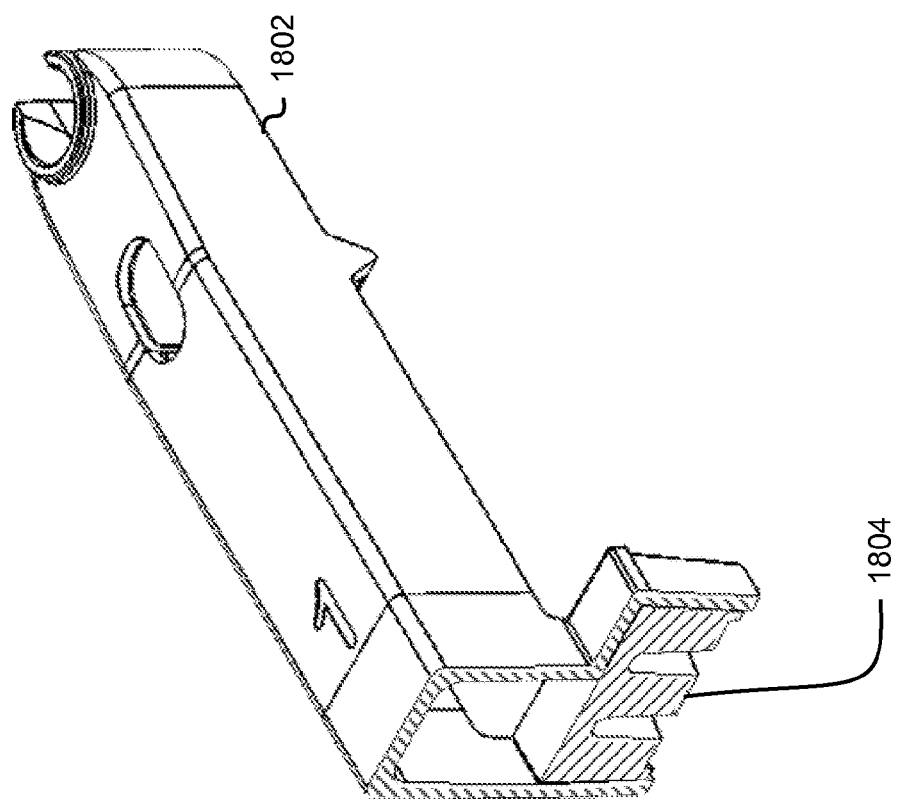

FIG. 18 illustrates an isometric view of the fourth left-to-right cross section of the example illuminable key as described in connection with FIG. 17 and in accordance with at least one embodiment. The key body 1802 is shown connected to the light guide 1804.

Figure 19:
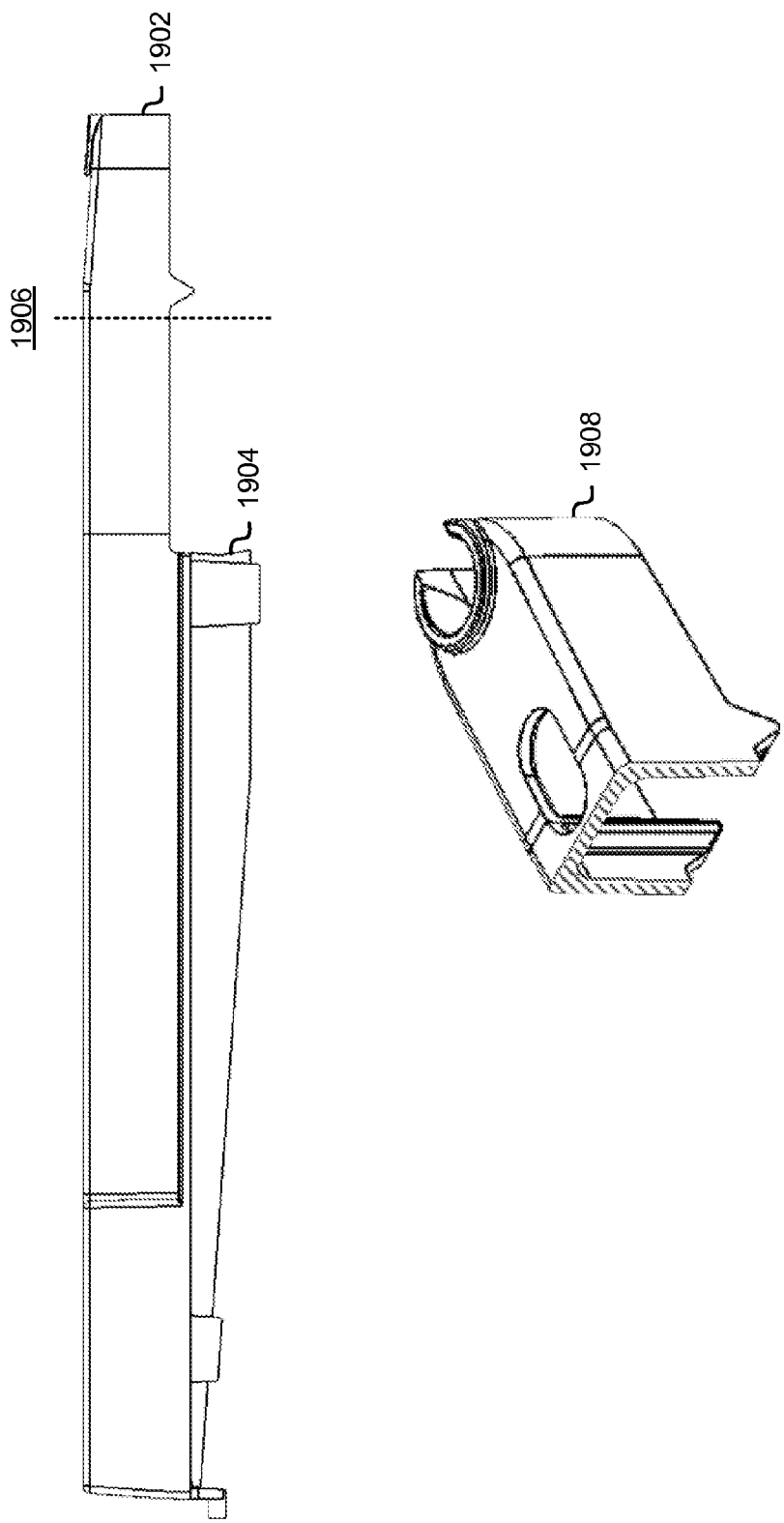

FIG. 19 illustrates an isometric view of a fifth left-to-right cross-section of the example illuminable key as described in connection with FIG. 2 and in accordance with at least one embodiment. The key body 1902 is shown connected to the light guide 1904. The isometric view 1908 shows the cross-section at location 1906.

Figure 20:
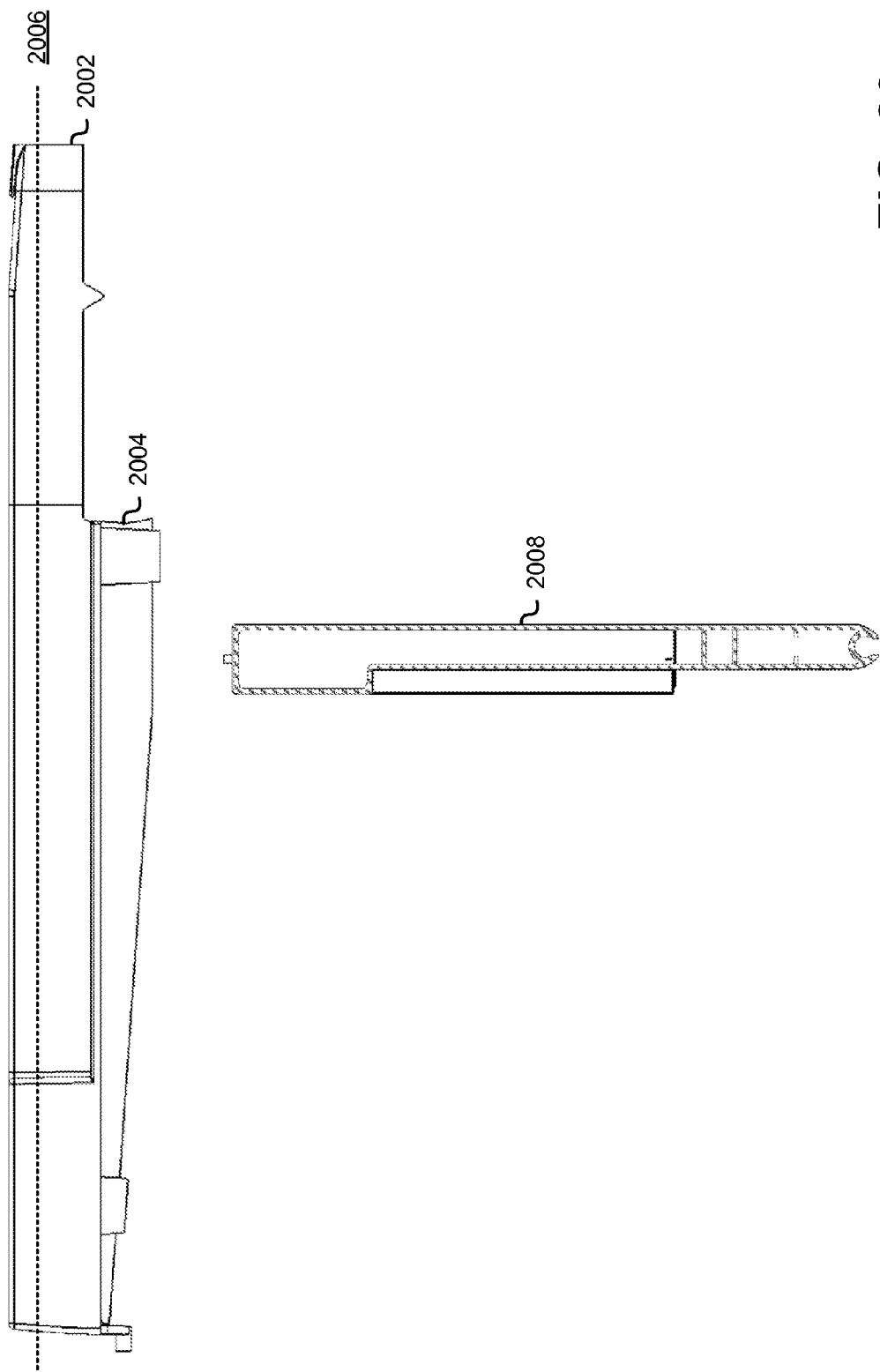

FIG. 20 illustrates a view of a first front-to-back cross-section of the example illuminable key as described in connection with FIG. 2 and in accordance with at least one embodiment. The key body 2002 is shown connected to the light guide 2004. The view shows the cross-section at location 2006 of the key body 2008.

Figure 21:
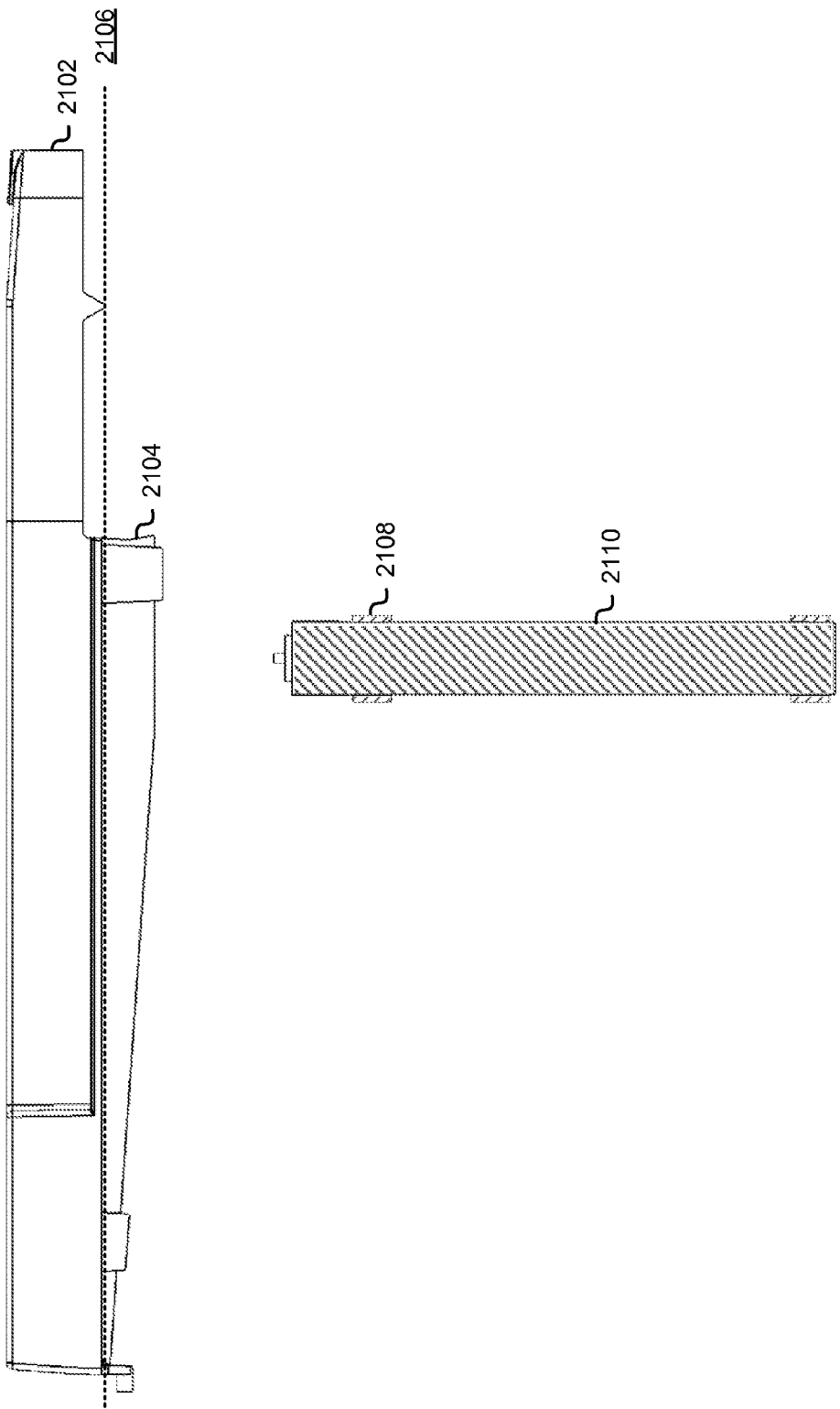

FIG. 21 illustrates a view of a second front-to-back cross-section of the example illuminable key as described in connection with FIG. 2 and in accordance with at least one embodiment. The key body 2102 is shown connected to the light guide 2104. The view shows the cross-section at location 2106 of the key body 2108 and the cross section at location 2106 of the light guide 2110.

Figure 22:
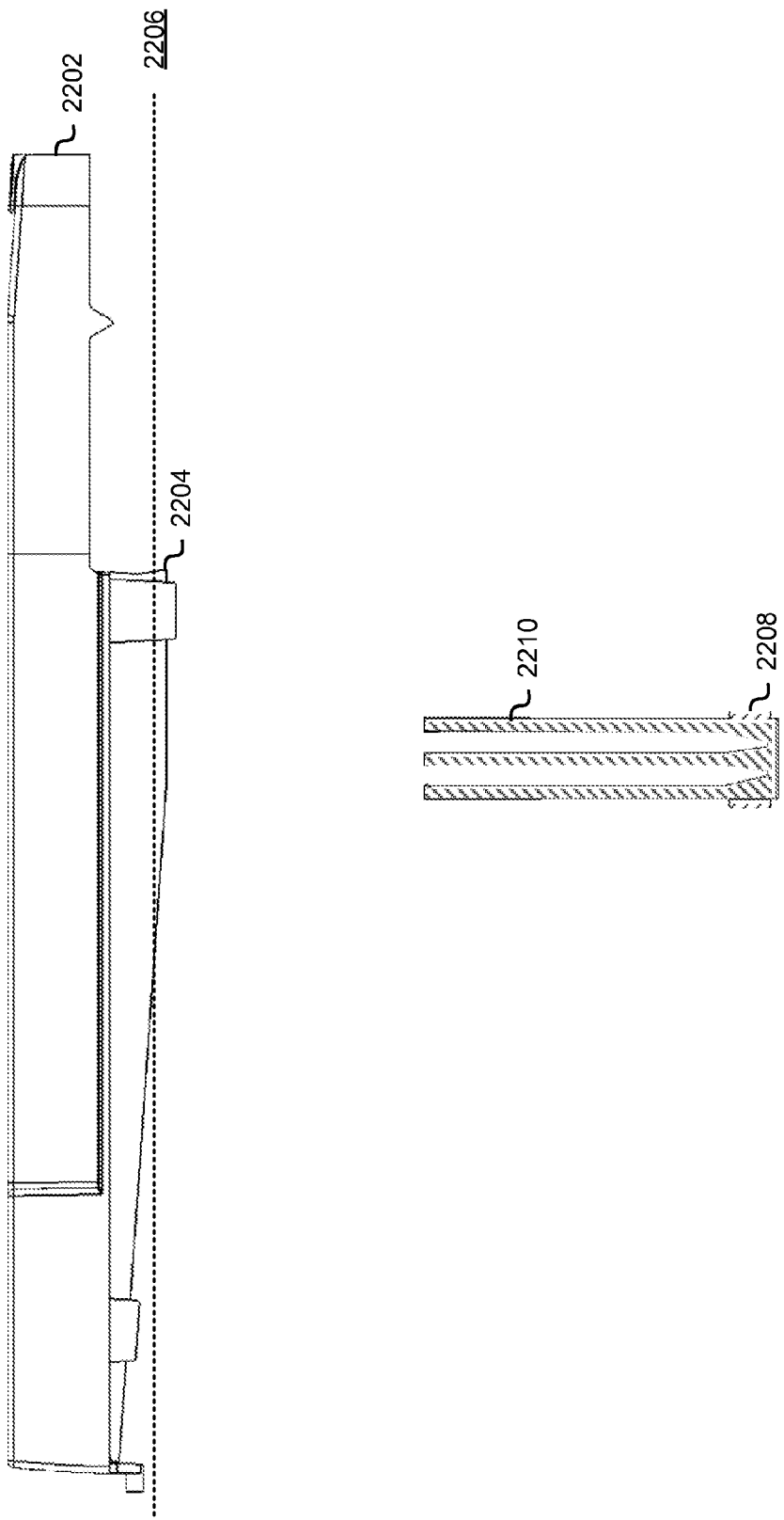

FIG. 22 illustrates a view of a third front-to-back cross-section of the example illuminable key as described in connection with FIG. 2 and in accordance with at least one embodiment. The key body 2202 is shown connected to the light guide 2204. The view shows the cross-section at location 2206 of the key body 2208 and the cross section at location 2206 of the light guide 2210.

Figure 23:
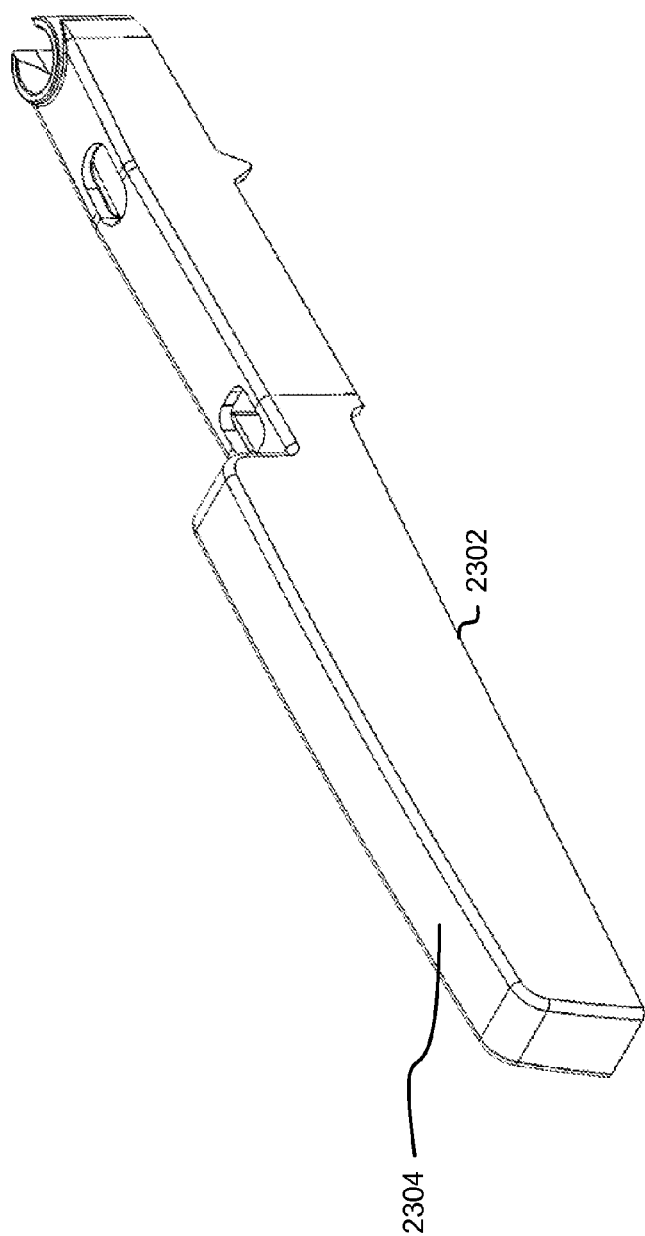
FIGS. 23 to 35 illustrate aspects of a second piano key type of an interactive piano training device in accordance with an embodiment.

FIG. 23 illustrates an isometric top view of an example illuminable key for an interactive piano training device such as the interactive piano training device described in connection with FIG. 1 and in accordance with at least one embodiment. The example illuminable key illustrated in FIG. 23 is an example of a second key type. For convenience, the second key type may also be referred to herein as a "black" key. In this context, the use of the word "black" should be understood to refer to the type of key rather than to the color (or any other optical properties) of the key type. For example, a "black" key may be black, may be white, may be some other color, or may be a combination of colors.

The key body 2302 is illustrated in FIG. 23. The example illuminable key illustrated in FIG. 23 also includes an associated light guide such as the light guide 204 described in connection with FIG. 2 and in accordance with at least one embodiment and an associated light source such as the light source 206 also described in connection with FIG. 2 and also in accordance with at least one embodiment although neither the light guide nor the light source is visible in the isometric top view illustrated in FIG. 23. As with the key body 202 of the white key described herein, the key body 2302 may be solid, may be hollow, or may contain both solid and hollow sections and may be manufactured with one or more optical properties related to the transmission of light through the key and/or through a portion of the key. For example, the key body 2302 may be manufactured of a material that partially diffuses the light emitted from the top surface of the key, thus producing a more even light distribution from the top surface of the key body. In an embodiment, the key body 2302 can be manufactured from a polycarbonate with one or more light diffusion properties, with one or more manufacturing properties and/or with one or more durability properties. The properties may include, but may not be limited to, material strength properties, molding properties, impact resistance properties and/or other such properties.

In an embodiment, a key body material such as Sabic™ Lexan™ FXD1414T may be used to manufacture the key body 2302. In such an embodiment, the key body material has a yielding tensile stress of 600 kgf/cm$^2$, a breaking tensile stress of 520 kgf/cm$^2$, and a tensile modulus of 22,800 kgf/cm$^2$ (each for a 50 mm piece, minimum). In such an embodiment, the key body material has an instrumented impact total energy of 774 cm-kgf at 23° C. and a specific gravity of 1.18. In an embodiment where the key body 2302 is injection molded, the key body material has one or more properties associated with the injection molding process including a drying temperature of 120° C., a cumulative drying time of 48 hours, a melt temperature between 295° C. and 315° C. (inclusive), and a mold temperature of between 70° C. and 95° C. (inclusive). The key body 2302 may also be manufactured of other materials such as, acrylics, polyesters, halogenated plastics and other such plastics with acceptable light diffusion properties and with one or more other acceptable manufacturing and/or durability properties such as the properties mentioned herein.

The key body 2302 may also be manufactured such that light may primarily shine through the key body only along certain axes. For example, the key body 2302 may be manufactured such that light from below the key may shine through the top of the key, but most or all of that light is prevented from shining through the sides of the key. Light may be transmitted along some axes and prevented along other axes using, for example, certain materials of manufacture, certain coatings, certain geometries and/or other such manufacturing techniques. For example, certain plastics may allow better or more even light transmission, opaque coatings (applied by, for example, painting or pad printing) applied to the sides of the key (i.e., between keys) may prevent light transmission to neighboring keys, opaque parts placed in proximity to the key (e.g., between keys) may prevent light transmission to neighboring keys. As a result, some faces of the key body 2302 may be translucent (e.g., allow transmission of light), some faces of the key body 2302 may be opaque (e.g., prevent transmission of light), and some faces may by partially translucent and partially opaque (e.g., allow some transmission of some light and prevent some transmission of some light). The key body 2302 illustrated in FIG. 23 is translucent on the top face (allows light from below to shine through) and opaque on the left side face and the right side face. In some embodiments, the key body 2302 may be translucent on a portion of the front face. In some other embodiments, the key body 2302 may be opaque on the front face. The top surface of the key body 2302 may be at least partially smooth and/or shiny. The portion of the top surface of the key that is the playing surface 2304 (also referred to herein as the "striking surface") is the portion of the top surface of the key that is pressed to cause the key to move (e.g., pivot about a pivot point as described herein).

Figure 24:
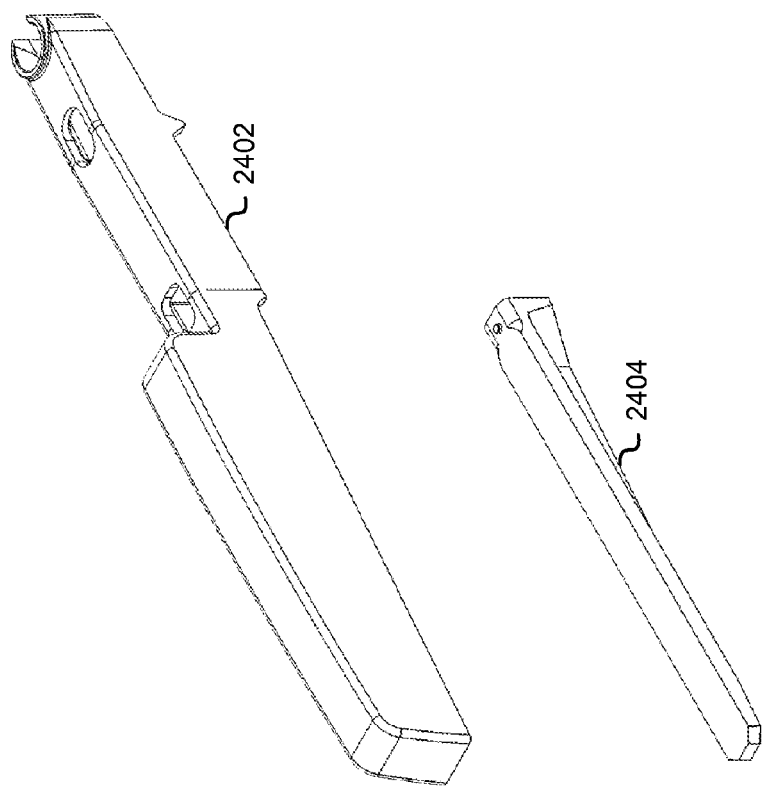

FIG. 24 illustrates the isometric top view of the example illuminable key described in connection with FIG. 23 and in accordance with at least one embodiment. The key body 2402 is shown separated from the light guide 2404. As with the key body 2302 described in connection with FIG. 23 and in accordance with at least one embodiment, the light guide 2404 may be solid, may be hollow, or may contain both solid and hollow sections. The light guide 2404 may include one or more optical properties. For example, the light guide 2404 may be manufactured such that light may shine through the key when illuminated using a light source as described herein. In an embodiment, the light guide 2404 can be manufactured from a plastic such as an optical-grade acrylic with acceptable light transmission properties (e.g., index of reflection, index of refraction, etc.) and also with one or more manufacturing and/or durability properties including, but not limited to, material strength properties, molding properties, impact resistance properties and/or other such properties. The light guide 2404 may also be manufactured of other materials such as glass, polycarbonate, polyester, halogenated plastic and other such plastics with acceptable alight transmission properties and with one or more other manufacturing and/or durability properties. The light guide 2404 may also be manufactured such that light may shine through the light guide 2404 only along certain axes. The light guide 2404 may also be manufactured such that light may more readily, more brightly and/or more evenly shine through the light guide 2404 along certain axes. For example, the light guide 2404 may be manufactured such that light from behind the light guide 2404 may shine evenly and brightly throughout the light guide 2404 as described herein.

The light guide 2404 may be wedge shaped. The wedge shape of the light guide 2404 (illustrated more clearly in FIG. 26) may use the principles of internal refraction to facilitate even spreading of light from the back to the front of the light guide as described in connection with the light guide 204 described in connection with FIG. 2. Other aspects of the manufacture of the light guide may alter the transmission of light through the interactive piano training device. For example, coatings on the sides and/or the bottom of the light guide may prevent light from transmitting through these surfaces, adding internal reflection and increasing the overall luminance of the light. Coatings and/or alterations to the top surface of the light guide may diffuse the light emitting from this surface, thereby reducing "hot spots" and aiding in the even emission of light from the top surface as described in connection with the light guide 204 described in connection with FIG. 2. Additionally, the concentration of material in the middle of the light guide (along the front-to-back axis) may make the center of the light guide brighter and/or concentrate more light emission along this center. Various coatings may be constructed in various ways in accordance with various embodiments, such as by painting coatings on, by adhering additional layers of material (e.g., of a plastic), by adhering different materials (e.g., a metal coating), by etching, or in combinations of these and/or other such application methods. As with the optical properties of the key body 2302 described in connection with FIG. 23 and in accordance with at least one embodiment, the optical properties of the light guide 2404 may be obtained by certain materials of manufacture, certain coatings, certain geometries, certain placements and/or other such manufacturing techniques. The light guide 2404 illustrated in FIG. 24 is translucent on the top face, opaque on the left side face and on the right side face and allows light from a light source at the back of the light guide to be evenly distributed throughout the light guide.

Figure 25:
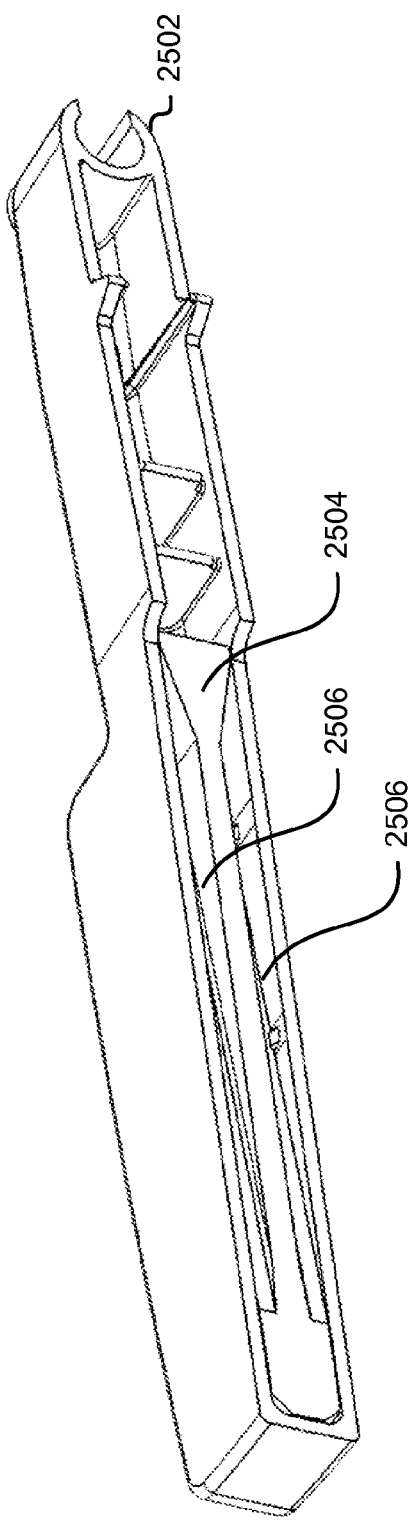

FIG. 25 illustrates a first isometric bottom view of the example illuminable key described in connection with FIG. 23 and in accordance with at least one embodiment. The key body 2502 is shown connected to the light guide 2504. The light guide 2504 illustrated in FIG. 25 has two cutouts 2506 which may, as with the two cutouts 506 described in connection with FIG. 5, in some embodiments, improve the light transmission properties of the light guide and which may also aid in the manufacturing process of the light guide. For example, the two cutouts 2506 may reduce the overall thickness of the light guide along any axis (e.g., top-to-bottom, left-to-right, and front-to-back), thereby making the light guide more easily manufactured using a technique such as injection molding.

Figure 26:
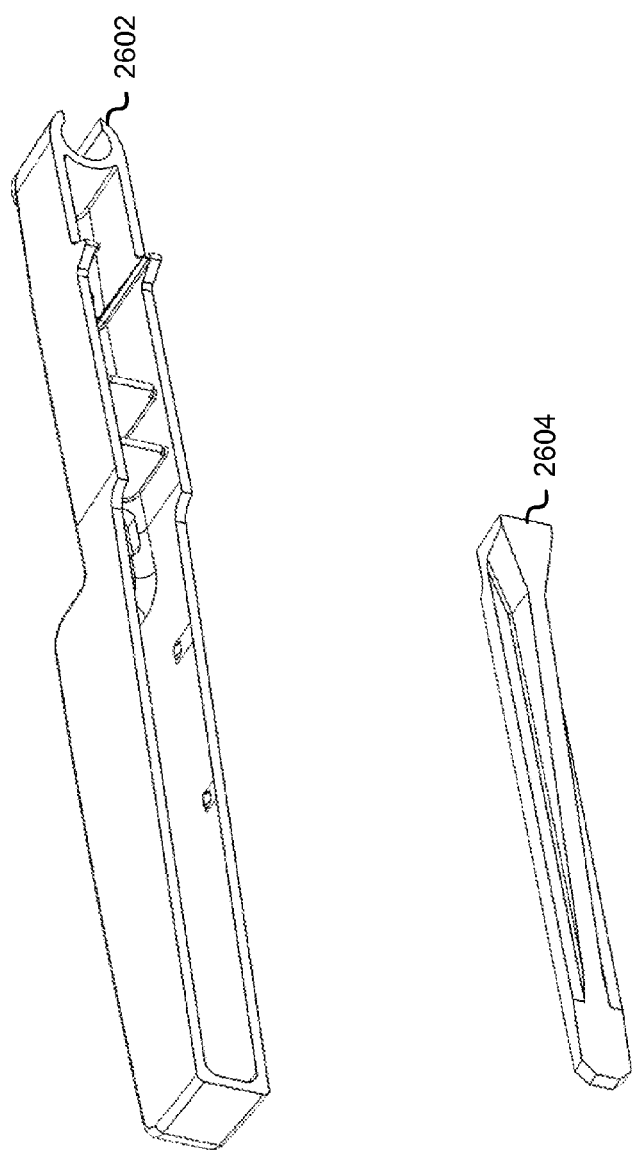

FIG. 26 illustrates the first isometric bottom view of the example illuminable key described in connection with FIG. 23 and in accordance with at least one embodiment. The key body 2602 is shown separated from the light guide 2604.

Figure 27:
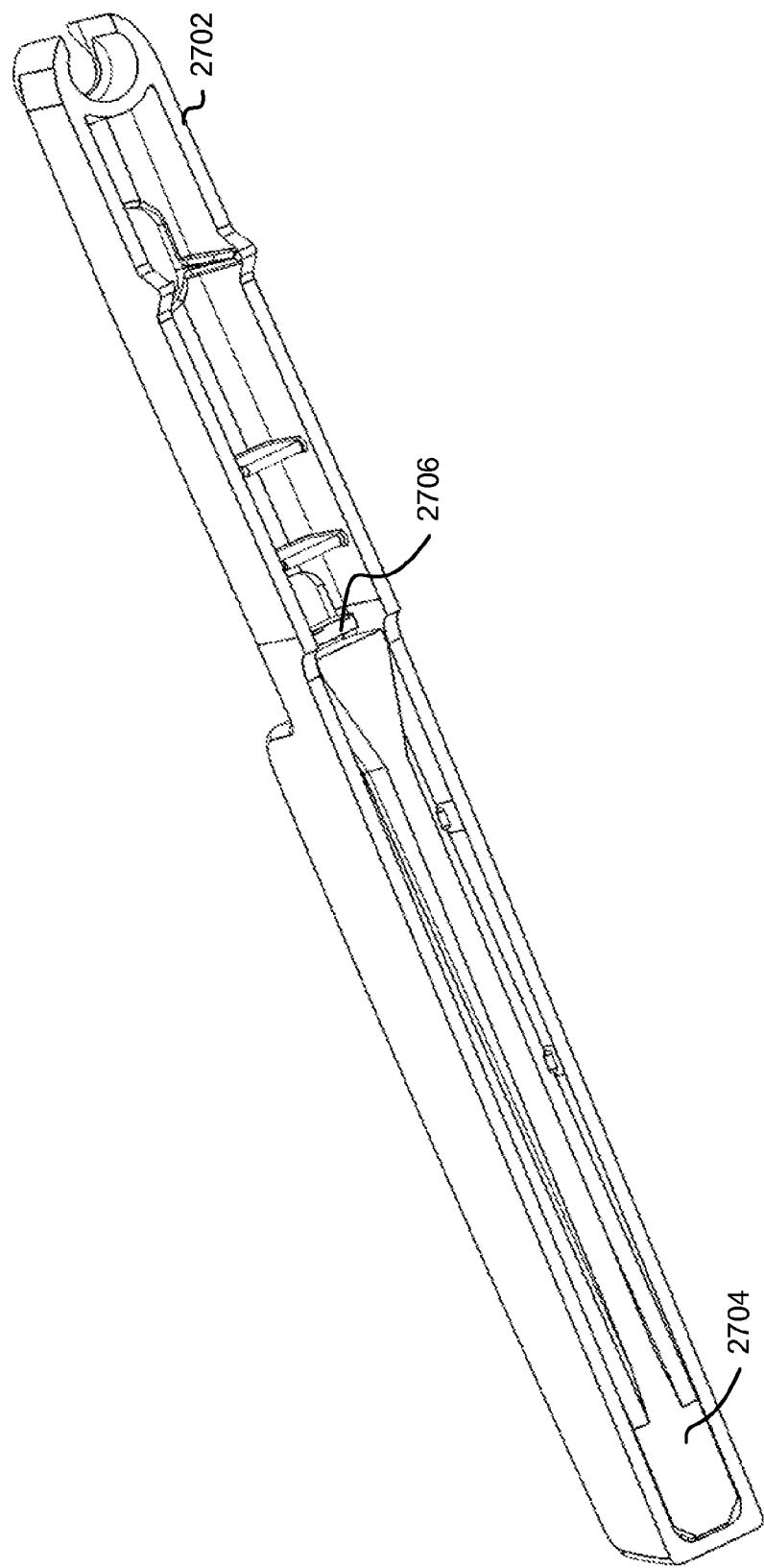

FIG. 27 illustrates a second isometric bottom view of the example illuminable key described in connection with FIG. 23 and in accordance with at least one embodiment. The key body 2702 is shown connected to the light guide 2704. The placement of the light source 2706 is shown in relation to the light guide 2704 and is oriented to project a beam of light with a center that is parallel to the top surface of the key body 2702. In some embodiments, the light source 2706 may be placed in other locations relative to the light guide and/or relative to the illuminable key such as below but not behind, behind but not below, to the left or right side, in front of, or other such relative locations. The light source 2706 is illustrated in FIG. 27 placed at the back of the light guide 2704 and below the key body 2702. The light source 2706 is oriented to shine into the light guide 2704. In some embodiments, the light source may be oriented such that the center of the beam does not initially pass into the light guide (e.g., it is oriented such that the center of the beam points away from the light guide). In such embodiments the light source may be redirected toward the light guide using mirrors and/or lenses as described herein.

The light source 2706 may include one or more lights (the example illustrated in FIG. 27 shows one light). The light source 2706 may be configured to illuminate the one or more lights according to signals received from one or more controllers as described herein. For example, a controller may send a signal to a light source to turn on at a certain time, or to change to a certain color, or to turn off, or other such signals. As described herein, the light source 2706 may be dynamically controlled to allow changes in the brightness and/or the color of the light. For example, the light source 2706 may include one or more broad-spectrum light emitting diodes (LEDs) that may have both their brightness and their color controlled by a computer system such as the interactive piano training device 104 and/or a controller 106 illustrated herein at least in connection with FIG. 1 and in accordance with at least one embodiment. Broad-spectrum LEDs are electronic components that are capable of emitting light in multiple colors and/or at multiple levels of brightness. For example, a broad-spectrum LED may be configured to emit red light at a plurality of intensities or brightnesses, to emit blue light at a plurality of intensities or brightnesses, to emit green light at a plurality of intensities or brightnesses, or to emit a combination of one or more intensities of red light, blue light and/or green light. In an embodiment where combinations of one or more intensities of red light, blue light and/or green light may be emitted, a near complete spectrum (also referred to as a "near full spectrum") of visible light colors may be produced by a broad spectrum LED.

In some embodiments, the light source 2706 may also include one or more light processing elements including, but not limited to, mirrors, shutters, lenses and the like which may alter the transmission of the light using one or more methods. For example, the light source may be configured to always shine and the intensity of the light may be controlled by opening and closing a shutter in front of the light. Similarly, the light source may be oriented in a direction other than toward the front of the illuminable key and the light may be redirected using one or more reflective surfaces (e.g., a mirror) and/or one or more refractive elements (e.g., a lens). As may be contemplated, the light processing elements and the methods of altering the transmission of the light described herein are illustrative examples and other such light processing elements and light transmission alteration methods may be considered as within the scope of the present disclosure.

Figure 28:
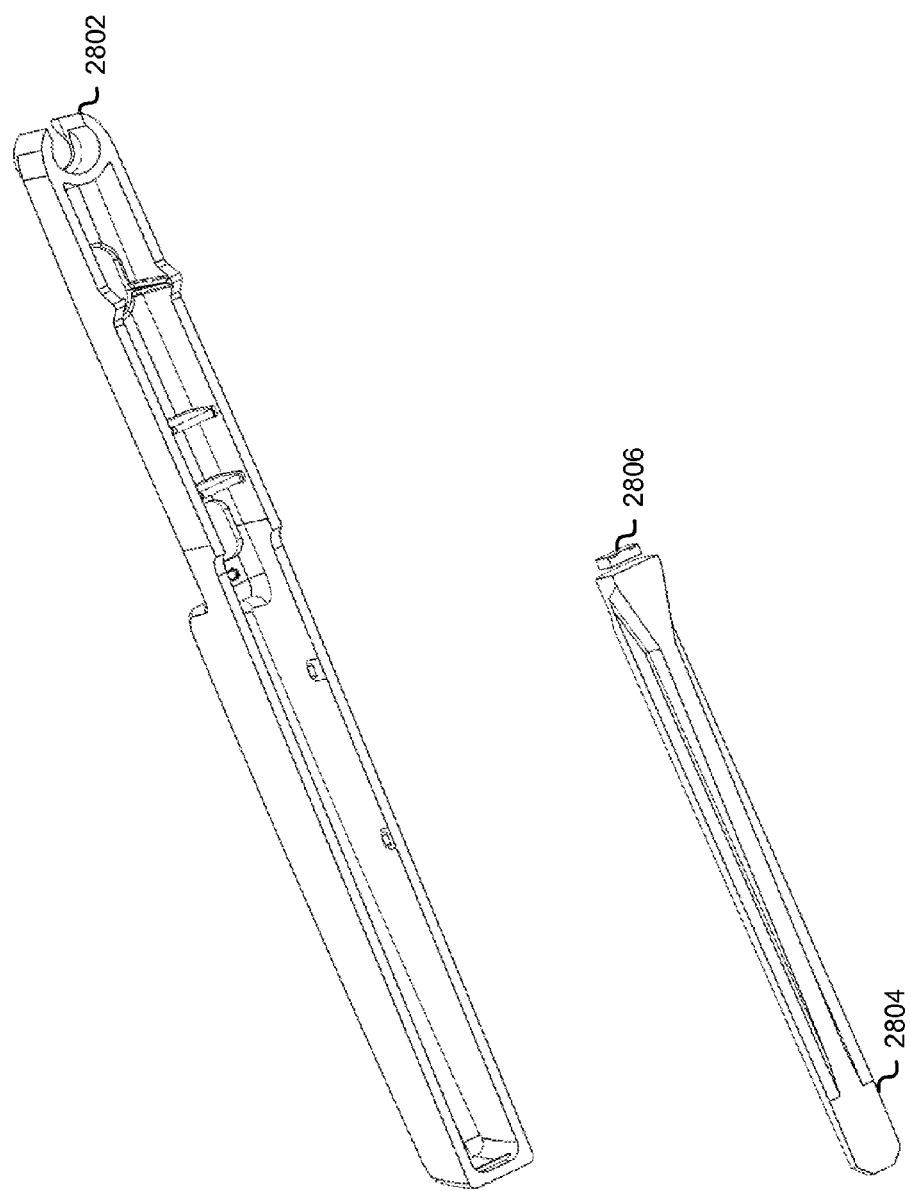

FIG. 28 illustrates the second isometric bottom view of the example illuminable key described in connection with FIG. 23 and in accordance with at least one embodiment. The key body 2802 is shown separated from the light guide. The placement of the light source 2806 is shown in relation to the light guide 2804.

Figure 29:
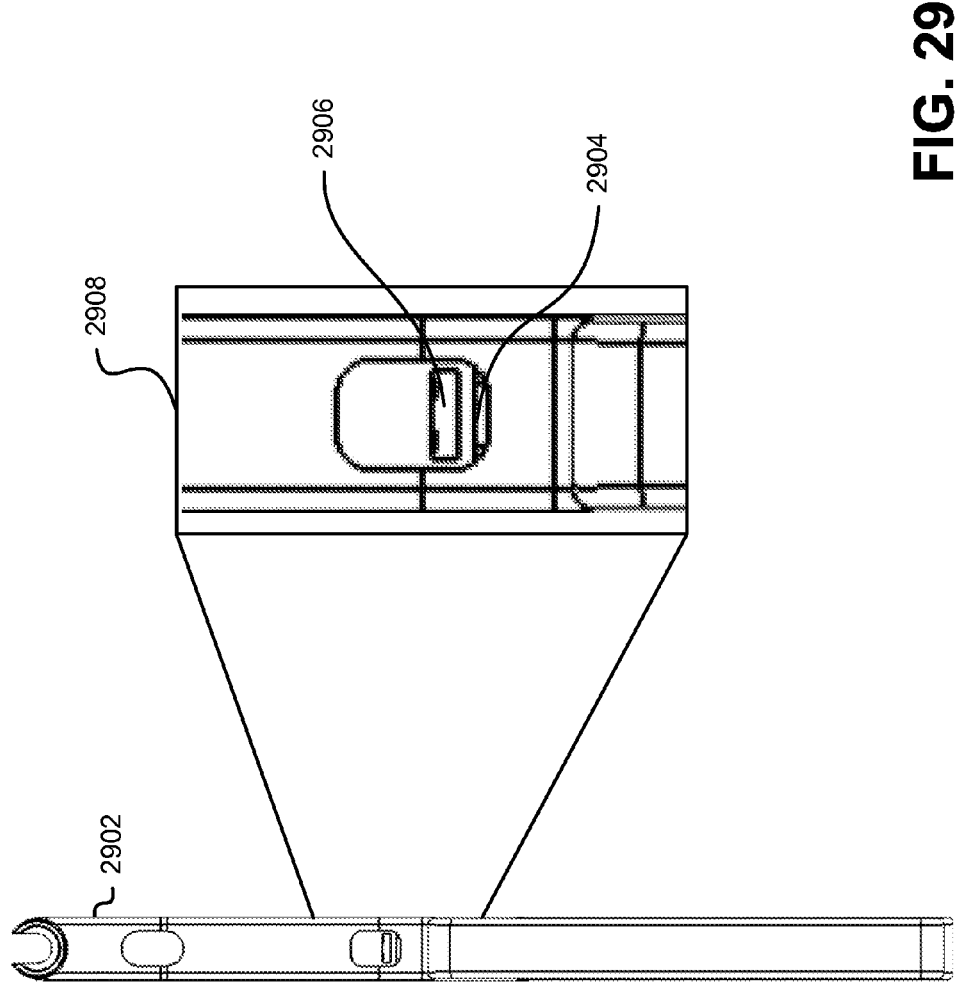

FIG. 29 illustrates a top view of the example illuminable key as described in connection with FIG. 23 and in accordance with at least one embodiment. The key body 2902 is shown connected to the light guide 2904. FIG. 29 also illustrates a close-up view 2908 of the example illuminable key indicating the location of the light guide 2904 and the placement of the light source 2906 in relation to the light guide 2904.

Figure 30:
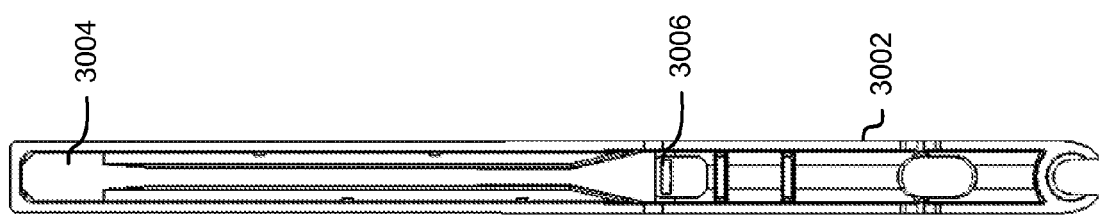

FIG. 30 illustrates a bottom view of the example illuminable key as described in connection with FIG. 23 and in accordance with at least one embodiment. The key body 3002 is shown connected to the light guide 3004. The placement of the light source 3006 is shown in relation to the light guide 3004.

Figure 31:
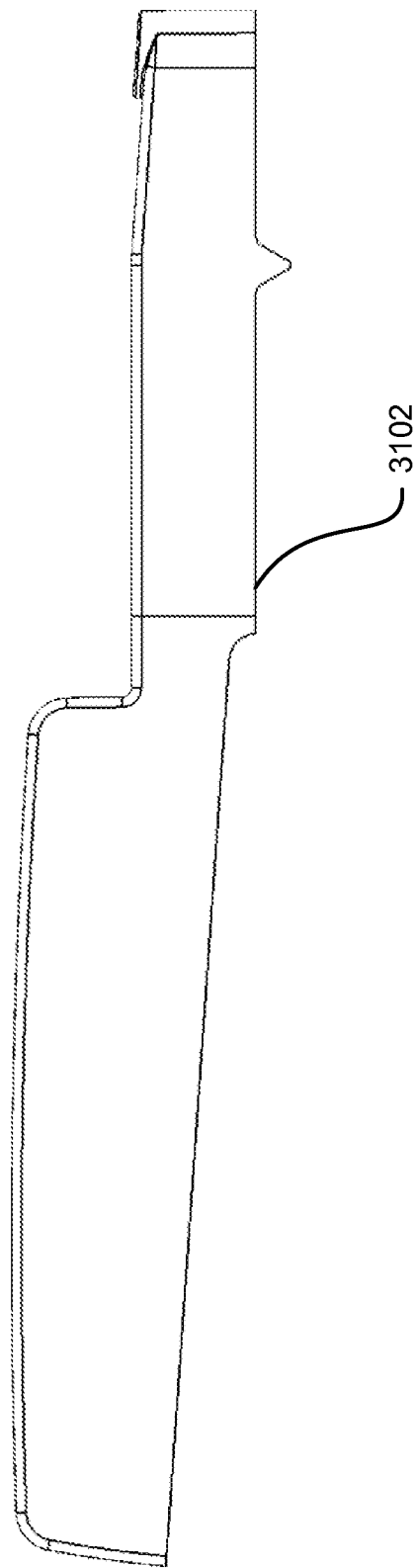

FIG. 31 illustrates a right side view of the example illuminable key as described in connection with FIG. 23 and in accordance with at least one embodiment. Only the key body 3102 is shown.

Figure 32:
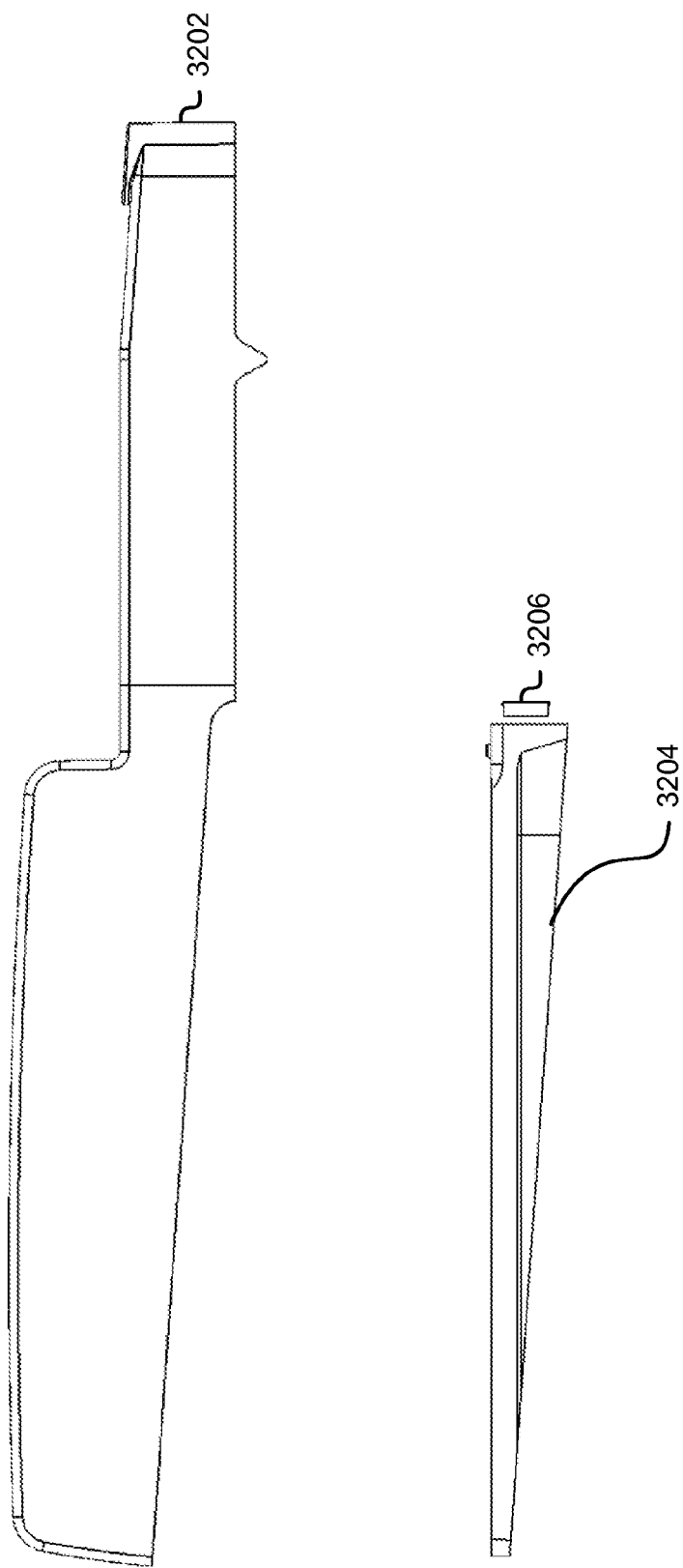

FIG. 32 illustrates the right side view of the example illuminable key as described in connection with FIG. 23 and in accordance with at least one embodiment. The key body 3202 is shown separated from the light guide 3204. The placement of the light source 3206 is shown in relation to the light guide 3204.

Figure 33:
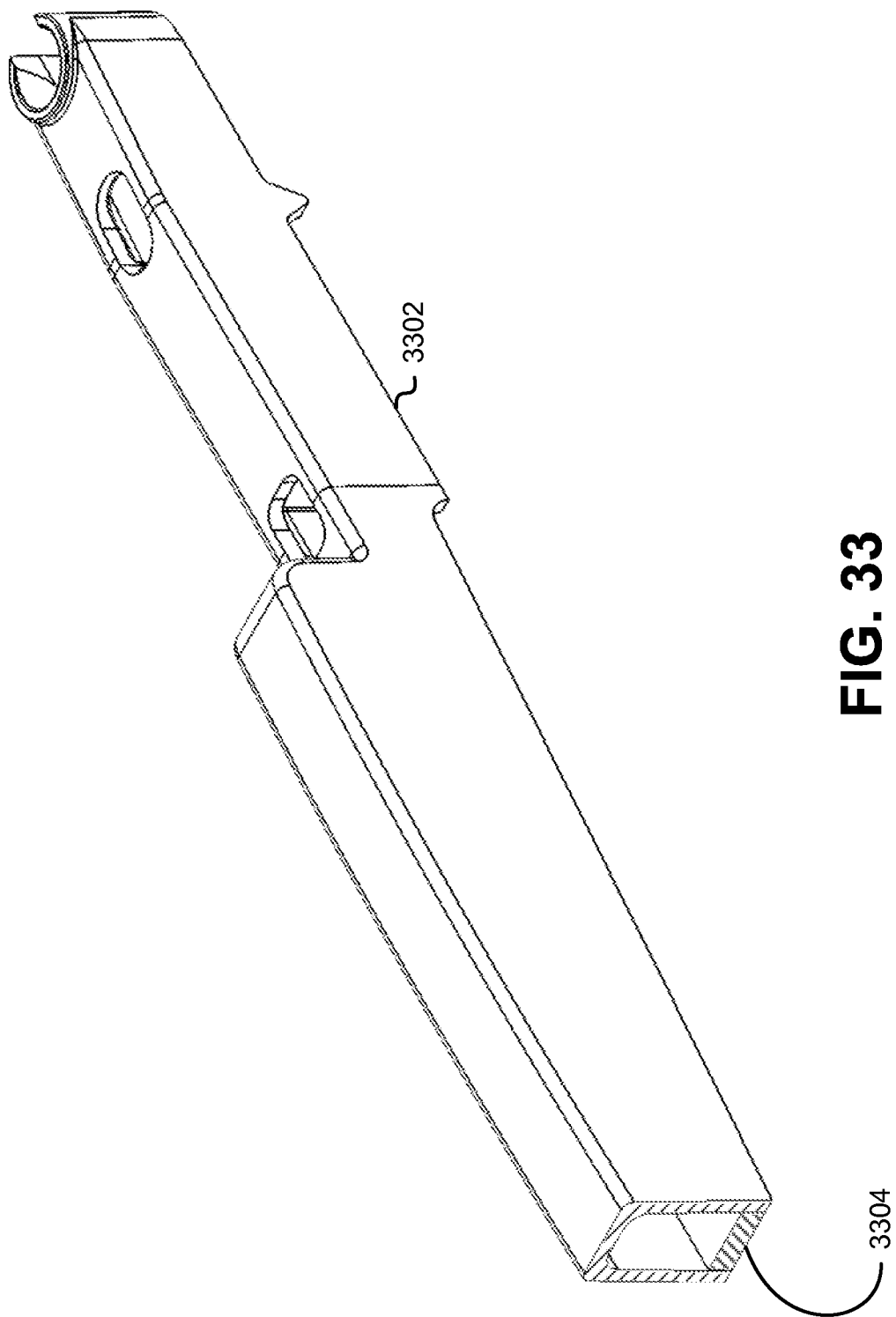

FIG. 33 illustrates an isometric view of a first left-to-right cross-section of the example illuminable key as described in connection with FIG. 23 and in accordance with at least one embodiment. The key body 3302 is shown connected to the light guide 3304.

Figure 34:
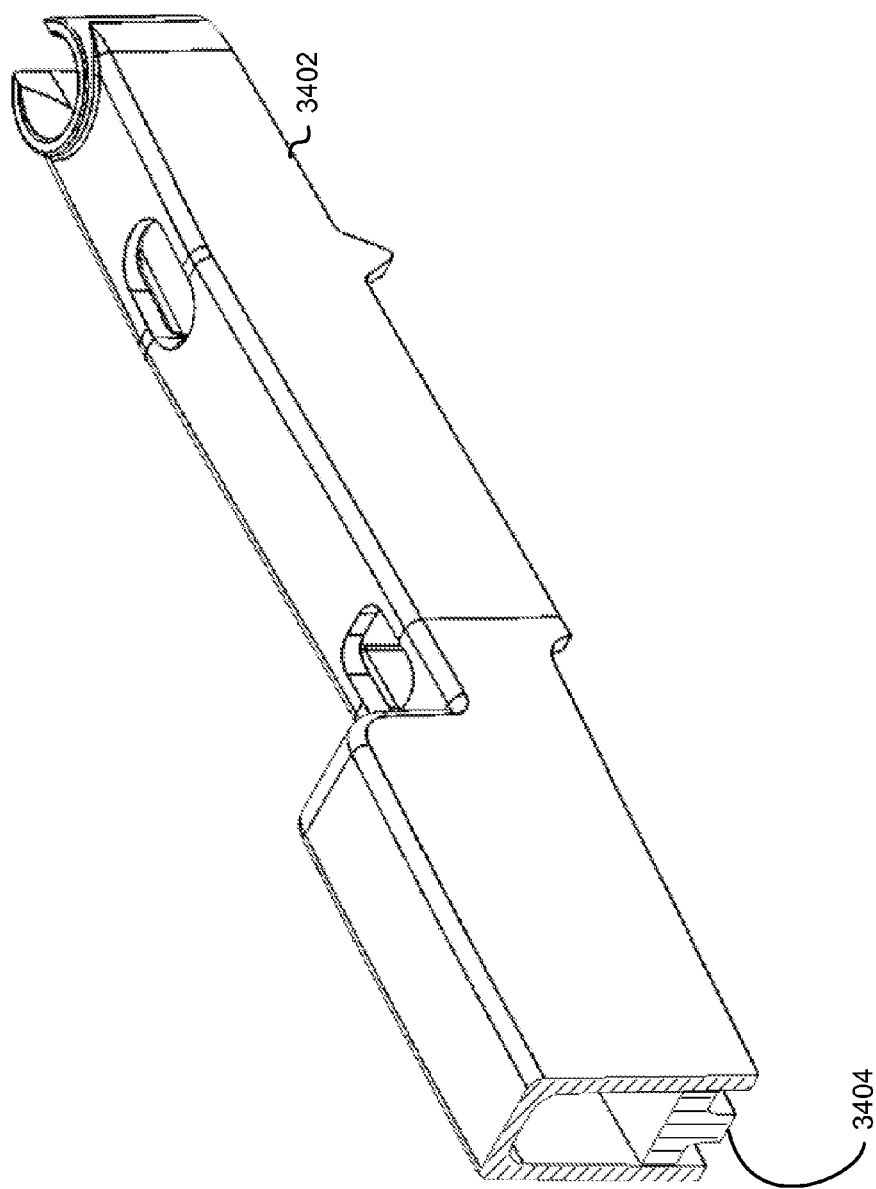

FIG. 34 illustrates an isometric view of a second left-to-right cross-section of the example illuminable key as described in connection with FIG. 23 and in accordance with at least one embodiment. The key body 3402 is shown connected to the light guide 3404.

Figure 35:
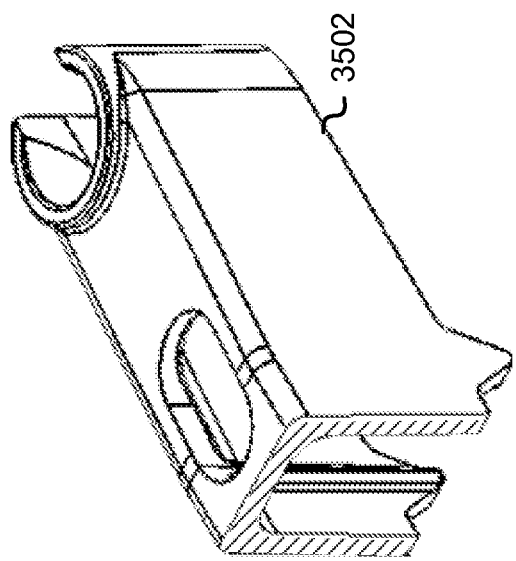

FIG. 35 illustrates an isometric view of a third left-to-right cross-section of the example illuminable key as described in connection with FIG. 23 and in accordance with at least one embodiment. FIG. 35 illustrates the key body 3502.

Figure 36:
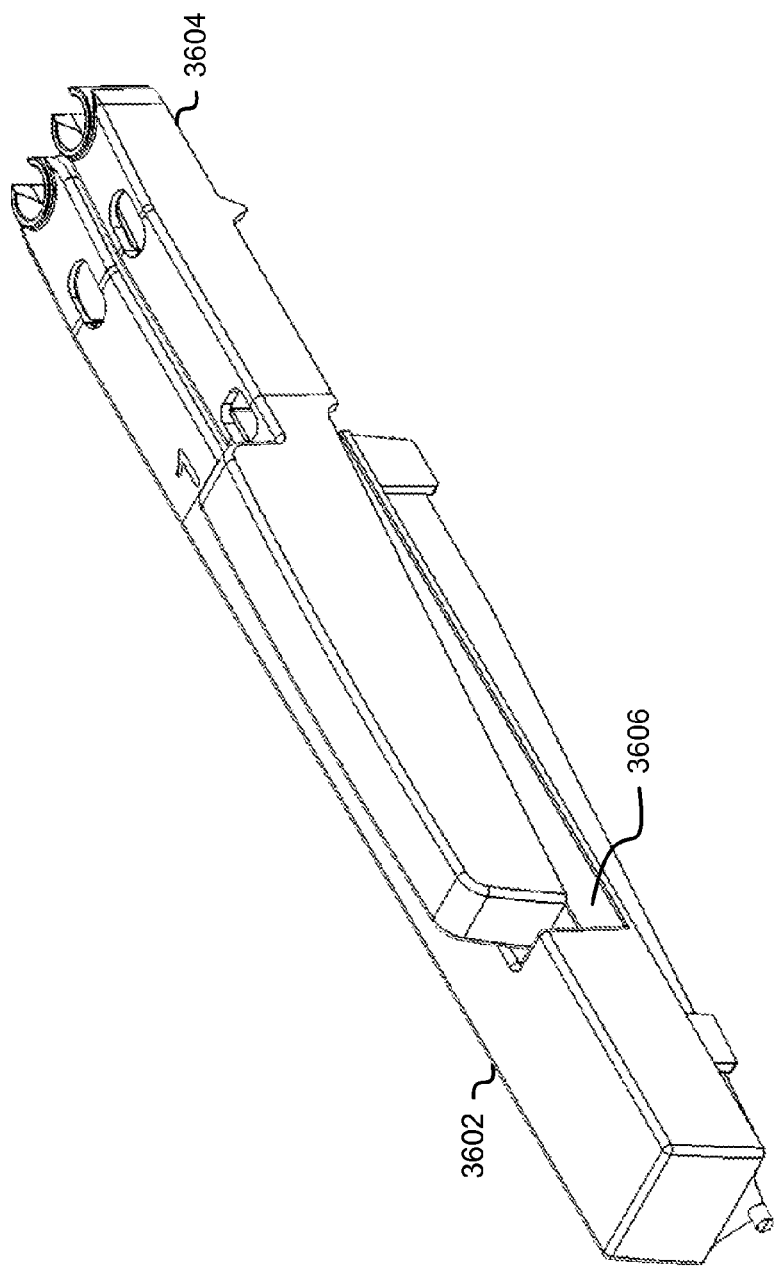
FIGS. 36 to 48 illustrate arrangements of first piano key types and second piano key types within an interactive piano training device in accordance with an embodiment.

FIG. 36 illustrates an isometric view of the example illuminable key as described in connection with FIG. 23 and in accordance with at least one embodiment, placed in relation to the example illuminable key as described in connection with FIG. 2 and in accordance with at least one embodiment. FIG. 36 illustrates the white key 3602 placed to the left of (as viewed from the top of the key) and adjacent to the black key 3604. The black key is placed within the cutout area 3606 of the white key allowing free movement of both keys as described in connection with FIG. 2.

Figure 37:
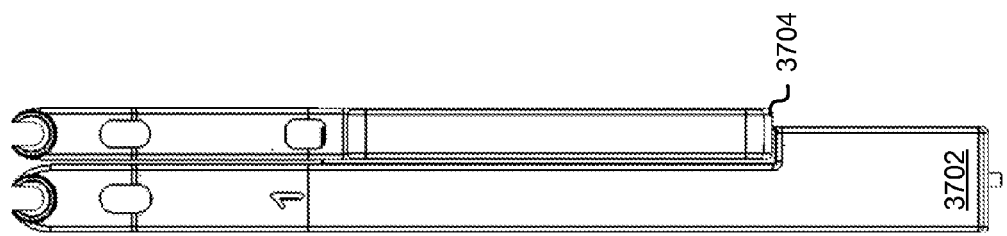

FIG. 37 illustrates a top view of the example illuminable key as described in connection with FIG. 2 and in accordance with at least one embodiment, placed in relation to the example illuminable key as described in connection with FIG. 23 and in accordance with at least one embodiment. FIG. 37 illustrates the white key 3702 placed to the left of (as viewed from the top of the key) and adjacent to the black key 3704.

Figure 38:
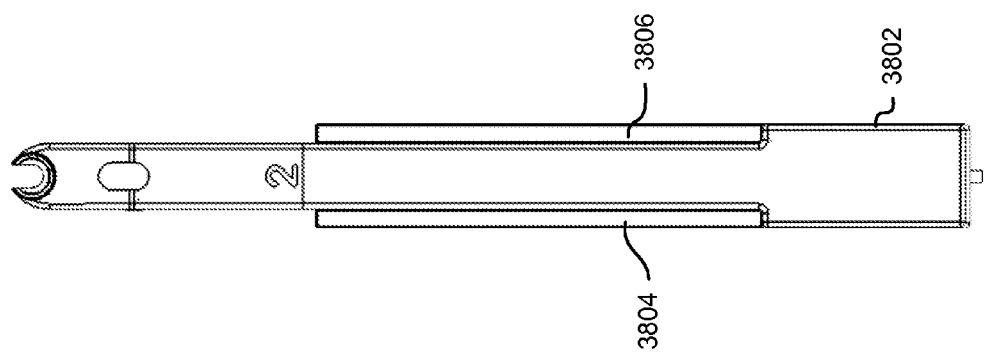

FIG. 38 illustrates a top view of an example illuminable key for an interactive piano training device such as the interactive piano training device described in connection with FIG. 1 and in accordance with at least one embodiment. The example illuminable key illustrated in FIG. 38 may share common characteristics with the example illuminable key described in connection with FIG. 2 including, but not limited to, the material, the method of construction, the degree of opacity and the overall size. The example illuminable key illustrated in FIG. 38 may also share common relationships with other components as with the example illuminable key described in connection with FIG. 2 including, but not limited to, the presence of a light guide, the presence of one or more light sources and the placement within a keyboard device. The example illuminable key illustrated in FIG. 38 may differ from the example illuminable key described in connection with FIG. 2 in the shape of the key. The example illuminable key described in connection with FIG. 2 has a single cutout area allowing for the free movement of an adjacent black key while the example illuminable key illustrated in FIG. 38 has two cutout areas allowing for the free movement of adjacent black keys. FIG. 38 illustrates the key body 3802 with the left cutout area 3804 and the right cutout area 3806.

Figure 39:
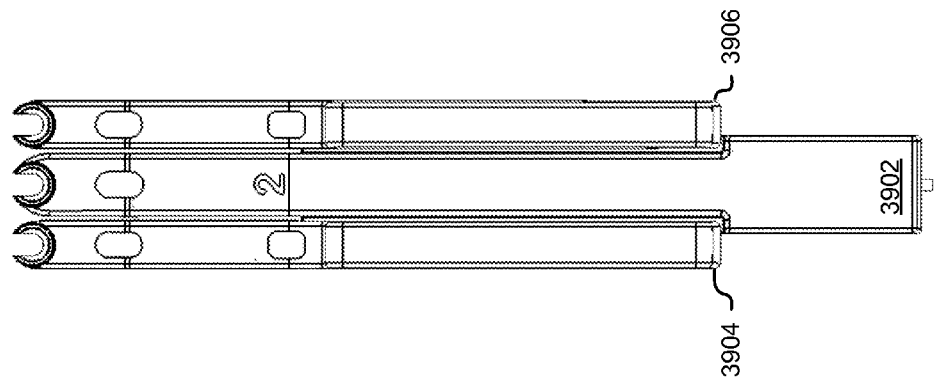

FIG. 39 illustrates a top view of the example illuminable key as described in connection with FIG. 38 and in accordance with at least one embodiment, placed in relation to two instances of the example illuminable key as described in connection with FIG. 23 and in accordance with at least one embodiment. FIG. 39 illustrates a white key 3902 placed to the right of (as viewed from the top of the key) and adjacent to a first black key 3904 and placed to the left of (as viewed from the top of the key) and adjacent to a second black key 3906.

Figure 40:
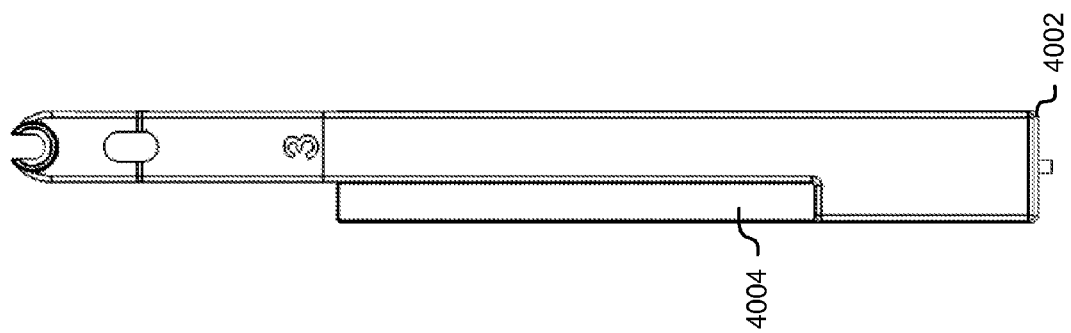

FIG. 40 illustrates a top view of an example illuminable key for an interactive piano training device such as the interactive piano training device described in connection with FIG. 1 and in accordance with at least one embodiment. The example illuminable key illustrated in FIG. 40 may share common characteristics with the example illuminable key described in connection with FIG. 2 including, but not limited to, the material, the method of construction, the degree of opacity and the overall size. The example illuminable key illustrated in FIG. 40 may also share common relationships with other components as with the example illuminable key described in connection with FIG. 2 including, but not limited to, the presence of a light guide, the presence of one or more light sources and the placement within a keyboard device. The example illuminable key illustrated in FIG. 40 may differ from the example illuminable key described in connection with FIG. 2 in the shape of the key. The example illuminable key described in connection with FIG. 2 has a single cutout area on the right side of the key (as viewed from the top of the key) allowing for the free movement of an adjacent black key while the example illuminable key illustrated in FIG. 40 has a single cutout area on the left side of the key (as viewed from the top of the key) allowing for the free movement of an adjacent black key. FIG. 40 illustrates the key body 4002 with the cutout area 4004.

Figure 41:
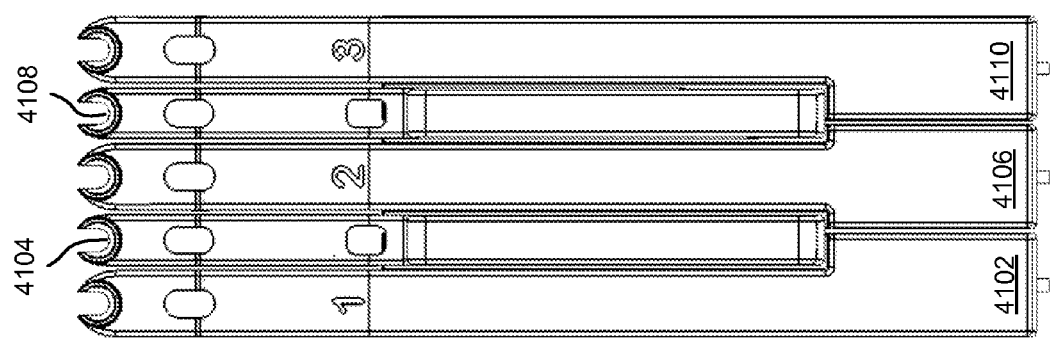

FIG. 41 illustrates a top view of five piano keys for an interactive piano training device such as the interactive piano training device described in connection with FIG. 1 and in accordance with at least one embodiment. FIG. 41 illustrates an example illuminable key as described in connection with FIG. 2 and in accordance with at least one embodiment, an example illuminable key as described in connection with FIG. 38 and in accordance with at least one embodiment and an example illuminable key as described in connection with FIG. 40 and in accordance with at least one embodiment. The three white keys are placed in relation to two instances of the example illuminable key as described in connection with FIG. 23 and in accordance with at least one embodiment. FIG. 41 illustrates a first white key 4102 placed to the left of (as viewed from the top of the key) and adjacent to a first black key 4104, a second white key 4106 placed to the right of (as viewed from the top of the key) and adjacent to the first black key 4104 and placed to the left of (as viewed from the top of the key) and adjacent to a second black key 4108, and a third white key 4110 placed to the right of (as viewed from the top of the key) and adjacent to the second black key 4108.

Figure 42:
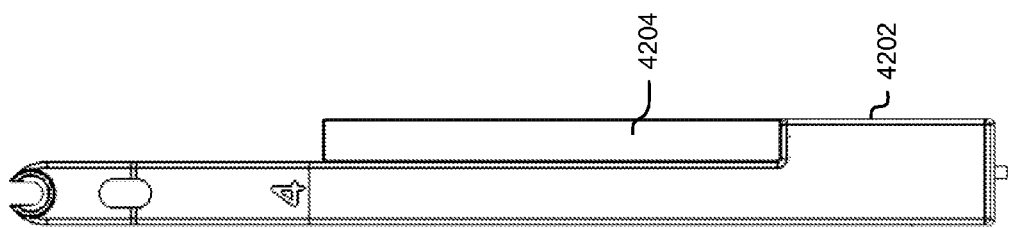

FIG. 42 illustrates a top view of an example illuminable key for an interactive piano training device such as the interactive piano training device described in connection with FIG. 1 and in accordance with at least one embodiment. The example illuminable key illustrated in FIG. 42 may share common characteristics with the example illuminable key described in connection with FIG. 2 including, but not limited to, the material, the method of construction, the degree of opacity and the overall size. The example illuminable key illustrated in FIG. 42 may also share common relationships with other components as with the example illuminable key described in connection with FIG. 2 including, but not limited to, the presence of a light guide, the presence of one or more light sources and the placement within a keyboard device. The example illuminable key illustrated in FIG. 42 may differ from the example illuminable key described in connection with FIG. 2 in the shape of the key. The example illuminable key described in connection with FIG. 2 has a cutout area on the right side of the key (as viewed from the top of the key) allowing for the free movement of an adjacent black key. The example illuminable key illustrated in FIG. 42 also has a cutout area on the right side of the key (as viewed from the top of the key) allowing for the free movement of an adjacent black key, but the cutout area 4204 on the right side of the key (as viewed from the top of the key) is larger (i.e., extends farther toward the center of the key body as viewed from the top of the key) than the cutout area of the example illuminable key described in connection with FIG. 2. FIG. 42 illustrates the key body 4202 with the cutout area 4204.

Figure 43:
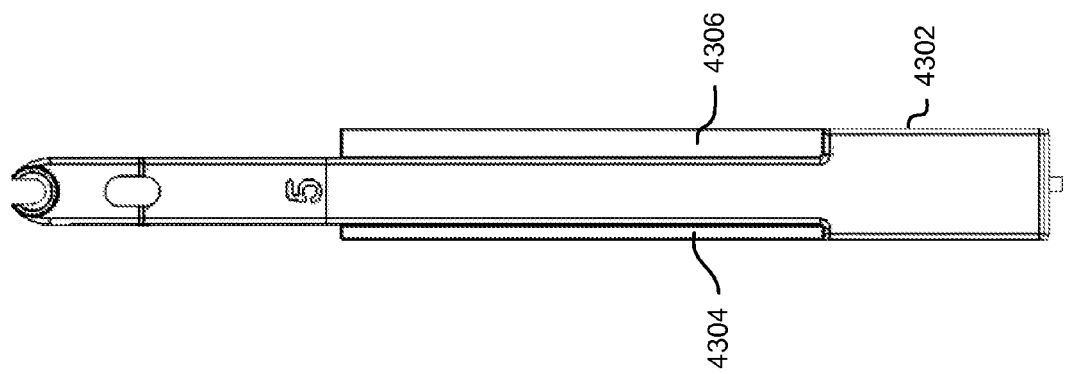

FIG. 43 illustrates a top view of an example illuminable key for an interactive piano training device such as the interactive piano training device described in connection with FIG. 1 and in accordance with at least one embodiment. The example illuminable key illustrated in FIG. 43 may share common characteristics with the example illuminable key described in connection with FIG. 2 including, but not limited to, the material, the method of construction, the degree of opacity and the overall size. The example illuminable key illustrated in FIG. 43 may also share common relationships with other components as with the example illuminable key described in connection with FIG. 2 including, but not limited to, the presence of a light guide, the presence of one or more light sources and the placement within a keyboard device. The example illuminable key illustrated in FIG. 43 may differ from the example illuminable key described in connection with FIG. 2 in the shape of the key. The example illuminable key described in connection with FIG. 2 has a single cutout area allowing for the free movement of an adjacent black key while the example illuminable key illustrated in FIG. 43 has two cutout areas allowing for the free movement of adjacent black keys. The two cutout areas of the example illuminable key illustrated in FIG. 43 differ from the two cutout areas of the example illuminable key as described in connection with FIG. 38. The left cutout area 4304 of the example illuminable key illustrated in FIG. 43 is smaller (i.e., does not extend as far toward the center of the key body as viewed from the top of the key) than the left cutout area 3804 described in connection with FIG. 38. Additionally, the right cutout area 4306 of the example illuminable key illustrated in FIG. 43 is larger (i.e., extends farther toward the center of the key body as viewed from the top of the key) than the right cutout area 3806 described in connection with FIG. 38. FIG. 43 illustrates the key body 4302 with the left cutout area 4304 and the right cutout area 4306.

Figure 44:
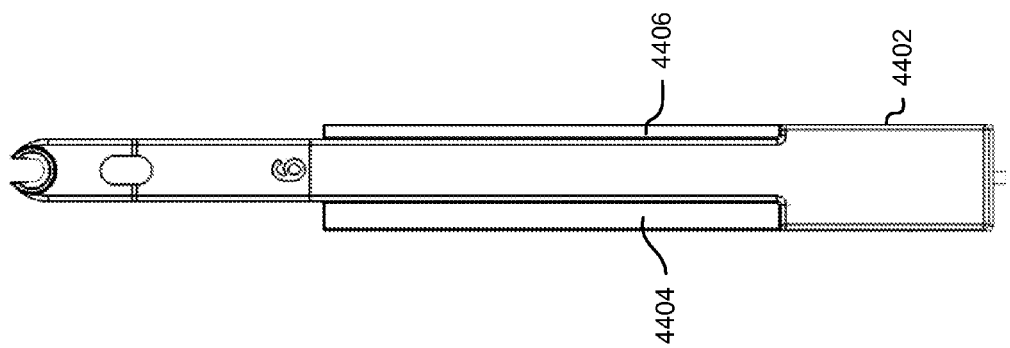

FIG. 44 illustrates a top view of an example illuminable key for an interactive piano training device such as the interactive piano training device described in connection with FIG. 1 and in accordance with at least one embodiment. The example illuminable key illustrated in FIG. 44 may share common characteristics with the example illuminable key described in connection with FIG. 2 including, but not limited to, the material, the method of construction, the degree of opacity and the overall size. The example illuminable key illustrated in FIG. 44 may also share common relationships with other components as with the example illuminable key described in connection with FIG. 2 including, but not limited to, the presence of a light guide, the presence of one or more light sources and the placement within a keyboard device. The example illuminable key illustrated in FIG. 44 may differ from the example illuminable key described in connection with FIG. 2 in the shape of the key. The example illuminable key described in connection with FIG. 2 has a single cutout area allowing for the free movement of an adjacent black key while the example illuminable key illustrated in FIG. 44 has two cutout areas allowing for the free movement of adjacent black keys. The two cutout areas of the example illuminable key illustrated in FIG. 44 differ from the two cutout areas of the example illuminable key as described in connection with FIG. 43. The left cutout area 4404 of the example illuminable key illustrated in FIG. 44 is larger (i.e., extends farther toward the center of the key body as viewed from the top of the key) than the left cutout area 4304 described in connection with FIG. 43. Additionally, the right cutout area 4406 of the example illuminable key illustrated in FIG. 43 is smaller (i.e., does not extend as far toward the center of the key body as viewed from the top of the key) than the right cutout area 4306 described in connection with FIG. 43. FIG. 44 illustrates the key body 4402 with the left cutout area 4404 and the right cutout area 4406.

Figure 45:
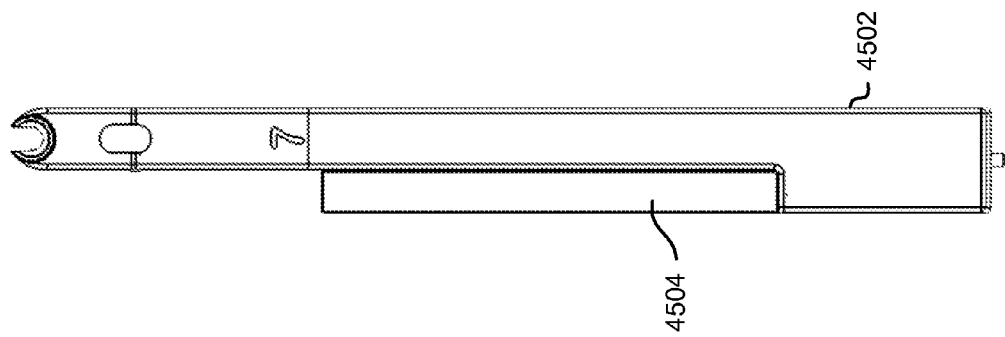

FIG. 45 illustrates a top view of an example illuminable key for an interactive piano training device such as the interactive piano training device described in connection with FIG. 1 and in accordance with at least one embodiment. The example illuminable key illustrated in FIG. 45 may share common characteristics with the example illuminable key described in connection with FIG. 2 including, but not limited to, the material, the method of construction, the degree of opacity and the overall size. The example illuminable key illustrated in FIG. 45 may also share common relationships with other components as with the example illuminable key described in connection with FIG. 2 including, but not limited to, the presence of a light guide, the presence of one or more light sources and the placement within a keyboard device. The example illuminable key illustrated in FIG. 45 may differ from the example illuminable key described in connection with FIG. 2 in the shape of the key. The example illuminable key described in connection with FIG. 2 has a cutout area on the right side of the key (as viewed from the top of the key) allowing for the free movement of an adjacent black key. The example illuminable key illustrated in FIG. 45 has a cutout area on the left side of the key (as viewed from the top of the key) allowing for the free movement of an adjacent black key. The left cutout area of the example illuminable key illustrated in FIG. 45 differs from the left cutout area of the example illuminable key as described in connection with FIG. 40. The left cutout area 4504 of the example illuminable key illustrated in FIG. 45 is larger (i.e., extends farther toward the center of the key body as viewed from the top of the key) than the left cutout area 4004 described in connection with FIG. 40. FIG. 45 illustrates the key body 4502 with the cutout area 4504.

Figure 46:
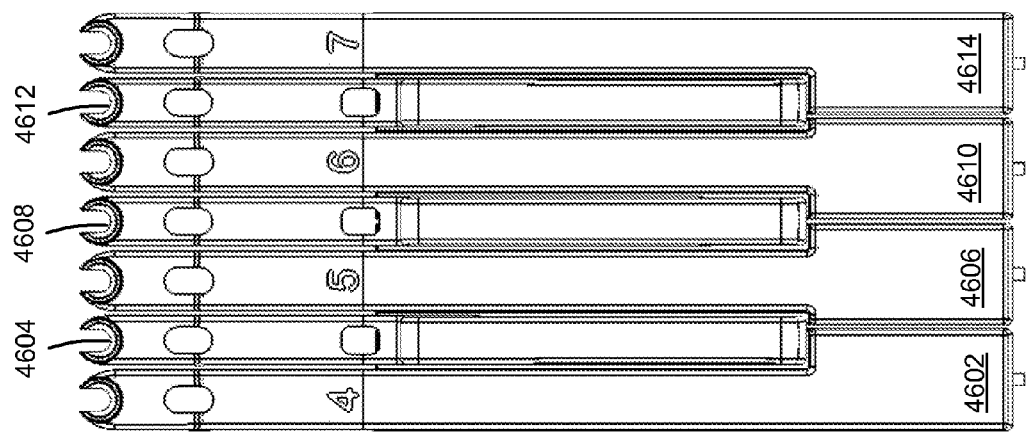

FIG. 46 illustrates a top view of seven piano keys for an interactive piano training device such as the interactive piano training device described in connection with FIG. 1 and in accordance with at least one embodiment. FIG. 46 illustrates an example illuminable key as described in connection with FIG. 42 and in accordance with at least one embodiment, an example illuminable key as described in connection with FIG. 43 and in accordance with at least one embodiment, an example illuminable key as described in connection with FIG. 44 and an example illuminable key as described in connection with FIG. 45 and in accordance with at least one embodiment. The four white keys are placed in relation to three instances of the example illuminable key as described in connection with FIG. 23 and in accordance with at least one embodiment. FIG. 46 illustrates a first white key 4602 placed to the left of (as viewed from the top of the key) and adjacent to a first black key 4604, a second white key 4606 placed to the right of (as viewed from the top of the key) and adjacent to the first black key 4604 and placed to the left of (as viewed from the top of the key) and adjacent to a second black key 4608, a third white key 4610 placed to the right of (as viewed from the top of the key) and adjacent to the second black key 4608 and placed to the left of (as viewed from the top of the key) and adjacent to a third black key 4612 and a fourth white key 4614 placed to the right of (as viewed from the top of the key) and adjacent to the third black key 4612.

Figure 47:
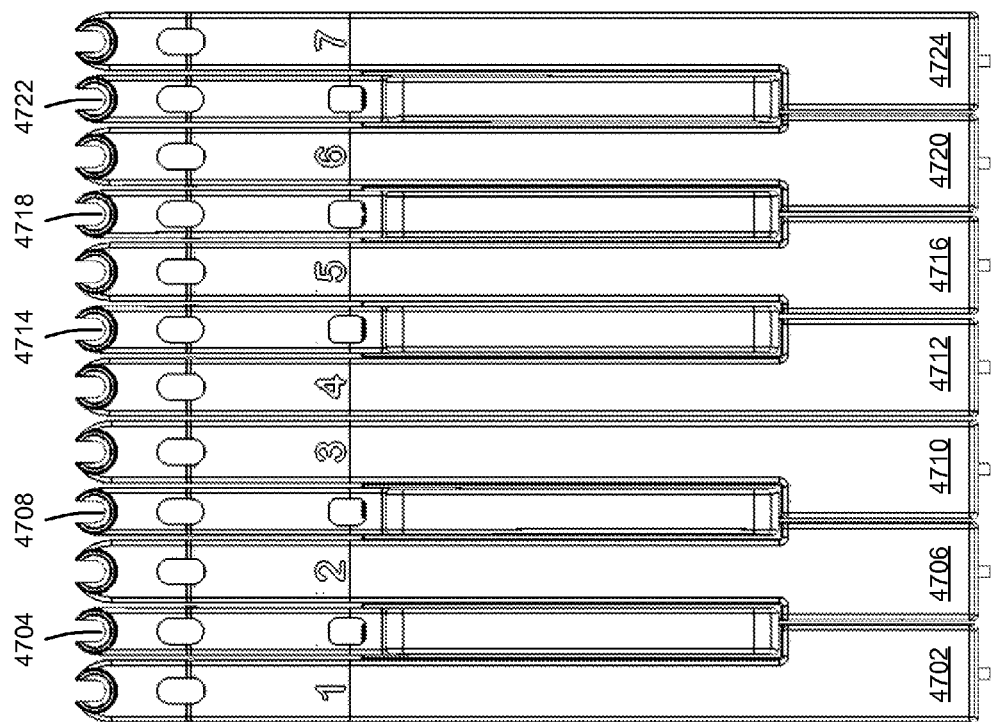

FIG. 47 illustrates a top view of twelve piano keys for an interactive piano training device such as the interactive piano training device described in connection with FIG. 1 and in accordance with at least one embodiment. FIG. 47 illustrates an example illuminable key as described in connection with FIG. 2 and in accordance with at least one embodiment, an example illuminable key as described in connection with FIG. 38 and in accordance with at least one embodiment, an example illuminable key as described in connection with FIG. 40 and in accordance with at least one embodiment, an example illuminable key as described in connection with FIG. 42 and in accordance with at least one embodiment, an example illuminable key as described in connection with FIG. 43 and in accordance with at least one embodiment, an example illuminable key as described in connection with FIG. 44 and an example illuminable key as described in connection with FIG. 45 and in accordance with at least one embodiment. The seven white keys are placed in relation to five instances of the example illuminable key as described in connection with FIG. 23 and in accordance with at least one embodiment.

FIG. 47 illustrates a first white key 4702 placed to the left of (as viewed from the top of the key) and adjacent to a first black key 4704, a second white key 4706 placed to the right of (as viewed from the top of the key) and adjacent to the first black key 4704 and placed to the left of (as viewed from the top of the key) and adjacent to a second black key 4708, a third white key 4710 placed to the right of (as viewed from the top of the key) and adjacent to the second black key 4708, a fourth white key 4712 placed to the right of (as viewed from the top of the key) and adjacent to the third white key 4710 and placed to the left of (as viewed from the top of the key) and adjacent to a third black key 4714, a fifth white key 4716 placed to the right of (as viewed from the top of the key) and adjacent to the third black key 4714 and placed to the left of (as viewed from the top of the key) and adjacent to a fourth black key 4718, a sixth white key 4720 placed to the right of (as viewed from the top of the key) and adjacent to the fourth black key 4718 and placed to the left of (as viewed from the top of the key) and adjacent to a fifth black key 4722 and a seventh white key 4724 placed to the right of (as viewed from the top of the key) and adjacent to the fifth black key 4722.

When used in association with a common piano keyboard, the twelve keys illustrated in FIG. 47 may represent a single octave of a piano keyboard. For example, key 4702 may represent a "C," key 4704 may represent a "C-sharp" ("C#") or a "D-flat" ("D♭"), key 4706 may represent a "D" and so on with the twelve notes of an octave corresponding to the twelve keys. Multiple octaves on a keyboard may be provided by repeating the arrangement of the twelve keys illustrated in FIG. 47. As may be contemplated, other tonal arrangements of the notes (and thus other arrangements of the keys) may be considered as within the scope of the present disclosure. For example, a microtonal keyboard may provide multiple tones between the "natural" pitches, resulting in multiple keys being included in a single interval. Common microtonal scales may include, for example, nineteen, twenty-two, thirty-six, or more tones per octave resulting in a corresponding key arrangement. As may also may be contemplated, other tonal arrangements of the notes may be provided by reprogramming the keys using a controller such as the controller 106 described in connection with FIG. 1 and in accordance with at least one embodiment, and other tonal arrangements provided by reprogramming may also be considered as within the scope of the present disclosure. For example, a thirty-six tone octave may be implemented by reprogramming three "standard" octaves to represent a single microtonal octave.

In an embodiment, key groupings such as those illustrated in FIG. 47 may be considered as a collection of keys from an electronic perspective. For example, the collection of keys illustrated in FIG. 47 may be connected together in a single "bank" which may be one of a plurality of banks on a keyboard. In such an embodiment, a lighting event to light key 4710 may be sent to, for example, "key five of bank X" rather than to, for example, key "twenty-nine." Such grouping of keys into banks may allow more streamlined and/or parallelized addressing of the keys, better facilitating the processing of multiple events from the lighting event manager at the same time. Such parallelized addressing may also prevent lag in addressing a key near the end of the keyboard by routing commands to the correct bank in parallel and then processing those commands sequentially within the bank. In an embodiment, the size of a bank of keys may be as few as a single key, facilitating parallel addressing of each key simultaneously.

Figure 48:
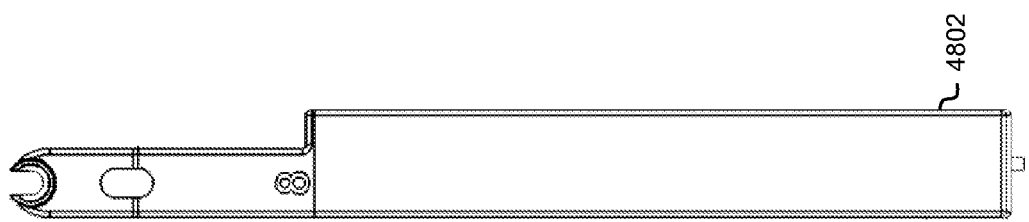

FIG. 48 illustrates a top view of an example illuminable key for an interactive piano training device such as the interactive piano training device described in connection with FIG. 1 and in accordance with at least one embodiment. The example illuminable key illustrated in FIG. 48 may share common characteristics with the example illuminable key described in connection with FIG. 2 including, but not limited to, the material, the method of construction, the degree of opacity and the overall size. The example illuminable key illustrated in FIG. 48 may also share common relationships with other components as with the example illuminable key described in connection with FIG. 2 including, but not limited to, the presence of a light guide, the presence of one or more light sources and the placement within a keyboard device. The example illuminable key illustrated in FIG. 48 may differ from the example illuminable key described in connection with FIG. 2 in the shape of the key. The example illuminable key described in connection with FIG. 2 has a single cutout area allowing for the free movement of an adjacent black key while the example illuminable key illustrated in FIG. 48 has no cutout areas allowing for its placement next to other white keys.

The illuminable key illustrated in FIG. 48 may be placed to the left of (as viewed from the top of the key) and adjacent to the example illuminable key described in connection with FIG. 2 and in accordance with at least one embodiment, or may be placed to the right of (as viewed from the top of the key) and adjacent to the example illuminable key described in connection with FIG. 40 and in accordance with at least one embodiment, or may be placed to the left of (as viewed from the top of the key) and adjacent to the of the example illuminable key described in connection with FIG. 42 and in accordance with at least one embodiment or may be placed to the right of (as viewed from the top of the key) and adjacent to the example illuminable key described in connection with FIG. 45 and in accordance with at least one embodiment. FIG. 48 illustrates the key body 4802.

Figure 49:
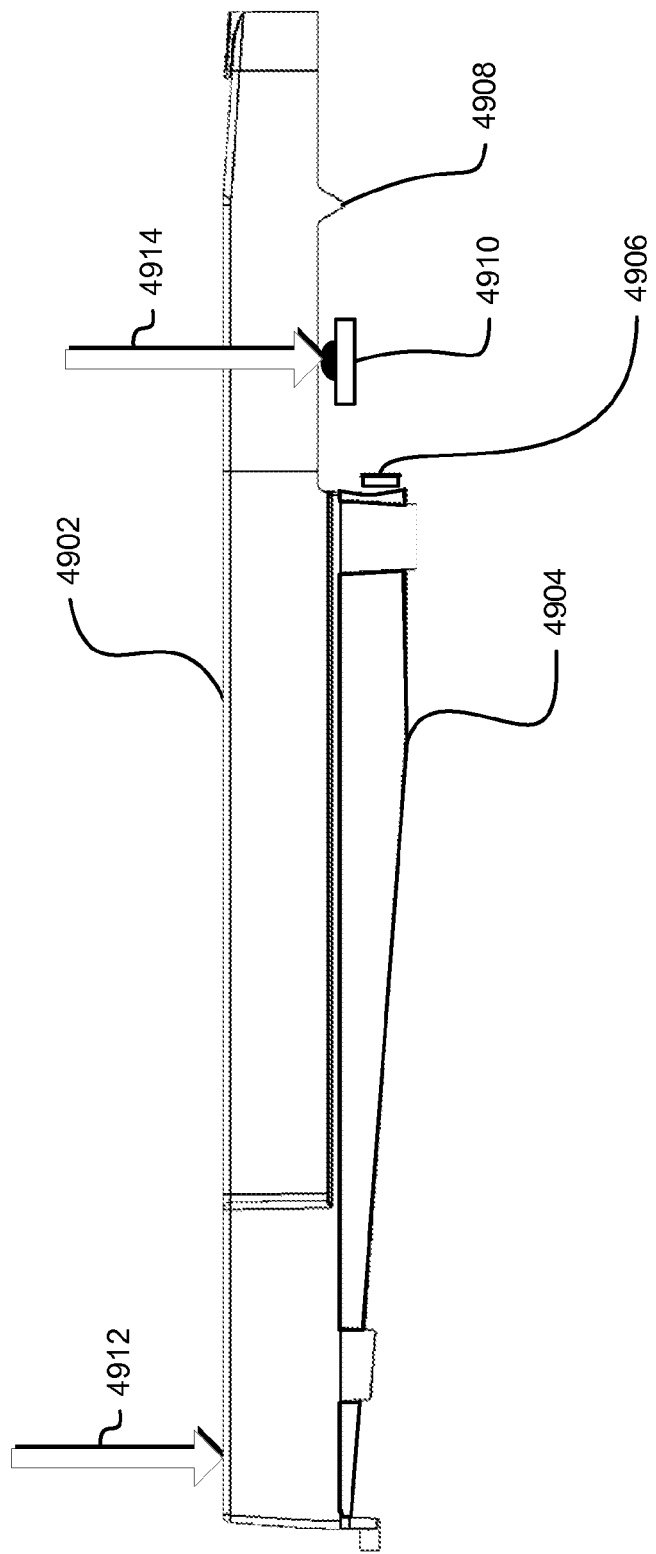
FIGS. 49 and 50 illustrate triggering mechanisms for a piano key in accordance with an embodiment.

FIG. 49 illustrates an example illuminable key, the light source associated with that key and a triggering mechanism associated with that key for an interactive piano training device such as the interactive piano training device described in connection with FIG. 1 and in accordance with at least one embodiment. The example illuminable key illustrated in FIG. 49, which includes a key body 4902, a light guide 4904 and a light source 4906 such as described in connection with FIG. 2 and in accordance with at least one embodiment may, when depressed 4912, pivot at a pivot point 4908 and engage 4914 a switch 4910. The switch 4910 may be a mechanical switch, or may be an electronic switch, or may be an optical switch, or may be a contact switch, or may be some other type of switch. For example, the switch 4910 may consist of a pair of contact points that, when the key pivots, complete a circuit indicating that the key has been pressed. The switch 4910 is illustrated below the key body 4902, but may also be attached to and/or otherwise embedded within the key body. The switch 4910 may, in some embodiments, be configured to provide information such as the velocity of the key press, the pressure of the key press, the length of time of the key press, the release of the key press or combinations of these and/or other key press related information.

Figure 50:
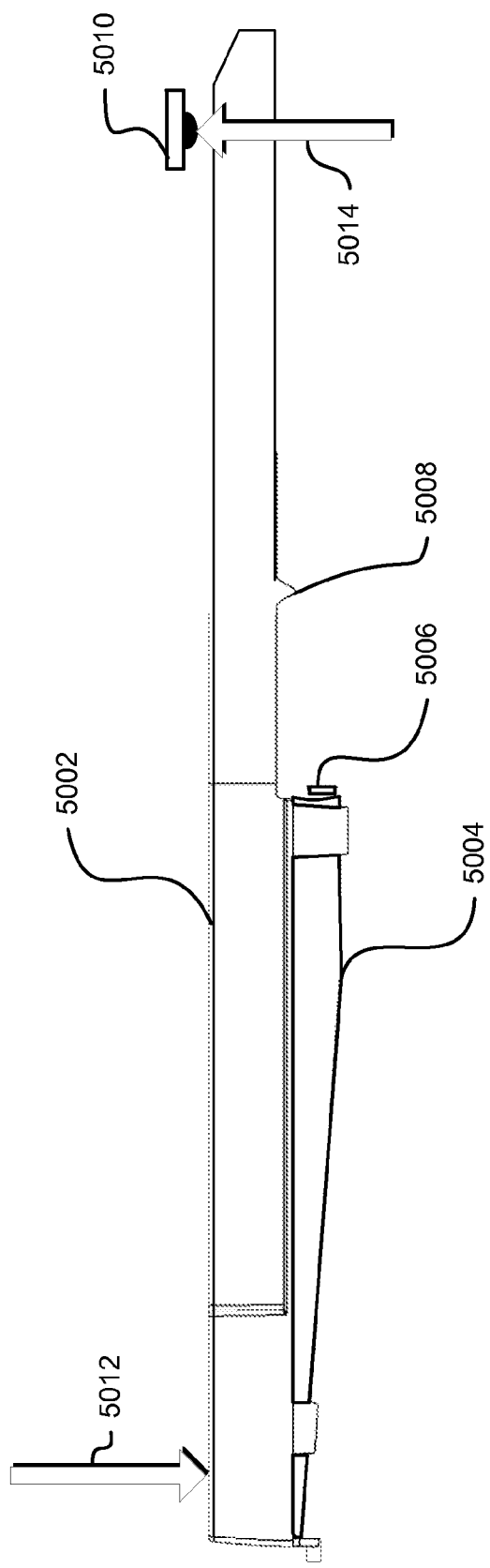

FIG. 50 illustrates an example illuminable key, the light source associated with that key and a triggering mechanism associated with that key for an interactive piano training device such as the interactive piano training device described in connection with FIG. 1 and in accordance with at least one embodiment. The example illuminable key illustrated in FIG. 50, which includes a key body 5002, a light guide 5004 and a light source 5006 such as described in connection with FIG. 2 and in accordance with at least one embodiment may, when depressed 5012, pivot at a pivot point 5008 and engage 5014 a switch 5010. As with the switch 4910 described herein in connection with FIG. 49, the switch 5010 may be a mechanical switch, or may be an electronic switch, or may be an optical switch, or may be a contact switch, or may be some other type of switch. The switch 5010 is illustrated above the key body 5002 and may, in some embodiments, be configured to provide information such as the velocity of the key press, the pressure of the key press, the length of time of the key press, the release of the key press or combinations of these and/or other key press related information.

Figure 51:
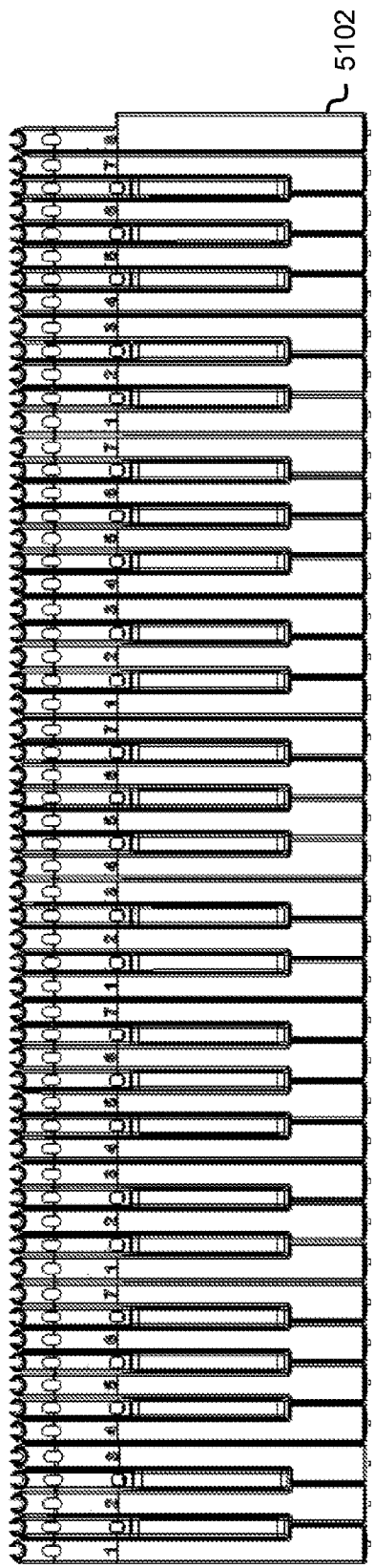
FIG. 51 illustrates a key arrangement for a plurality of piano keys in an interactive piano training device in accordance with an embodiment.

FIG. 51 illustrates a top view of a plurality of piano keys 5102 for an interactive piano training device such as the interactive piano training device described in connection with FIG. 1 and in accordance with at least one embodiment. The example illustrated in FIG. 51 is a common keyboard configuration of sixty-one keys (five octaves plus an extra note). Other common arrangements may include standard piano keyboards (eighty-eight keys representing seven-and-a-half octaves), and extended piano keyboards (with ninety or more keys) as well as two-, three- and four octave keyboards. As may be contemplated, the numbers and arrangements of keys within a keyboard described herein are illustrative examples and other such numbers and arrangements of keys may be considered as within the scope of the present disclosure.

Figure 52:
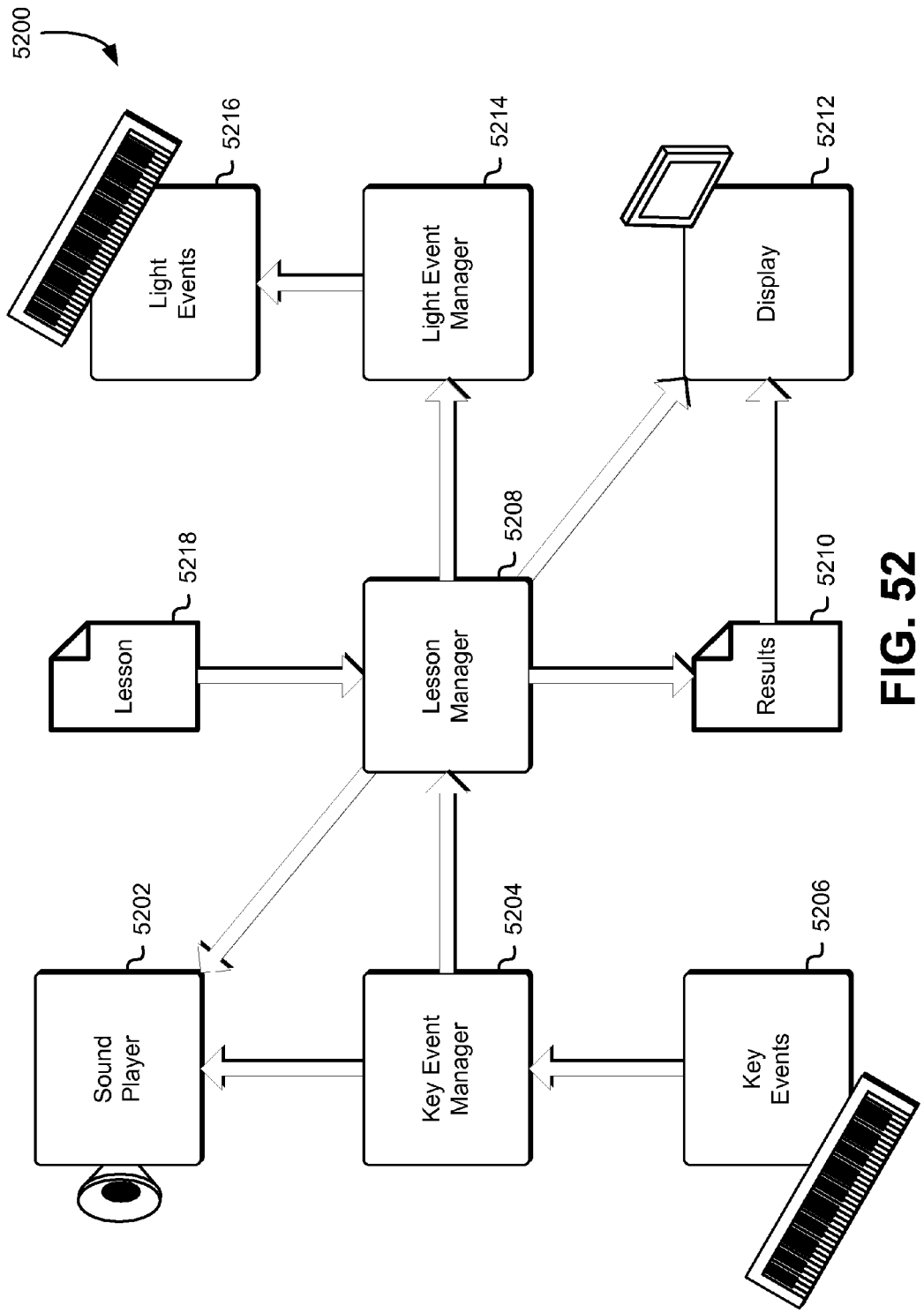
FIG. 52 illustrates an example environment where connections associated with an interactive piano training device may be managed in accordance with at least one embodiment.

FIG. 52 illustrates an example environment 5200 where connections associated with an interactive piano training device such as the interactive piano training device described in connection with FIG. 1 may be managed in accordance with at least one embodiment. Key events 5206 may be generated by pressing and/or releasing keys of an interactive piano training device. Key event notifications may be sent to the key event manager 5204 which may send the key events to a sound player 5202 and which may also send the key events to a lesson manager 5208. Key event notifications may also be recorded (referred to herein as a "record key event") by, for example, the lesson manager for later playback and analysis. The sound player 5202 may be configured to receive key events as, for example, musical instrument digital interface ("MIDI") commands. The sound player may use these events to trigger sounds using, for example, a synthesizer or may use triggered playback via recorded and/or synthesized sounds (e.g., SoundFont™, downloadable sounds ("DLS"), general MIDI ("GM"), instructor-provided sounds, etc.). The lesson manager 5208 may, based at least in part on a lesson 5218, send events to a light event manager 5214 which may also be sent as light events 5216 to the interactive piano training device. In an embodiment, the light event manager 5214 may include a color theme manager configured to respond to lighting events based at least in part on a chosen color theme. In such an embodiment, the user may chose the color theme, or the color theme may be chosen based at least in part on the lesson 5218, or the color theme may be chosen based on some other factors. The lesson manager may also send sound events to the sound player 5202 to, for example, render the appropriate sounds corresponding to the notes of the lesson, to alter one or more sound properties, or to perform other such sound functions. The lesson manager 5208 may also compile results 5210 based on the lesson 5218 and/or on the key events 5206. The lesson manager 5208 may cause the results 5210 to be displayed on the display 5212. The lesson manager 5208 may cause other objects to be displayed including, but not limited to, parts of the lesson (e.g., a musical score, lesson progress, etc.).

Figure 53:
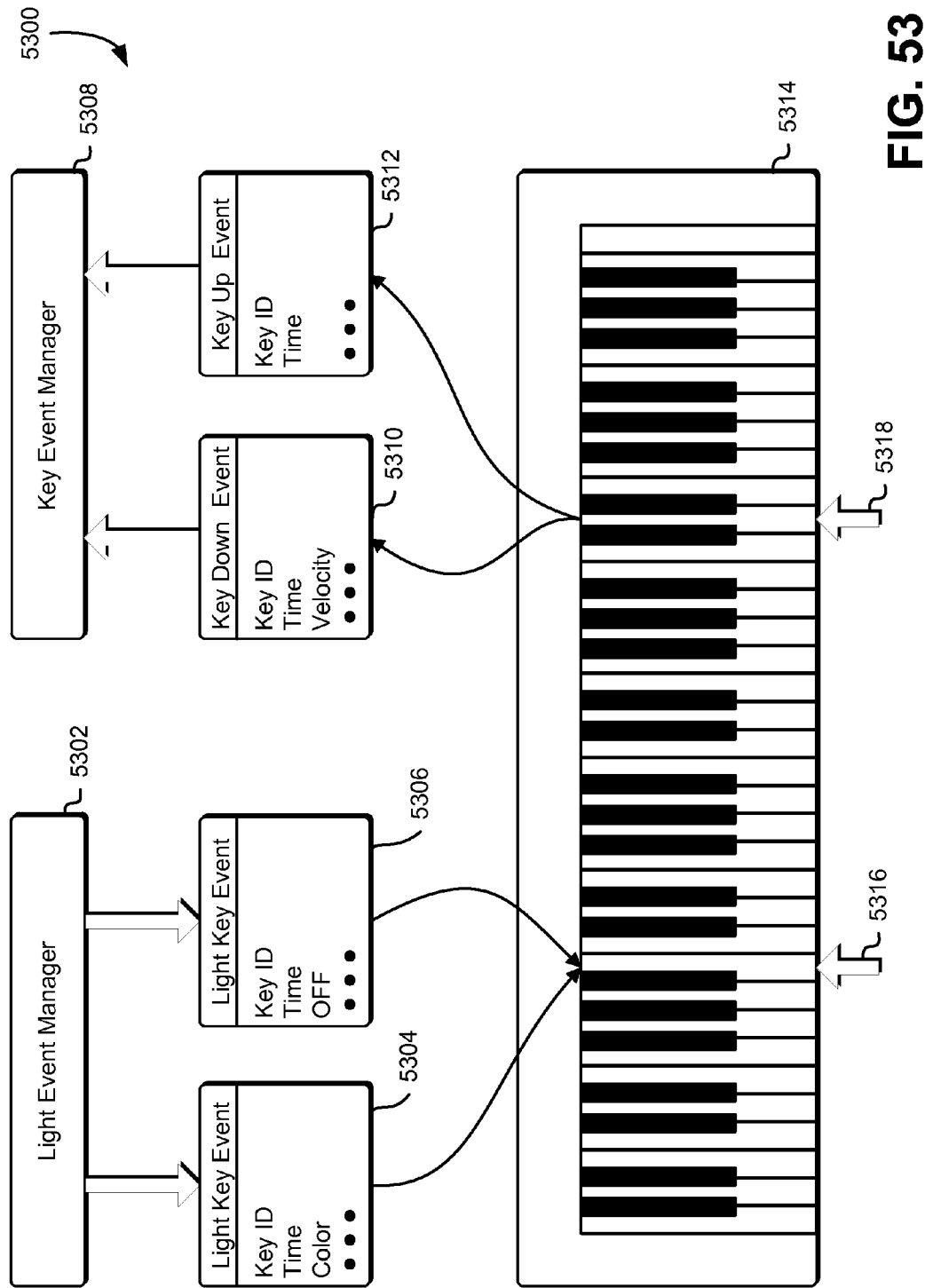
FIG. 53 illustrates an example environment where key and lighting events may be sent to and from an interactive piano training device in accordance with an embodiment.

FIG. 53 illustrates an example environment 5300 where key and lighting event notifications may be sent to and received from an interactive piano training device such as the interactive piano training device described in connection with FIG. 1 and in accordance with at least one embodiment. Under the control of a computer system such as the controller 106 described in connection with FIG. 1, a light event manager 5302 may generate a first light event 5304 in association with a key 5316 which may be one of a plurality of keys of an interactive piano training device 5314. The first light event 5304 may include information including, but not limited to, an identifier or address associated with a key, a time to light the key, the length of time to keep the key lit, the color to light the key, the brightness to light the key and/or other such events. The first light event 5304 may also include more complex information such as lighting "ramp-up" and "ramp-down" profiles, varying color values, varying brightness values and/or other such complex information. In response to the first light event 5304, the interactive piano training device 5314 may cause one or more light sources such as those described herein to be illuminated with values corresponding to the first light event 5304. The light event manager may be configured to send further light events under the control of a computer system such as, for example, a second light key event 5306 to turn off the one or more light sources associated with the key 5316.

A key event manager 5308 may also be configured under the control of a computer system to receive key events associated with the keys of an interactive piano training device 5314. For example, if a user presses a key 5318, a key down event 5310 may be generated and sent to the key event manager 5308 that includes the identifier or address associated with the key as well as the time it was pressed, the velocity, the pressure and so on. Subsequently, upon the release of the key 5318, a key up event 5312 may be generated and sent to the key event manager 5308 indicating the key up event. In some embodiments, the interactive piano training device 5314 may be configured to allow multiple events (e.g., light events and/or key events) to be processed simultaneously.

Figure 54:
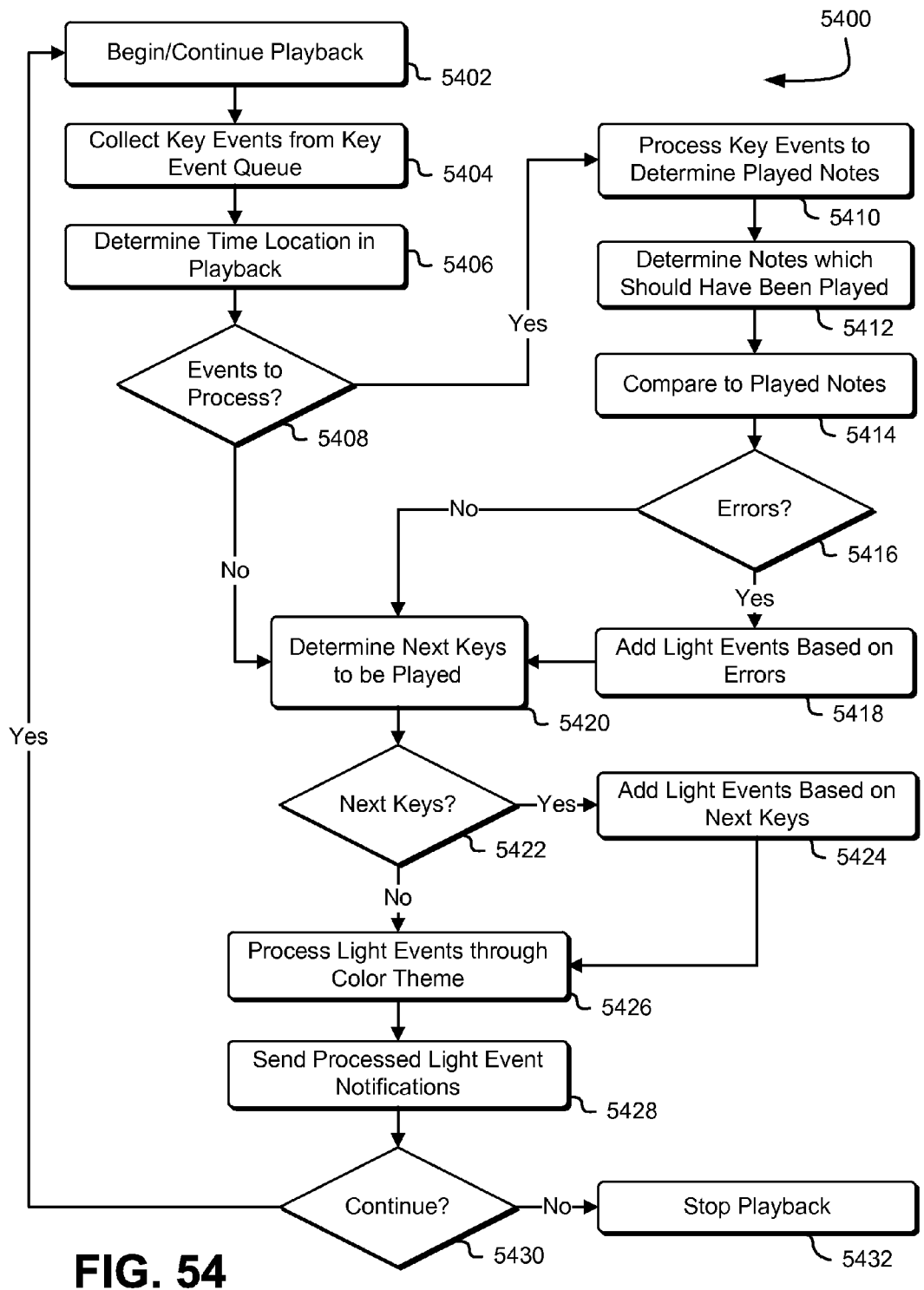
FIG. 54 illustrates an example process for performing an exercise in association with a lesson using an interactive piano training device in accordance with an embodiment.

FIG. 54 illustrates an example process 5400 for performing an exercise in accordance with taking a lesson, using an interactive piano training device such as the interactive piano training device described in connection with FIG. 1 and in accordance with at least one embodiment. A controller such as the controller 106 may be used to perform the process illustrated in FIG. 54. The controller may first determine whether playback of the exercise should begin and/or continue 5402. As used herein, "playback" may refer to the process of a student performing an exercise in accordance with taking a lesson, which in some embodiments may include performing a series of exercise related elements (notes, chords, rests, etc.) in order and may be performed according to a musical tempo. During playback, the controller may provide one or more playback indicators, such as lighting the keys representing the notes that should be played. Playback indicators may also include advancing an indicator on a display to indicate a current position within a musical score associated with the exercise. For example, a vertical line may intersect the score at a location corresponding to a current location in the score and/or differentiating a current set of notes from other notes on the score, such as by rendering the current set of notes in a different color. Other playback indicators may be provided by the controller including, but not limited to, highlighting the notes of the musical score, video playback of an instructor playing the music associated with the musical score, a display of proper hand placement, or other playback indicators.

In an example, an exercise may include sight reading a series of notes for a song according to a musical score. Playback indicators may indicate the proper playback of the series of notes. Before a first note is played, the playback indicator may light the key associated with the first note, may highlight the musical score to indicate the note, and may then wait for the note to be played. When the note is played, a playback indicator may light the next key corresponding to the next note in the series of notes, may highlight the musical score to indicate the next note, and so on. In some playback modes, playback indicators may be independent of the musical tempo, or may be in accordance with a musical tempo, or may be related to some other exercise and/or lesson parameters. Other playback modes and indicators are described herein.

The determination about whether playback should begin and/or continue 5402 may be based on receiving one or more events, one or more triggering mechanisms, the lesson content, the lesson progress (e.g., by the user), the exercise, the exercise progress, or other determinations. For example, playback may begin as a result of the user pressing "play" on the control panel described herein after a lesson has been selected or may begin after a countdown has expired (in, for example, a mode such as a testing mode, described herein). The controller may next collect key event notifications from a key event queue 5404. The key event notifications in the key event queue may include key event notifications related to keys pressed and/or released since the previous collection of key event notifications from the key event queue. The controller may next determine the time location in the playback 5406. As used herein, "time location" may refer to a position within the playback sequence. For example, at the beginning of the playback, the time location may be at the beginning of the exercise. As the exercise progresses, the time location may advance based on the next note, chord or rest in the musical score associated with the exercise, or may advance based on musical tempo, or may advance based on some other such event such as in response to a user control. A time location may also reverse to, for example, restart the exercise, repeat a phrase, return to a previous note, chord or rest, restart or reverse in response to a user control, or because of some other such event.

In some embodiments, a controller may be configured to advance forward or return back to the start of a musical phrase. As used herein, a "musical phrase" is a grouping of notes which may be related by, for example, as to a portion of a melody, a certain musical motif, a section of a musical score, or according to some other relation. Musical phrases may be determined by the instructor (the creator of the lesson and/or the exercise) or may be automatically determined from the context of the musical score. For example, a melodic section that is frequently repeated may be determined to comprise a musical phrase. In some embodiments, a musical phrase may start after a long rest, or at the beginning of a measure, or at some other such musical indicator. The start of a musical phrase may also be determined relative to where one or more errors in playback occurred. For example, if a student is in the midst of a sixteen bar phrase, and makes several errors at the twelfth and thirteenth bars, playback may go back to the twelfth repeatedly until the errors are corrected, and then may go back to the beginning of the phrase to have the student play the entire sixteen bar phrase. In some embodiments, the start of a musical phrase may depend on the hand associated with particular notes. A common motif in music is to have a musical phrase played with the left hand, and then have that same phrase echoed in a higher register using the right hand. An error in the right hand notes may result in playback returning to the beginning of the left hand notes to allow for proper playing of the entire section.

If there are key event notifications to process 5408 from the key event queue, the controller may process the key event notifications to determine which notes 5410 were played by the user based on the key event notifications. The key event notifications from the event queue may include a plurality of key event notifications. In some embodiments, the process illustrated in FIG. 54 may cycle rapidly enough so that each of the key event notifications may be considered as having occurred at the same time. In some embodiments, the key event notifications may include timing information as described herein, allowing the controller to temporally sort the key event notifications. For example, a playback may indicate that the user should play a whole note with a first finger, and, at the same time, four quarter notes with a second finger. The key event notifications would include two key down events at approximately the same time (for the whole note and the first quarter note), a key up event for the first quarter note, a key down event and a key up event for the second quarter note, a key down event and a key up event for the third quarter note, a key down event for the fourth quarter note, and two key up events (for the fourth quarter note and the whole note) in approximately that order.

The controller may then determine which notes should have been played 5412 based on the time location in the playback and compare those notes to the notes that were played 5414. So, for example, in the above described example, the controller may compare the expected values to the actual events to see if the key event notifications correspond to the proper order, the proper keys, and/or to the proper timing. In the case of playing a chord (e.g., a C-major chord, which is the notes C, E, and G), the correct key event notifications would be if keys corresponding to those three notes were played within a threshold time of each other. Errors may include striking different keys, not striking them at approximately the same time, and other such errors. For example, if a user were to instead play C, E-flat and G (a C-minor chord), that may result in an error. If there were any errors between the notes that should have been played and the notes that were played 5416, the controller may then create one or more light event notifications based on those errors 5418. In some embodiments, the controller may compare keys played to keys that should have been played when there are no events to process. For example, if there should have been keys played based on the time location in the playback and there were no key events, this may be an error in some playback modes.

The controller may next determine if there are any next keys that should be played 5420 by the user and, if there are 5422, may create one or more light event notifications based on those next keys 5424. For example, in the case where the next keys in the playback correspond to a C-major chord, the controller may light up keys corresponding to those notes. In the case where there is a time interval between the previously played keys and the next keys to be played, the controller may wait to light up the next keys, or may blink the next keys, or may light up the next keys in a different color, or may ramp up the lighting for the next keys, or may perform some other such process to indicate that it is not yet time for the next keys. In some embodiments, the controller may be configured to light up alternate fingerings for the next keys using, for example, alternate colors and/or alternate lighting schemes. Finally, the controller may process any collected light event notifications through one or more color themes 5426 as described herein, may send those light event notifications 5428 to the interactive piano training device and, if playback is finished 5430 (e.g., based on the time location, based on an accumulation of errors, or based on some other determination) may stop playback 5432. In some embodiments, the controller may also adjust the playback time based on one or more errors and/or based on the content of the lesson as described herein.

In some embodiments, the example process illustrated in FIG. 54 may proceed in different orders and/or in different timings based upon one or more modes of an exercise. For example, in an embodiment with a learning mode, the controller may ignore the time location in playback and may generate lighting events to light keys and may keep those keys lit until the user presses that key. In this mode, the playback may be considered as a sequence of musical events and the time location may be considered as the position within that sequence, irrespective of any musical tempo and/or other such temporal considerations. In this mode, the exercise may proceed by having the user follow the instruction of the lighting events, regardless of the tempo of the musical score associated with the exercise. In such a mode, the controller may send a key lighting event to indicate a user should play that key and may then monitor the key events to determine whether that key was pressed. Failure to press the key and/or pressing the wrong key may result in changes to the lighting of the desired key, perhaps making it light more brightly, or blink, or some other such indicator, including pausing of the playback until the error is corrected. For example, in the above described example with a whole note played with four sequential quarter notes, in this mode the controller may keep the whole note lit for the entire sequence while lighting up the four quarter notes. Releasing the whole note may cause the whole note to be lit in a different color and may also pause the playback (i.e., the lighting events) for the quarter notes.

In an embodiment with a more advanced playback mode, the controller may evaluate the progress of the student during playback and determine whether to continue playback based on that progress. For example, if a user were to play an incorrect note during a song (e.g., as part of a chord), the controller may pause to enter a chord learning mode, or may back up to a previous measure, or may back up to some other such previous point in the playback (including the beginning of the playback). A determination of whether to go back in playback may also be based on timing of key press events, timing of key releases, relative timing of key events (e.g., playing chords synchronously when they should be played arpeggiated or vice versa), or other such determinations. In some embodiments, an advanced playback mode may be provided that does not light any keys during playback and only provides feedback as to correct keys and/or key timing after playback. Such an embodiment may also include a "test" mode which is timed, with a score, which results in an evaluation of the playback progress, the timing and/or the errors committed. Different test modes may evaluate based on different metrics. For example, one test mode may require proper notes but not proper timing, one may require proper timing but not proper notes, one more require both proper timing and proper notes, and so on. In such embodiments, errors may be highlighted both on the display as well as on the interactive piano training device using key lighting events during the lesson and/or exercise evaluation.

Figure 55:
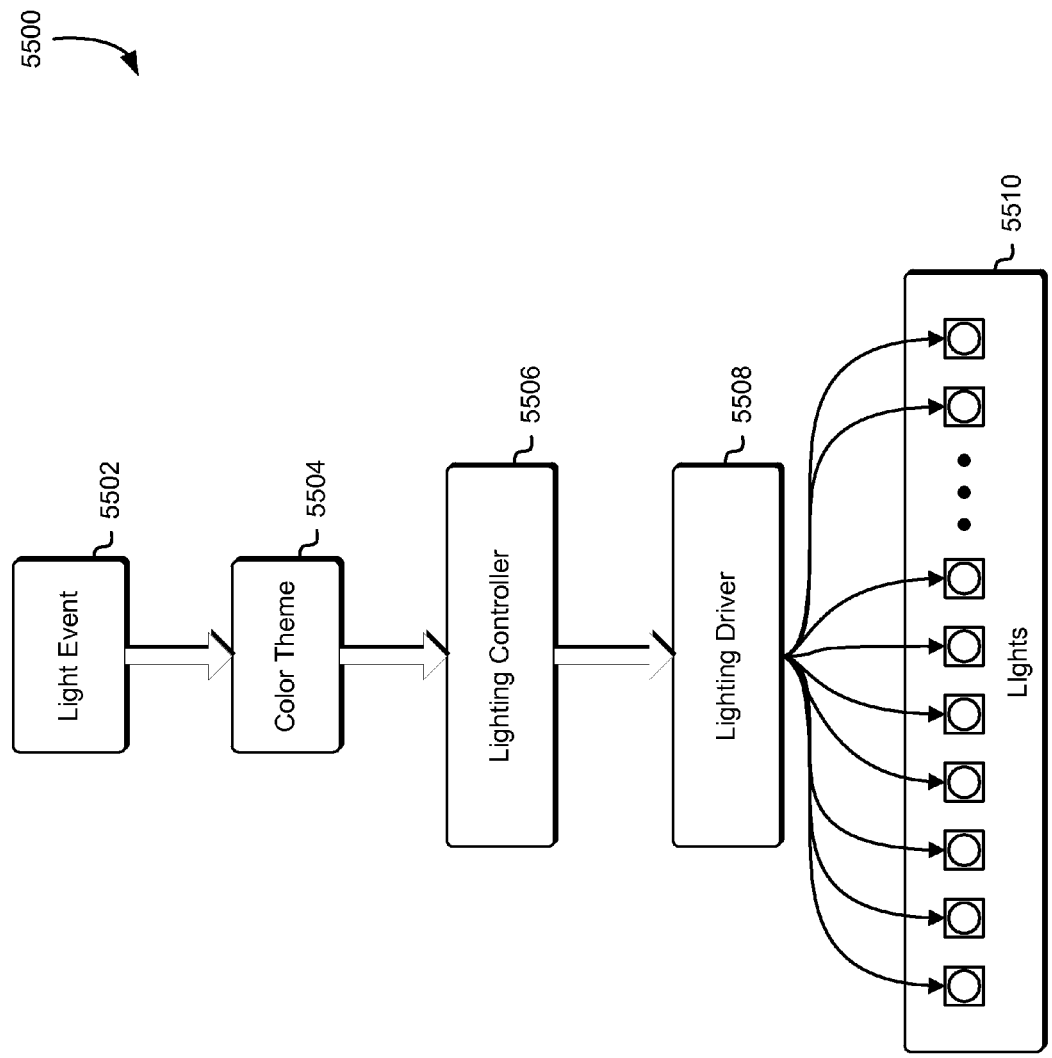
FIG. 55 illustrates an example environment where lighting events may be processed by an interactive piano training device in accordance with a lighting color theme in accordance with an embodiment.

FIG. 55 illustrates an example environment 5500 where lighting events associated with a lighting color theme may be processed by an interactive piano training device such as the interactive piano training device described in connection with FIG. 1 and in accordance with at least one embodiment. A light event 5502, which may be received by a light event manager as described herein, may first be processed by the light event manager using a color theme 5504. A color theme may provide additional control of the color and intensity of the lighting for a particular key. For example, a color theme may be configured within the light event manager to light keys that should be played with the left hand of a user in red. In such an example, a light event may include information about the handedness of a light event (i.e., "light key X with the left hand color at time Y"). Such a color theme would result in instructions to light key X with color red at time Y. A different color theme may indicate that left hand keys should be colored green, or that the handedness of the key should be ignored, or use some other such parameters. The determination of whether a note should be played with the left hand or with the right hand (the "handedness"), or which finger should be used to press the key (the "fingering") may be determined by the context of the music, the placement of the notes on a particular clef (bass, treble, etc.), or by the instructor (the creator of the lesson). The handedness of a note may be encoded within metadata associated with the musical score and may, in some embodiments, be encoded within the musical score.

A color theme may also be configured to alter colors and/or intensities of the lights based on other factors. For example, a note played softly (e.g., pianissimo) may be less brightly lit than a note played loudly (e.g., fortissimo). The use of a color theme within the light event manager may allow different behaviors without altering the underlying event notifications. As may be contemplated, the different types of color theme behaviors described herein are illustrative examples and other such types of color theme behaviors may be considered as within the scope of the present disclosure. After the parameters for lighting a key have been chosen, the lighting events may be sent to a lighting controller 5506 which may generate lower-level commands to be sent to a lighting driver 5508 and thence to the individual light or lights 5510 associated with a particular key. In an embodiment where the lights 5510 are broad-spectrum LEDs, the lighting controller 5506 may be an LED controller, the lighting driver 5508 may be and LED driver. One or more of the lights 5510 may be controlled using one or more lighting circuit boards configured to receive signals from the lighting driver 5508 and configured to control the lights in response to those signals.

Figure 56:
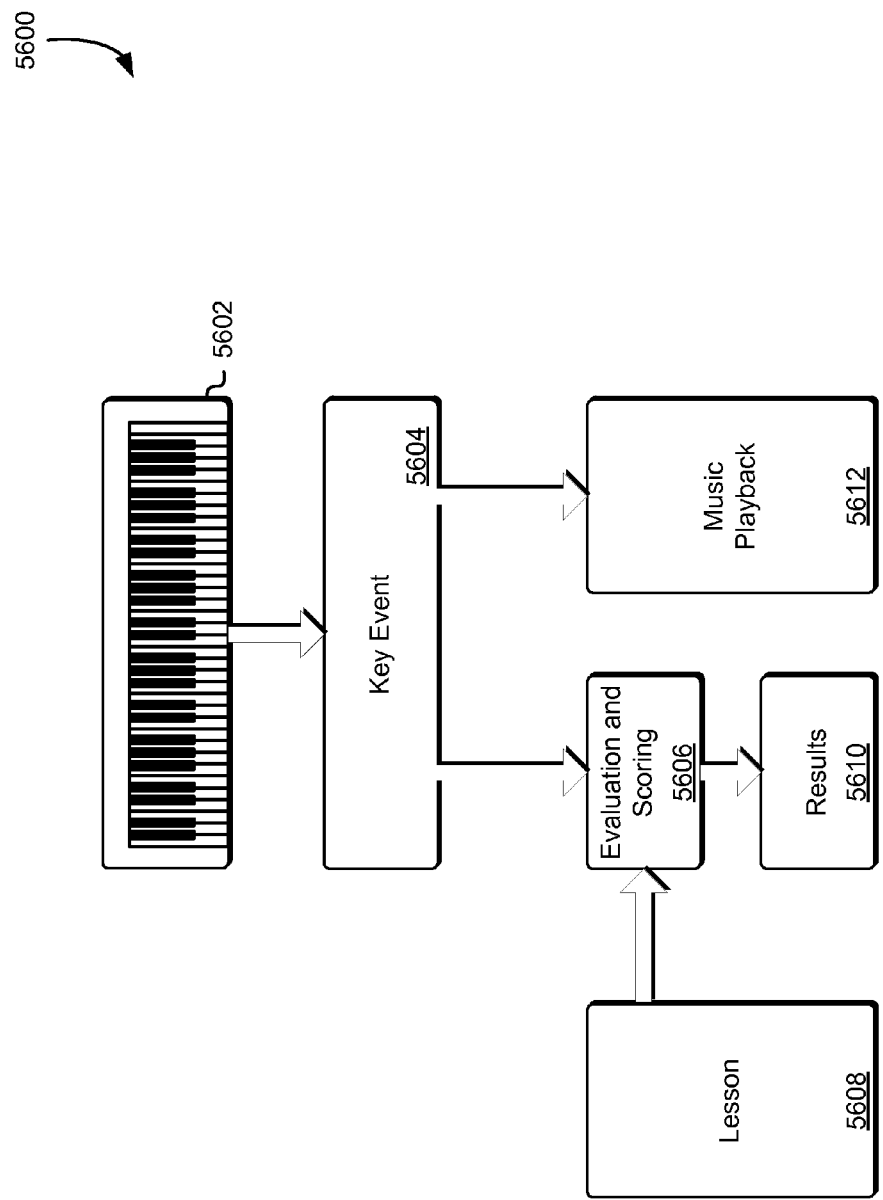
FIG. 56 illustrates an example environment where key events may be propagated to scoring and playback systems using an interactive piano training device in accordance with an embodiment.

FIG. 56 illustrates an example environment 5600 where key events may be propagated to scoring and playback systems as described in connection with FIG. 1 and in accordance with at least one embodiment. An interactive piano training device 5602 may generate key events 5604 and/or other events (e.g., controller events). The key events 5604 of may be propagated to a music playback system 5612 where one or more sounds associated with the key event 5604 may be rendered. The key event 5604 may also be propagated to an evaluation and scoring system 5606 that, based at least in part on the lesson 5608, may determine how each of the key events may relate to the evaluation score for the course, lesson or step (as described herein). Based on the evaluation score, one or more results 5610 may be presented to the user.

Scoring and evaluation may include user scoring, course scoring, lesson scoring, step scoring, note scoring or combinations of these and/or other such scoring methodologies. For example, a lesson objective may require completing each step of the lesson with more than sixty percent accuracy. A step which is completed with seventy percent accuracy may be included in both step and/or lesson scoring. Similarly, course scoring may require that a user compete each lesson, in order. Step scoring may require playing at least seventy-five percent of the notes in a song correctly. Note scoring, described in more detail in connection with FIG. 57, may require playing a note with the correct pitch, starting at a time within an attack threshold and finishing at a time within a duration threshold.

In an embodiment, one or more results 5610 are presented using a rating system such as a star rating system where one star is the lowest result and five starts is the highest. An overall evaluation score for a song or a measure within a song may be based on an aggregation of the scores for each of the notes. The notes may be aggregated in a manner where, for example, the percentage correct is the correct notes minus the incorrect notes divided by the total number of notes. The notes may also be aggregated in a weighted matter where, for example, the incorrect notes are weighted less that the correct notes in accumulating the percentage correct. Based on the percentage correct, the user may be presented with one or more results 5610 which may include, for example, one star for getting less than sixty percent of the notes correct, two stars for getting sixty to seventy percent of the notes correct, three stars for getting seventy to eighty percent of the notes correct, four starts for getting eighty to ninety percent of the notes correct, and five stars for getting more than ninety percent of the notes correct.

Figure 57:
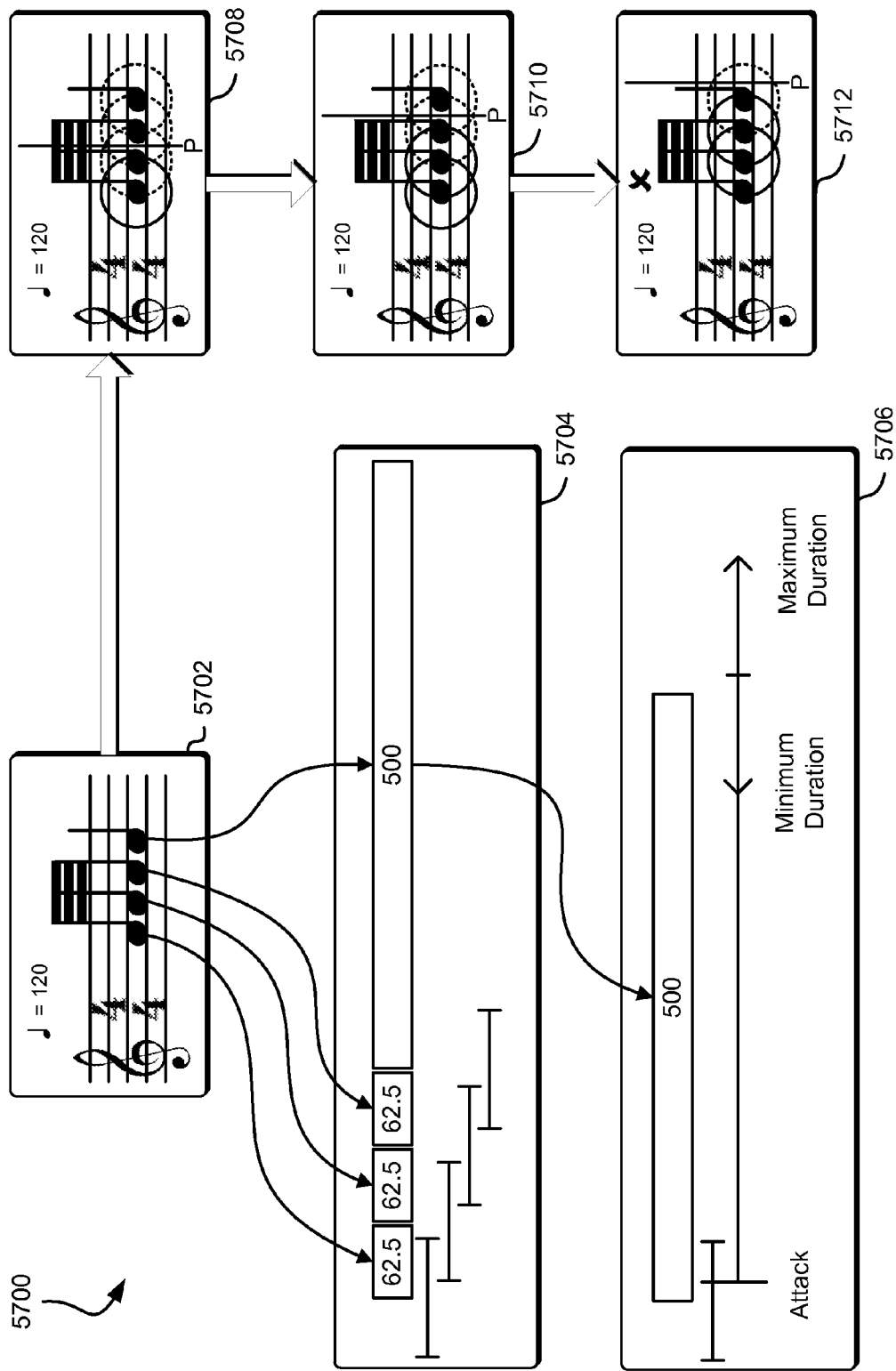
FIG. 57 illustrates an example environment where notes may be evaluated and scored using an interactive piano training device in accordance with an embodiment.

FIG. 57 illustrates an example environment 5700 where notes may be evaluated and scored for correctness as described in connection with FIG. 1 and in accordance with at least one embodiment. In the example illustrated in FIG. 57, the musical score 5702 illustrates three thirty-second notes and one quarter note where a quarter note corresponds to one-hundred and twenty beats per minute. The musical score 5702 illustrates the correct pitch to strike for each note, the correct time to begin striking each note, and the proper duration of each note. In an embodiment, the note must satisfy all three requirements (pitch, attack and duration) to be counted as correct. In another embodiment, the three requirements may be evaluated separately so that a note may be partially correct if it were struck at the proper time, but with the incorrect pitch.

The diagram 5704 illustrates the correct attack times and thresholds for each note (e.g., the proper times to strike each note) in a more temporal manner. If a quarter note corresponds to one-hundred and twenty beats per minute, that quarter note lasts one-half of a second or, as illustrated in the diagram 5704, five-hundred milliseconds. A corresponding thirty-second note lasts for one-sixteenth of a second, which is sixty-two and one half milliseconds. In the diagram 5704, the notes are shown with attack thresholds which are approximately one-hundred milliseconds (plus or minus fifty milliseconds) which indicates that, in order to be correct with respect to attack, a note must be played within the attack threshold.

The diagram 5706 illustrates the correct durations times and thresholds for the quarter note. In the diagram 5706, the quarter note is struck within the attack threshold, but slightly after the exact start time. The duration of the quarter note (five-hundred milliseconds) is illustrated relative to that attack time and includes a threshold of two-hundred milliseconds (plus or minus one-hundred milliseconds). As mentioned herein, each note of the four notes may be scored on whether the correct pitch was played within the attack threshold and of the correct duration. In embodiment, the thresholds can be adjusted based upon the lesson objective. So, for example, in one step of a lesson, the thresholds (and thus the metrics for completing the step) may be very broad (e.g., one-hundred milliseconds and two-hundred milliseconds) while in a more advanced step of the same lesson, the thresholds may be much tighter. Notes and/or combinations of notes may also be scored based on the scoring system described herein in connection with FIG. 56. For example, a note played within twenty milliseconds of the correct attack time may earn five stars for attack while a note played within one-hundred and fifty milliseconds of the correct attack time may earn one star. Each note may then have an aggregate (or weighted aggregate) score from one to five stars and the measure or song may also have such an aggregate score.

The musical score 5708 illustrates how the proper note associated with a series of notes may be determined for scoring purposes. As the play head (illustrated by the line with the letter "P") advances during playback, it may pass attack thresholds for notes (illustrated by the circles). If the note is not struck before the end of the attack threshold, that note still may be pending with respect to scoring that note. That is, a user could still play that note with the correct pitch and duration. In the musical score 5708, the play head has advanced past the first thirty-second note attack threshold, but not the others. The first thirty-second note is the one that will be scored next, if the user plays a note. In the musical score 5710, the play head has advanced past the attack threshold for the second thirty-second note, but if no notes have been played yet, the first and the second notes are still pending for scoring. If the user were to play the first note, the first thirty-second note may be scored and the second would still remain pending for scoring. In the musical score 5712, as the play head advances further, notes may become inactive and may be marked incorrect if too much time has passed or if the user has simply skipped over them and rejoined the score at a later point.

Figure 58:
FIG. 58 illustrates an example user interface where scoring results may be presented to a user of an interactive piano training device in accordance with an embodiment.

FIG. 58 illustrates an example user interface 5800 where scoring results may be presented to a user of an interactive piano training device as described in connection with FIG. 1 and in accordance with at least one embodiment. In the example user interface 5800, a user may be presented with a user name, overall scoring based at least in part on a scoring system such as the scoring system described in connection with FIG. 57, overall progress and/or other such information associated with progression through a course, a lesson, a step within a lesson, an exercise or a combination of these. In the example user interface 5800 a user may also be presented with one or more objectives and/or achievements associated with those objectives. For example, the example user interface 5800 illustrates an objective to "practice a song all the way through" and indicates that objective has been met by the check mark. Other objectives are shown that are still pending (e.g., "Power of Four"). In an embodiment, the objectives are presented as links (e.g., hyperlinks) to additional information associated with the objective such as a broader description of the objective, a number of attempts, date and time that the objective was completed and/or other such additional information.

Figure 59:
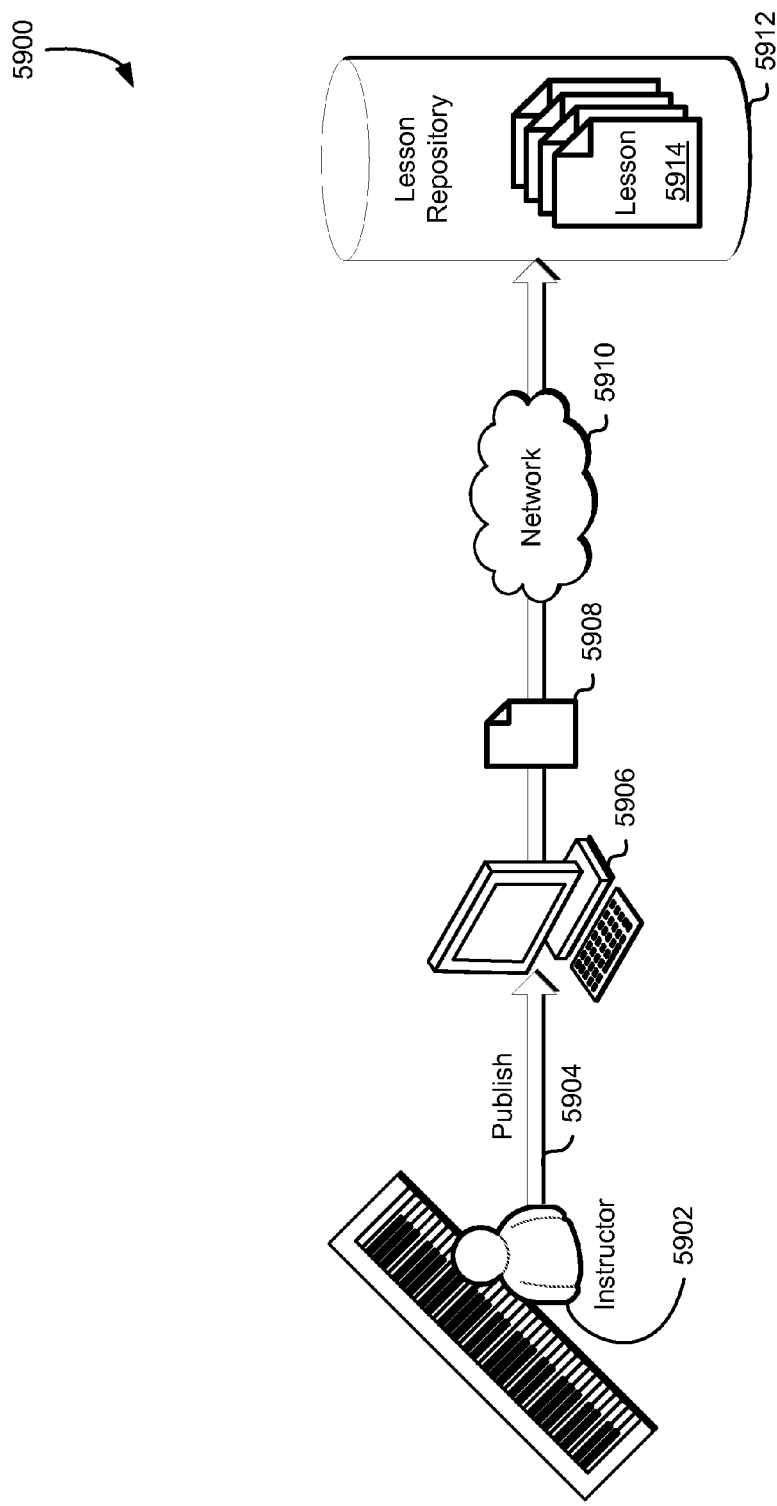
FIG. 59 illustrates an example environment where an interactive piano training device may be connected to a lesson repository to publish a lesson in accordance with an embodiment.

FIG. 59 illustrates an example environment 5900 where an interactive piano training device such as the interactive piano training device described in connection with FIG. 1 may be connected to a lesson repository to publish a lesson in accordance with at least one embodiment. An instructor 5902 may create a lesson for learning one or more aspects of playing the piano. The lesson may specify one or more objectives, one or more exercises, one or more quizzes and/or other elements. The lesson may be created using the interactive piano training device, or may be created using a computer system attached to the interactive piano training device, or may be created using some other such system. The lesson may include items such as musical scores, text files, audio files, video files, uniform resource locators, lesson metadata and such. In some embodiments, the lesson may be formatted in a proprietary format and/or may be encrypted with a security key to prevent unauthorized access. The instructor 5902 may then publish 5904 the lesson using a computer system 5906. The published lesson 5908 may be transmitted over a network 5910 such as the networks described herein and placed within a lesson repository 5912 which may comprise a plurality of such lessons 5914. The lesson repository 5912 may, in some embodiments, include systems to organize the lessons 5914 such as, for example, a database of the lessons, a front end service to allow access to the lessons, a catalog of the lessons, web pages describing the lessons and/or other such systems.

Figure 60:
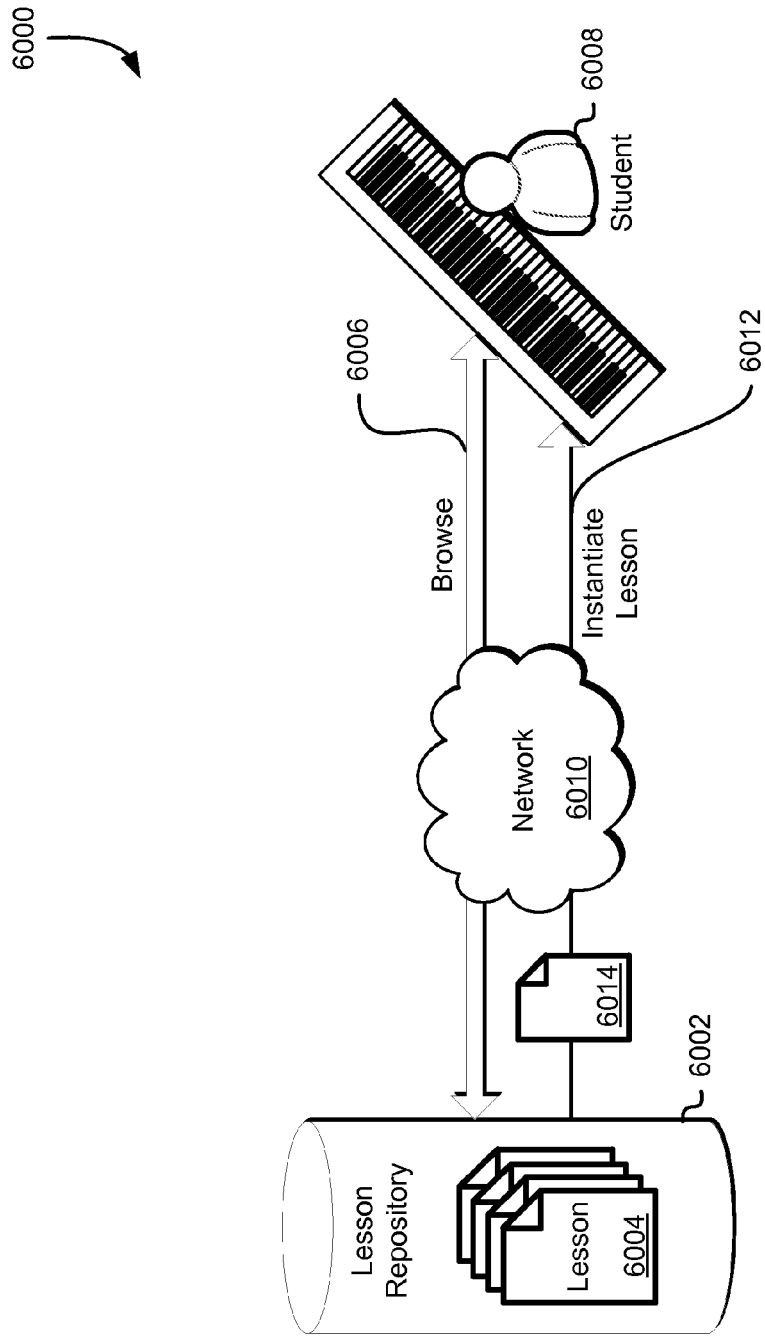
FIG. 60 illustrates an example environment where a lesson may be retrieved from a lesson repository to an interactive piano training device in accordance with an embodiment.

FIG. 60 illustrates an example environment 6000 where a lesson may be retrieved from a lesson repository to an interactive piano training device such as the interactive piano training device described in connection with FIG. 1 and in accordance with at least one embodiment. A student 6008 may use an interactive piano training device and/or an attached controller to browse 6006 for a lesson in a lesson repository 6002 using a network 6010. The lesson repository 6002 may contain a plurality of lessons 6004. In browsing, the student 6008 may select a lesson. The selected lesson 6014 may be sent over the network 6010 and instantiated 6012 so that the student 6008 may use the interactive piano training device to take the lesson.

Figure 61:
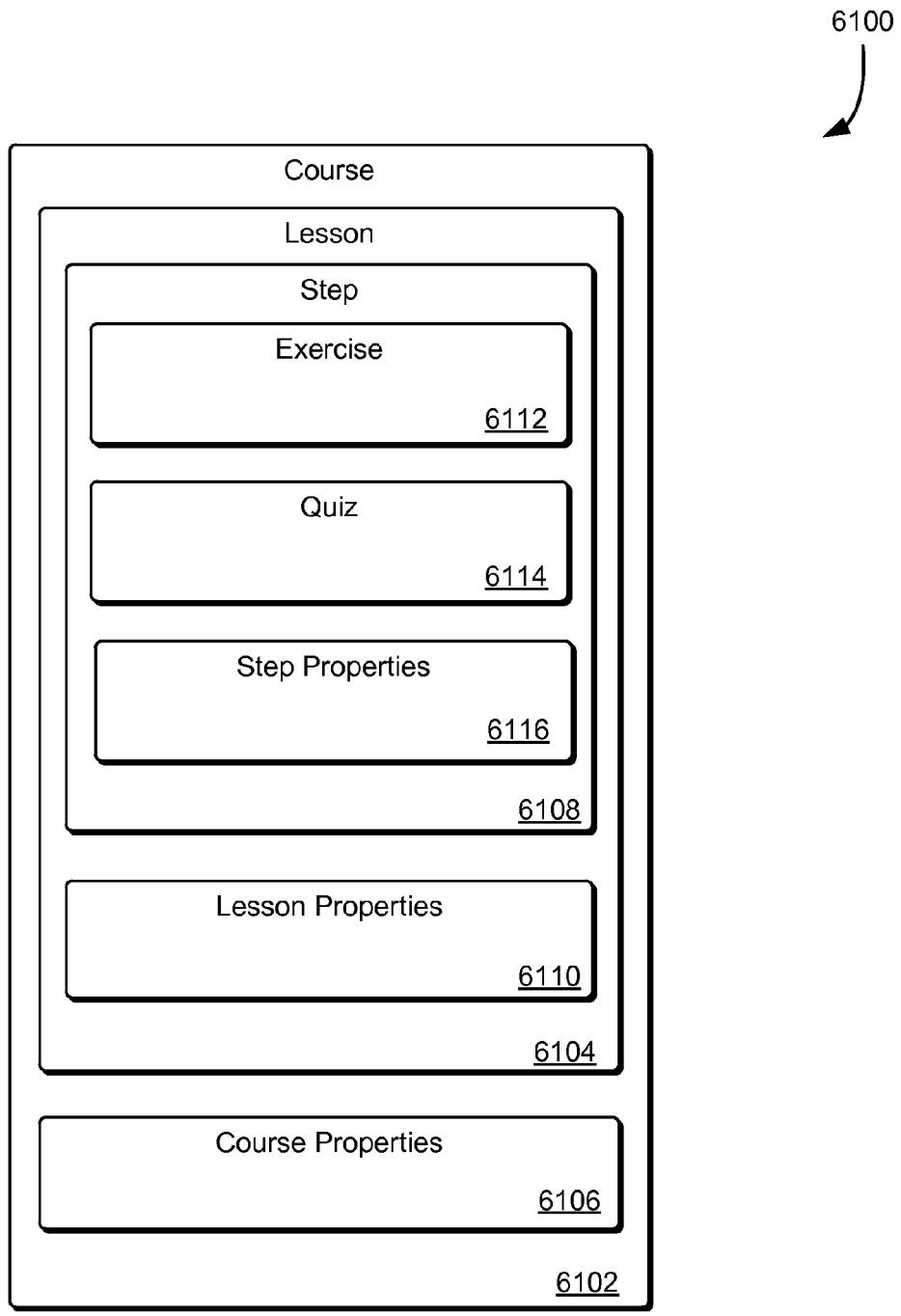
FIG. 61 illustrates an example environment showing the structure of lesson elements associated with an interactive piano training device in accordance with an embodiment.

FIG. 61 illustrates an example environment 6100 showing the structure of lesson elements for lessons associated with an interactive piano training device as described in connection with FIG. 1 and in accordance with at least one embodiment. In an embodiment, the top level element associated with a lesson is a course 6102. A course 6102 may have one or more course properties 6106 such as a course name, the instructor, one or more course objectives, a link to the next course and other such course properties. A course may also contain one or more lessons 6104. Each lesson may have one or more lesson properties 6110 such as a lesson name, a list of the steps associated with the lesson, one or more musical scores associated with the lesson, a link to the next lesson in the course or other such lesson properties. Each lesson may have one or more steps. A step 6108, which may be classified as an exercise 6112 or as a quiz 6114 based at least in part on one or more step properties 6116, is an objective for completing the lesson. Step properties 6116 may include, but not be limited to, properties related to the musical score, the playback position, allowable tempo, thresholds for completion, lighting parameters (e.g., handedness and fingering), visibility for the play head, the playback mode and/or other such properties. As may be contemplated, the properties of the steps, the lessons and the courses described herein are illustrative examples and other such properties may be considered as within the scope of the present disclosure.

Figure 62:
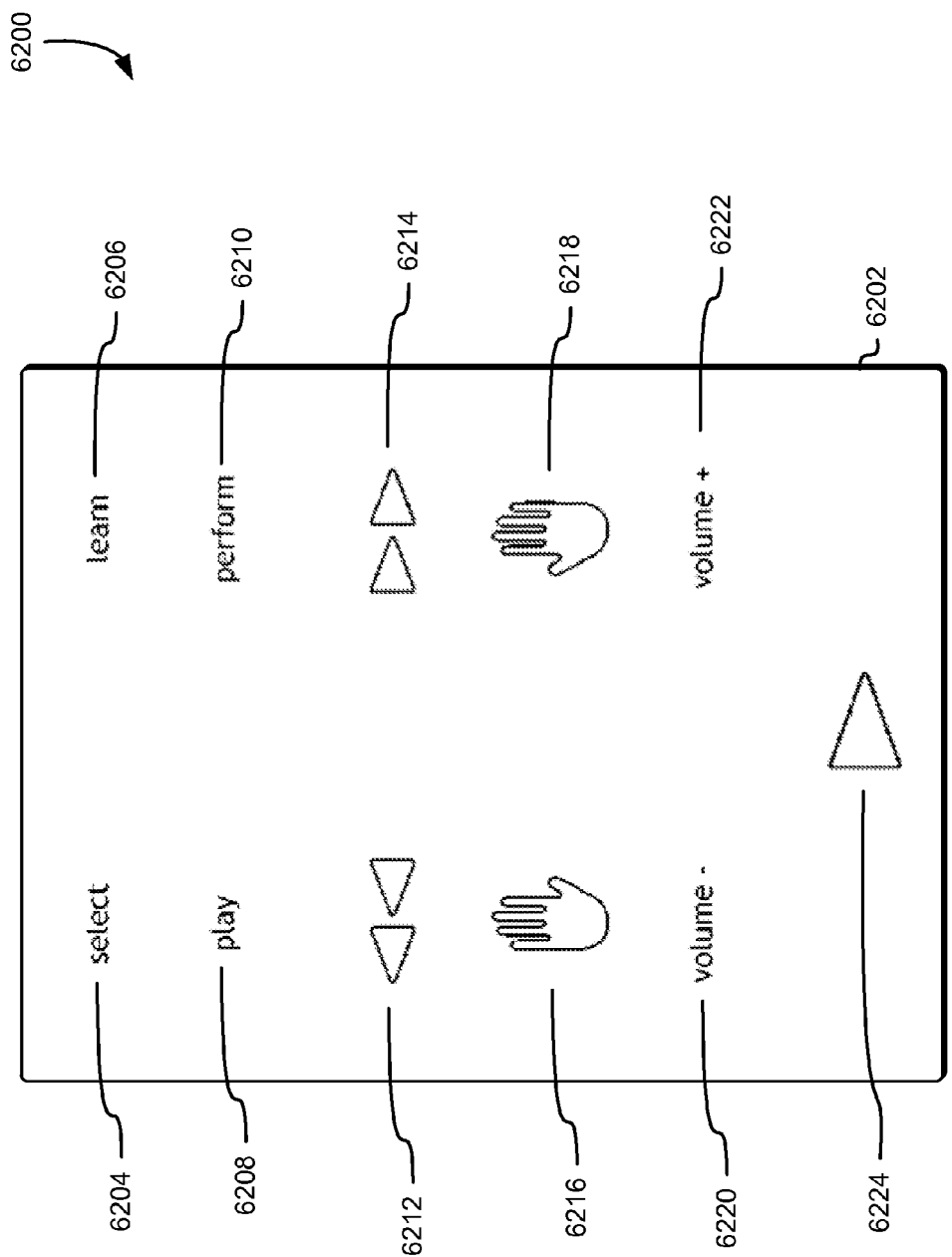
FIG. 62 illustrates a control panel for an interactive piano training device in accordance with an embodiment.

FIG. 62 illustrates a control panel 6200 such as the control panel described in connection with FIG. 1 for an interactive piano training device such as the interactive piano training device described in connection with FIG. 1 and in accordance with at least one embodiment. The controls 6202 may include one or more controls configured to interact with the interactive piano training device. The controls 6202 as described herein may be comprised of buttons, or of a touch screen (e.g., a capacitive touch screen) or of a combination of these and/or other input modalities. In an embodiment where the controls 6202 are comprised of a touch screen, different areas of the touch screen may correspond to different control functions. In an embodiment where the controls 6202 are comprised of buttons, different buttons may correspond to different control functions. The controls 6202 may be illuminated, or may be colored, or may have some other indicators. In an embodiment, the controls 6202 may include a proximity sensor which illuminates an individual control in response to a user placing his or her finger near the control panel. The illumination of the control may persist for a short time after the user removes his or her finger from the proximal area. Further, the intensity of illumination of a component of the control panel may vary with sensed proximity such that, for example, the closer a finger is to the control panel, the brighter the button closest to the finger is illuminated. In an embodiment, the controls of the control panel may provide tactile feedback using, for example, mechanical and/or psychoacoustic keys relating to depressing the controls. For example, the controls of a touch screen may include tactile feedback in the form of tactile, audio and/or visible feedback indicating the engagement of the control.

The control panel elements illustrated in FIG. 62 may include controls to select 6204 various user interface options (such as those that may be displayed on the display 108 described in connection with FIG. 1 and in accordance with at least one embodiment). Control panel elements to control the playback mode (as described herein) may include controls to for a learning mode 6206, a play mode 6208 and/or a perform mode 6210. As described herein, a learning mode may indicate correct playback with lighted keys that wait for the user to complete each key press before proceeding, irrespective of the tempo, a play mode may indicate a correct playback with lighted keys, but may require proper tempo when evaluating progress, and a performance mode may eliminate the display of the lighted keys during the playback. Other modes (such as demo modes to light the keys according to a computer program) may be reached by using combinations of these controls. Other controls may be included in the control panel such as controls to advance 6214 or rewind 6212 the playback as described herein. Additionally, controls to control lighting events for the left hand 6216 and/or the right hand 6218, to change the volume down 6220 or up 6222 and to begin playback 6224. As may be contemplated, the controls illustrated herein are examples and other such controls may be considered as within the scope of the present disclosure.

Figure 63:
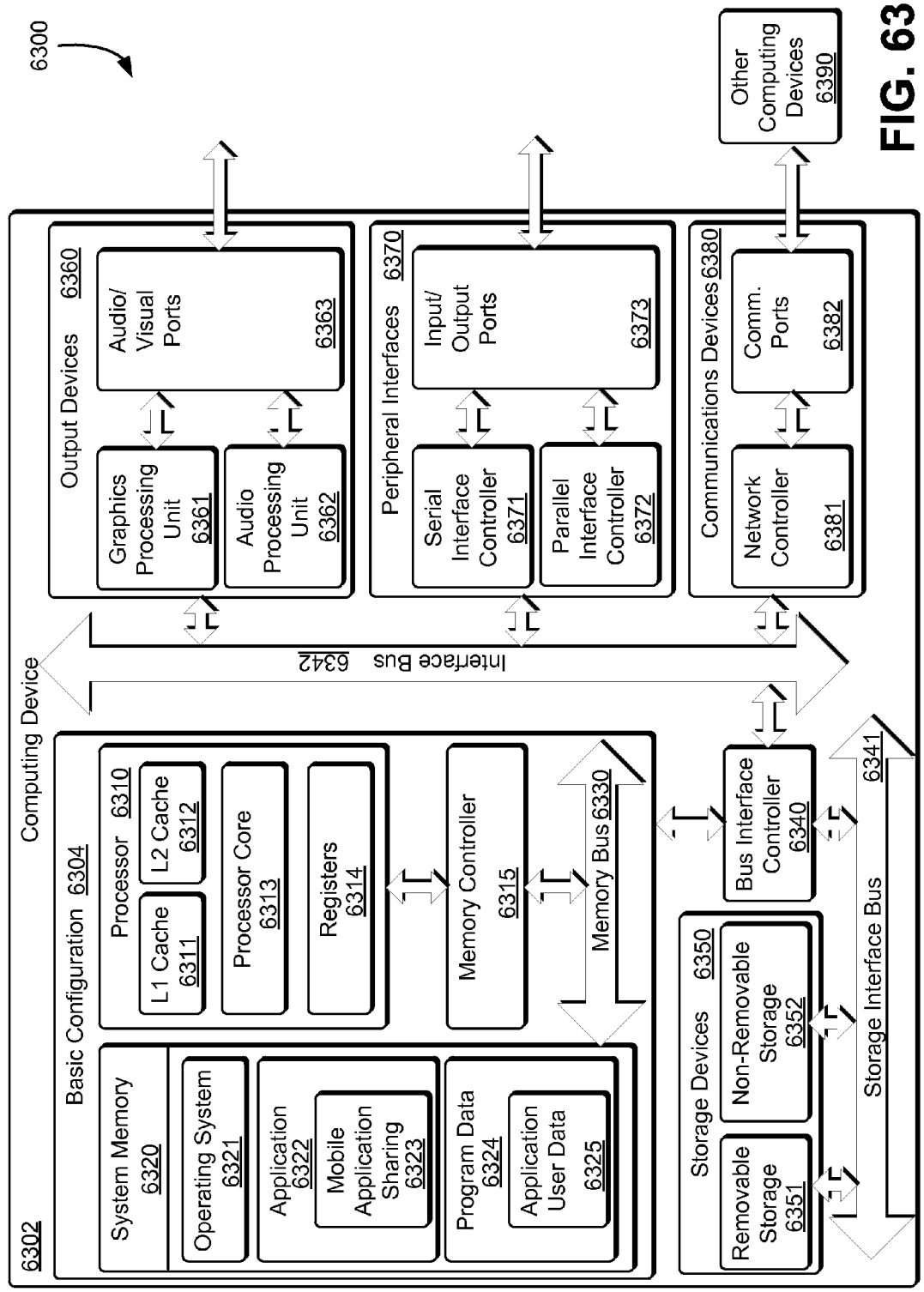
FIG. 63 illustrates an example environment in which various embodiments may be implemented.

FIG. 63 illustrates an example environment 6300 of an example computing device that may be used to implement one or more embodiments, in accordance with the present disclosure. In a basic configuration 6304, a computing device 6302 may include one or more processors 6310 and may include memory such as system memory 6320. A memory bus 6330 may be used for communicating between a processor 6310 of the computing device 6302 and the system memory 6320. The computing device 6302 may include any appropriate device operable to send and/or receive requests, messages or information over an appropriate network and may, in some embodiments, convey information back to a user of the computing device in response to such requests. Examples of such computing devices include personal computers, cell phones, handheld messaging devices, laptop computers, tablet computers, set-top boxes, personal data assistants, mobile devices, wearable devices, embedded computer systems, electronic book readers, application specific client devices and the like. The network may include any appropriate network, including an intranet, the Internet, a cellular network, a local area network, a satellite network or any other such network and/or combination thereof. Communication over the network can be enabled by wired or wireless connections and combinations thereof.

The information (also referred to herein as "content") conveyed back to the user of the computing device 6302 may include, but may not be limited to, text, graphics, audio, video and/or other content usable to be provided to the user. The information conveyed back to the user of the computing device may be conveyed in the form of HyperText Markup Language ("HTML"), Extensible Markup Language ("XML"), JavaScript, Cascading Style Sheets ("CSS") or some other such client-side structured language. Content may be processed by the computing device 6302 to provide the content to the user of the computing device 6302 in one or more forms including, but not limited to, forms that are perceptible to the user audibly, visually and/or through other senses including touch, taste, and/or smell. Requests and responses sent over the network may be handled by a server using PHP: Hypertext Preprocessor ("PHP"), Python, Ruby, Perl, Java, HTML, XML or another appropriate server-side structured language. It should be understood that operations described herein as being performed by a single device may, unless otherwise clear from context, be performed collectively by multiple devices.

In some embodiments, the processor 6310 may be of a type including but not limited to a microprocessor, a microcontroller, a digital signal processor (DSP), or any combination thereof. A processor 6310 may include one more levels of caching, such as a level one (L1) cache 6311 and a level two (L2) cache 6312. A processor may also include a processor core 6313, and registers 6314. The processor core 6313 may include, for example, an arithmetic logic unit (ALU), a floating point unit (FPU), a digital signal processing core (DSP Core), a graphics processing unit (GPU) or a combination of these and/or other such processing units. A memory controller 6315 may also be used with the processor 6310 to control the memory such as the system memory 6320. In some implementations the memory controller 6315 may be an internal part of the processor 6310.

In some embodiments, the system memory 6320 may be of any type including but not limited to volatile memory (such as RAM), non-volatile memory (such as ROM, flash memory, etc.) or any combination thereof. System memory 6320 may contain an operating system 6321, one or more applications 6322, and program data 6324 associated with such applications 6322. An application 6322 may include a component 6323 configured for sharing applications between mobile devices in a peer-to-peer environment, in accordance with the present disclosure. The program Data 6324 may include applicant or organizational data 6325 as described herein. In some embodiments, application 6322 can be arranged to operate with program data 6324 on an operating system 6321 such that operation of a system may be facilitated on general purpose computer systems.

A computing device 6302 can have additional features or functionality, and additional interfaces to facilitate communications between the basic configuration 6304 and any required devices and interfaces. For example, a bus/interface controller 6340 can be used to facilitate communications between the basic configuration 6304 and one or more data storage devices 6350 via a storage interface bus 6341. The data storage devices 6350 can be removable storage devices 6351, non-removable storage devices 6352, or a combination thereof. Examples of removable storage and non-removable storage devices include magnetic disk devices such as flexible disk drives and hard-disk drives (HOD), optical disk drives such as compact disk (CD) drives or digital versatile disk (DVD) drives, solid state drives (SSD), and tape drives and/or other such storage devices. Examples of computer storage media may include volatile and nonvolatile, removable and non-removable media implemented in any method or technology for storage of information, such as computer readable instructions, data structures, program modules, or other data.

System memory 6320, removable storage device 6351 and non-removable storage device 6352 are all examples of computer storage media. Computer storage media (or computer-readable medium) includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 6302. Any such computer storage media can be part of device 6302.

Computing device 6302 may also include an interface bus 6342 for facilitating communication from various interface devices (e.g., output interfaces, peripheral interfaces, and communication interfaces) to the basic configuration 6304 via the bus/interface controller 6340. Example output devices 6360 include a graphics processing unit 6361 and an audio processing unit 6362, which can be configured to communicate to various external devices such as a display or speakers via one or more audio/visual ports 6363. Example peripheral interfaces 6370 include a serial interface controller 6371 or a parallel interface controller 6372, which can be configured to communicate with external devices such as input devices (e.g., keyboard, mouse, pen, voice input device, touch input device, etc.) or other peripheral devices (e.g., printer, scanner, etc.) via one or more I/O ports 6373.

An example communication device 6380 may include a network controller 6381, which can be arranged to facilitate communications with one or more other computing devices 6390 over a network communication via one or more communication ports 6382. Communication ports 6382 may further include components configured to communicate over a near-area network. Examples of such communication ports 6382 may utilize at least one network for supporting communications using any of a variety of protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS") and Common Internet File System ("CIFS"). The network can be, for example, a local area network, a wide-area network, a virtual private network, the Internet, an intranet, an extranet, a public switched telephone network, an infrared network, a wireless network, a satellite network and any combination thereof.

A computing device 6302 may be implemented as a computer such as a laptop computer, a personal computer, a workstation, a server or some other such computer device. A computing device 6302 may also be implemented as a portable (or mobile) computer such as a cell phone, a personal data assistant (PDA), a personal media player device, a wireless web-watch device, a personal headset device, an application specific device, or some other such device. A computing device may also be implemented as a combination of computer and/or portable devices including, but not limited to, the devices described herein. A computing device 6302 may include an operating system that may provide executable program instructions for the general administration and operation of that device and may include a computer-readable storage medium (e.g., a hard disk, random access memory, read only memory, etc.) storing instructions that, when executed by a processor of the device, allow the device to perform its intended functions.

The computing device 6302 illustrated in the example environment 6300 may be part of a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 63. Thus, the depiction of the system illustrated in FIG. 63 should be taken as being illustrative in nature and not limiting to the scope of the disclosure. The various embodiments may also be implemented in a wide variety of operating environments, which in some cases can include one or more computers and/or computing devices that may be used to operate any number of applications. Such devices may include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, application specific devices and other devices capable of communicating via a network. These devices also can include virtual devices such as virtual machines and other such virtual devices capable of communicating via a network.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings herein are to be regarded in an illustrative rather than a restrictive sense. It will, however, be evident that various modifications and changes may be made thereunto without departing from the broader spirit and scope of the invention as set forth in the claims.

Other variations are within the spirit, and therefore scope, of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A device with a piano keyboard comprising:
a plurality of piano keys, each piano key of the plurality of piano keys:
having an upper surface that is strikeable to displace at least a front portion of the piano key;
having a respective light emitting diode that is oriented to project light horizontally from a position adjacent to a rear portion of the piano key and operable to produce light of any of a plurality of colors; and
having a respective light guide, the respective light guide:
having a rigid, horizontally oriented body of a solid material that:
has a first end into which light from the respective light emitting diode is received;
has a second end opposite the first end; and
is oriented and configured to transmit light, received into the first end from the respective light emitting diode through the solid material to the second end to illuminate at least a portion of a playable surface of the piano key.

2. The device of claim 1, wherein the respective light guide tapers such that the respective light guide is, at the second end and in at least one dimension, smaller than the first end.

3. The device of claim 1, wherein the respective light guide has a flat face extending completely from the first end to the second end.

4. The device of claim 3, wherein the flat face is oriented to be on an upper surface of the respective light guide.

5. The device of claim 1, wherein the respective light emitting diode is connected to the same circuit board as a plurality of other light emitting diodes each corresponding to a respective piano key of the plurality of piano keys.

6. The device of claim 1, wherein the respective light emitting diode is oriented such that a beam of light projected from the respective light guide has a center that is parallel to the upper surface of the piano key when the piano key is not depressed.

7. The device of claim 1, wherein the respective light guide is configured to move with the piano key of the plurality of piano keys.

8. The device of claim 1, wherein the respective light emitting diode is located behind a playing surface of the piano key, the playing surface of the piano key comprising a portion of the upper surface of the piano key.

9. The device of claim 1, further comprising a controller, the controller configured to provide signals to individual light emitting diodes of a plurality of light emitting diodes that includes the respective light emitting diode, thereby causing the individual light emitting diodes to produce light.

10. The device of claim 9, wherein the controller is further configured to provide different signals to the same individual light emitting diode at different times, thereby causing the individual light emitting diode to produce different color light at different times.

11. The device of claim 6, wherein the respective light guide is physically separate from a second light guide of another piano key of the plurality of piano keys.

12. The device of claim 6, wherein the respective light guide has a matte surface.

13. The device of claim 1, wherein the device comprises a housing configured such that the respective light emitting diode of each piano key of the plurality keys is not visible when the device is assembled.

14. The device of claim 1, wherein the respective light guide has two opposing faces that are not parallel to one another.

15. The device of claim 1, wherein the respective light emitting diode is spaced from the respective light guide such that light from the respective light emitting diode passes through a space before passing through the respective light guide.

16. The device of claim 1, wherein the light guide is manufactured separately from the piano key.

17. The device of claim 13, wherein each individual piano key of the plurality of piano keys has a corresponding light guide, of a plurality of light guides that includes the light guide, specific to the individual piano key and a corresponding light emitting diode, of a plurality of light emitting diodes that includes the respective light emitting diode, specific to the individual piano key.

18. The device of claim 1, wherein multiple light guides of a plurality of light guides that includes the respective light guide share the same shape.

19. The device of claim 1, wherein the respective light guide has a terminal face, opposite the respective light emitting diode, that is perpendicular to a center of a beam projected by the respective light emitting diode.

20. The device of claim 1, wherein:
the respective light guide:
tapers such that the respective light guide is, at the second end and in at least one dimension, smaller than the first end;
has a flat face extending completely from the first end to the second end;
has a matte surface; and
the respective light emitting diode:
is connected to the same circuit board as other light emitting diodes of a plurality of light emitting diodes that includes the respective light emitting diode;
is oriented such that a beam of light projected from the respective light guide has a center that is parallel to the upper surface of a respective piano key when the respective piano key is not depressed; and
is located behind a playing surface of the respective piano key, the playing surface of the respective piano key comprising a portion of the upper surface of the respective piano key.

\* \* \* \* \*